(12) United States Patent
Miyashita et al.

(10) Patent No.: US 7,725,923 B2
(45) Date of Patent: *May 25, 2010

(54) STRUCTURED-DOCUMENT PROCESSING

(75) Inventors: Hisashi Miyashita, Yamato (JP);
Michiaki Tatsubori, Yamato (JP);
Toshiro Takase, Yamato (JP); Satoshi Makino, Yamato (JP); Kent Tamura, Machida (JP); Yuichi Nakamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/124,437

(22) Filed: May 21, 2008

(65) Prior Publication Data
US 2008/0294614 A1 Nov. 27, 2008

(51) Int. Cl.
*G06F 17/00* (2006.01)
(52) U.S. Cl. .............................. 726/1; 726/3; 707/101; 707/102; 715/234
(58) Field of Classification Search .................... 726/1, 726/3; 707/101, 102; 715/234
See application file for complete search history.

(56) References Cited
U.S. PATENT DOCUMENTS
5,642,435 A 6/1997 Loris

FOREIGN PATENT DOCUMENTS
JP 09319632 12/1997
JP 2004062716 A 2/2004

*Primary Examiner*—Thanhnga B Truong
(74) *Attorney, Agent, or Firm*—Cantor Colburn LLP; Vazken Alexanian

(57) ABSTRACT

Provides structured-document processing device for detecting a relationship of approximateness between structured documents effectively. State-transition-diagram information storing means stores information concerning a state transition diagram where source nodes of a source structured document transit in order of occurrence from the head thereof. Extracting means extracting, a pair consisting of a new node and a corresponding source node in accordance with order of occurrence. Matching means determining whether the source and new nodes in the selection pair have matchingness, on the basis of their descriptions. Node qualifying means qualifying the source node as a node to be used for the new node. Transition-history information generating means generates, as transition-history information, information concerning a transition history regarding the node to be used. Degree-of-approximateness detecting means detects a degree of approximateness between the source structured document and the new structured document on the basis of the transition-history information.

19 Claims, 36 Drawing Sheets

FIG.40

```
<S:Envelope xmlns:S="http://www.w3.org/2001/12/soap-envelope" ▢c>
  <S:Header>
    <wsse:Security>
      <wsse:BinarySecurityToken ValueType="wsse:X509v3▢▒c wsu:Id="▭">
      ▭
      </wsse:BinarySecurityToken>
      <ds:Signature>
        <ds:SignedInfo>
          <ds:CanonicalizationMethod Algorithm= "http://www.w3.org/2001/10/xml-exc-c14n#"/>
          <ds:SignatureMethod Algorithm= "http://www.w3.org/2000/09/xmldsig#rsa-sha1"/>
          <ds:Reference URI="▭">
            <ds:Transforms>
              <ds:Transform Algorithm="http://www.w3.org/2001/10/xml-exc-c14n#"/>
            </ds:Transforms>
            <ds:DigestMethod Algorithm="http://www.w3.org/2000/09/xmldsig#sha1"/>
            <ds:DigestValue>▭</ds:DigestValue>
          </ds:Reference>
        </ds:SignedInfo>
        <ds:SignatureValue>▭</ds:SignatureValue>
        <ds:KeyInfo>
          <wsse:SecurityTokenReference>
            <wsse:Reference URI="▭"/>
          </wsse:SecurityTokenReference>
        </ds:KeyInfo>
      </ds:Signature>
    </wsse:Security>
  </S:Header>
  <S:Body wsu:Id="▭">
  ▭
  </S:Body>
</S:Envelope>
```

FIG.41

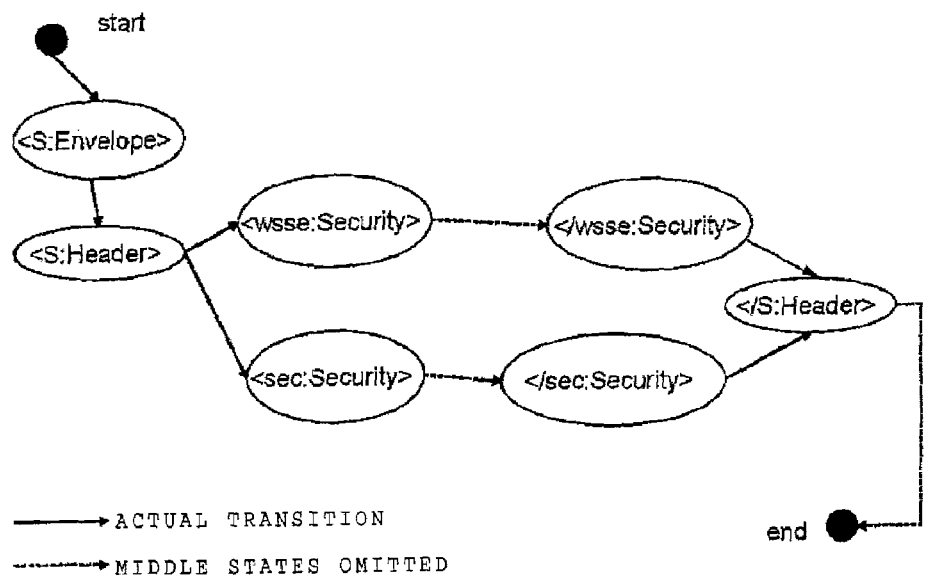

⎯⎯⎯→ ACTUAL TRANSITION

- - - - → MIDDLE STATES OMITTED

STRUCTURED-DOCUMENT PROCESSING

TECHNICAL FIELD

The present invention relates to a device, a method, and a program, for processing a structured document such as an XML (eXtensible Markup language) document. It particularly relates to a structured-document processing device, a structured-document processing method, and a program, which perform a process on the basis of a comparison between a structured document which has been analyzed and a new structured document.

BACKGROUND OF THE INVENTION

Japanese Patent Laid-open Official Gazette No. Hei. 9-319632 (hereinafter, referred to as "Patent Literature 1") has disclosed an edition management method of displaying information concerning what each edition has been like, when a structured document such as an SGML (Standard Generalization Markup Language) is going to be edited for deletion, insertion, revision and the like, for each edition. According to the edition management method, in order to specifically show a part to be edited in each version while reducing an amount of data to be stored, all the contents of a structured document are stored with regard to a first edition, whereas only information concerning a difference between the current edition and the previous edition is stored with regard to a second edition and each edition following the second edition. In addition, according to a conventional mode of displaying information concerning a difference, contents prior to a revision in the current edition and contents posterior to the revision in the current edition have been displayed respectively, as tagged texts, and in sub-areas into which the display area is divided, as shown by FIG. 4(b) in Patent Literature 1, and visibility for the comparison has been poor. By contrast, in an edition management according to Patent Literature 1, deleted contents, inserted contents and revised contents are designed to be compared for each structured part as shown by FIG. 23 in Patent Literature 1, thereby improving the visibility for the comparison. In other words, according to the invention as disclosed in Patent Literature 1, information concerning the difference itself is stored by a structured document, as shown by FIGS. 6 and 18 in Patent Literature 1.

According to Japanese Patent Laid-open Official Gazette No. 2004-62716 (hereinafter, referred to as "Patent Literature 2"), in order to perform a syntactic analysis of a structured document at a higher speed, information concerning an event set as a result of the syntactic analysis of the structured document is stored in advance, with regard to a single structured document whose structure a single application program repeatedly requests to be analyzed, or with regard to a single structured document whose structure a plurality of different application programs commonly request to be analyzed. When the syntactic analysis of the structured document is once again requested by an application program subsequently, the information concerning the event set which has been stored is read out instead of a syntactic analysis being once again performed on the structured document. Thereby, a series of events are reproduced from the information concerning the event set, thus posting the series of events to the application program.

On the other hand, several methods have been proposed, with which a highly approximate document is detected out of normal text documents at high speed, as shown, for example, in "A system for Approximate Tree Matching," (online), available from US CiteSeer.IST (Scientific Literature Digital Library)<http://citeseer.ist.psu.edu/tsong-li92system.html>, (accessed 2004-9-1) (hereinafter, referred to as "Non-patent Literature 1"), and in "On the Editing Distance between Undirected Acyclic Graphs and Related Problems," (online), available from US CiteSeer.IST (Scientific Literature Digital Library)<http://citeseer.ist.psu.edu/zhang-li95editing.html>, (accessed 2004-9-1) (hereinafter, referred to as "Non-patent Literature 2").

In addition, a method using an automaton in an adaptive manner is an area which has been researched as a learning automaton, as shown, for example, in Tsetlin, M. L., "Automaton Theory and the Modeling of Biological Systems," New York and London, Academic Press, 1973 (hereinafter, referred to as "Non-patent Literature 3").

Furthermore, there is an SIA (System Integrated Automaton for SAX) Parser as described in "System Integrated Automaton for SAX," (online), available from <http://www.geocities.com/siaparser/resources/siaidea.html>, (accessed 2004-9-1) (hereinafter, referred to as "Non-patent Literature 4").

A simple and apparent method of fetching a difference from a highly approximate XML document with regard to XML documents which have been analyzed may simply fetch a difference with respect to a byte string or a character string. With regard to this difference analysis method, there have been various proposals for a long time, as disclosed in Heckel, P., "A technique for Isolating Differences between Files," Communication of the ACM, April, 1978 (hereinafter referred to as "Non-patent Literature 5").

With regard to an edition management device according to Patent Literature 1, disclosed is use of information concerning a difference for the purpose of saving an amount of information to be stored in an edition management. However, there is no reference made to a specific technique for carrying out a syntactic analysis of a structured document at a higher speed.

A structured-document processing device according to Patent Literature 2 can be adapted for carrying out a syntactic analysis, at a higher speed, for a structured document on which a syntactic analysis has been performed when an application program once again requests the structure of the structured document to be analyzed. However, the structure-document processing device cannot cope with a request for a syntactic analysis to be made for a structured document which is different from the structured document on which the syntactic analysis has been performed.

All of the conventional techniques of retrieving an approximate XML document as disclosed in Non-patent Literatures 1 and 2 make a decision on approximateness of a document which has been parsed. The techniques cannot be used for the purpose of carrying out a parsing process efficiently.

A simple adaptation of an automaton for a document (Non-patent Literature 3) would not take a structure of an XML or a form of the XML into consideration, thus requiring a time-consuming operation such as a check on whether or not the document is well-formed. Accordingly, there is a significant problem with the simple adaptation in terms of efficiency.

The SIA parser as described in Non-patent Literature 4 is designed to recognize a grammar of an XML tree structure itself, and to process it by using an automaton for an SAX event. For this reason, this SIA parser cannot be adapted for a text on which parsing (syntactic analysis) has not been performed as it is.

Non-patent Literature 5 has not made any suggestion concerning carrying out parsing of an XML document, which has not been parsed, at a higher speed.

SUMMARY OF THE INVENTION

An aspect of the present invention is to provide a structured-document processing device, a structured-document processing method, and a program, which detect approximateness between structured documents efficiently.

Another aspect of the present invention is to provide a structured-document processing device, a structured-document processing method, and a program, which enable a new structured document to be parsed at a higher speed.

Yet another aspect of the present invention is to provide a structured-document processing device, a structured-document processing method, and a program, which can locate an optimal structured document at a higher speed in a case where a new structured document is intended to be parsed at a higher speed by using parsing of the optimal structured document.

A structured document processing device, a structured-document processing method and a program according to the present invention utilizes a state machine (automaton) in order to check on approximateness between a source structured document and a new structured document.

As examples of the present invention, there are an XML parser, a device for reasoning classes of the respective structured documents on the basis of approximateness between the structured documents, a device for associating one structured document and another structured document on the basis of approximateness of the structured documents, and a device for assisting a university professor in grasping matching parts and unmatched parts between one report (=structured document) which a student newly turns in and another report (=structured document) which another student has already turned in.

BRIEF DESCRIPTION OF THE DRAWINGS

For a more complete understanding of the present invention and the advantages thereof, reference is now made to the following description taken in conjunction with the accompanying drawings.

FIG. 40 is a diagram schematically showing a template.

FIG. 41 is a state transition diagram into which a plurality of templates are put together.

BRIEF DESCRIPTION OF THE INVENTION

Figure 1:
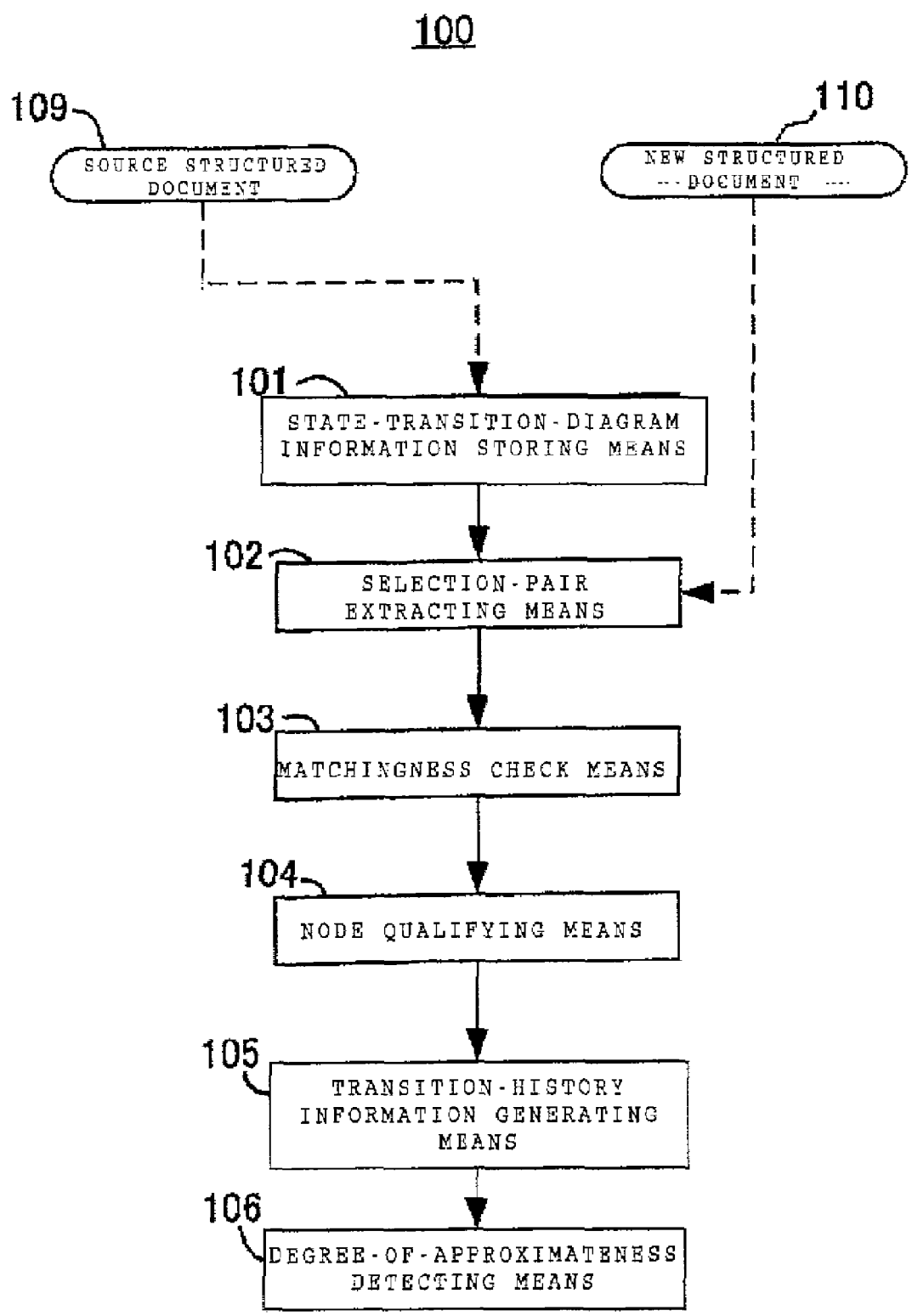
FIG. 1 is a functional block diagram of a first structured-document processing device.

The present invention provides structured-document processing devices, structured-document processing methods, and a program, that detect approximateness between structured documents efficiently. The present invention also provides structured-document processing devices, structured-document processing methods, and a program, that enable a new structured document to be parsed at a higher speed. The present invention further provides structured-document processing devices, structured-document processing methods, and a program, that can locate an optimal structured document at a higher speed in a case where a new structured document is intended to be parsed at a higher speed by using parsing of the optimal structured document.

A structured document processing device, a structured-document processing method and a program according to the present invention utilize a state machine (automaton) in order to check on approximateness between a source structured document and a new structured document. In other words, the source structured document is partitioned into a plurality of source nodes which are a plurality of nodes concerning the structure partitions, and those source nodes are caused to correspond to the respective states on the state transition diagram (in this specification, a state on a state transition diagram is referred to as a "node"), thereby creating the state transition diagram. In the state transition diagram, the source nodes are caused to correspond respectively to the state transitions in order of occurrence from the head to the tail. Similarly, the new structured document is partitioned into a plurality of new nodes which are a plurality of nodes concerning the structure partitions, and those new nodes are caused to correspond to the respective states in the new structured document in order of occurrence from the head to the tail. A new node in the new structured document and the source node on the state transition diagram are extracted as a selection pair in accordance with their order of occurrence, and thereby matchingness between the source node and the new node in each of the selection pairs is examined.

A structured document includes a hierarchical structured document. The hierarchical structured document means, for example, to be an XML document and an SGML document. Incidentally, the "matchingness" means, for a typical example, to be a complete matching, but is not necessarily limited to this. If a source node and a new node of the same selection pair are different only in their respective node attribute values, it can be defined that there is matchingness between the source node and the new node. For example, when the present invention is adapted for an XML parser and the like, criteria can be set up for use of a result of parsing a source structured document as a result of parsing a new structured document. Thereby, even if the source node and the new node of the same selection pair do not completely match each other, and if the difference is so negligible that the criteria are satisfied, it can be decided that there is matchingness between the source node and the new node.

As examples of the present invention adapted, there are an XML parser, a device for reasoning classes of the respective structured documents on the basis of approximateness between the structured documents, a device for associating one structured document and another structured document on the basis of approximateness of the structured documents, and a device for assisting a university professor in grasping matching parts and unmatched parts between one report (=structured document) which a student newly turns in and another report (=structured document) which another student has already turned in.

In the parsing device, the method, and the program, for a structured document according to the present invention, a source structured document is a structured document on which parsing has been already performed. By contrast, a new structured document is a structured document on which parsing is going to be performed. The source structured document and the new structured document are partitioned into units of contents portion convenient enough for reuse of result of parsing a source structured document as a result of parsing a new structured document. The unit of contents portion may be, for example, a structural partition of the structured document (for example, a node in the structured document). In addition, the matchingness between the source structured document and the new structured document can be examined from a viewpoint of their respective descriptions in terms of their respective contents portions on the basis of order of occurrence from the head to the tail. Even if there is no match in several units of contents portion between the source structured document and the new structured document, if predetermined matchingness can be recognized in the wholes of the respective structured documents, a result of parsing the source structured document is used to parse the new structured document. For example, as a result of parsing a unit of contents portion of the new structured document, a result of parsing a unit of contents portion of the source structured document is used as it is. With regard to the unit of contents portion of the new structured document for which a result of parsing a unit of contents portion in the source structured document cannot be used, parsing will be performed on a unit of contents portion of the new structured document depending on the necessity.

In the present invention, a state machine is used in order to locate an optimal source structured document, which is going to be used to parse a new structured document, out of a plurality of source structured documents. The state machine locates a source node on a state transition diagram which has matchingness with each of the new nodes of a new structured document, thereby examining a transition history of source nodes having matchingness on the state transition diagram.

Thus, a single predetermined source structured document is selected on the basis of the transition history. It is preferable that the source structured document be a source structured document whose described contents are the most approximate to those of a new structured document. However, when approximateness of a source structured document to a new structured document is higher than a criterion value, the source structured document may be selected even if the source structured document is not a source structured document which is the most approximate to the new structured document. The criterion value is a value representing a ratio of a counted number, which is obtained by counting the number of new nodes of a new structured document which have been decided that there is matchingness between the new nodes and source nodes on the state transition diagram, to a total number of new nodes of the new structured document.

FIG. 1 is a functional block diagram of a structured-document processing device 100. The structured-document processing device 100 includes state-transition-diagram information storing means 101, selection-pair extracting means 102, matchingness deciding means 103, node qualifying means 104, transition-history information generating means 105, and degree-of-approximateness detecting means 106. With regard to a source structured document 109 which is designed to be able to be partitioned into a plurality of source nodes as a plurality of nodes concerning the respective structure partitions, the state-transition-diagram information storing means 101, stores, as state-transition-diagram information, information concerning a state transition diagram representing source nodes of the source structured document 109, which transit from one to another in order of occurrence from the head of the source structured document. With regard to a new structured document 110 which is designed to be able to be partitioned into a plurality of new nodes as a plurality of nodes concerning the respective structure partitions, the selection-pair extracting means 102 extracts, as a selection pair, a pair consisting of one of the new nodes of the new structured document 110 and corresponding one of the source nodes of the state transition diagram, in accordance with order in which the new nodes occur from the head of the new structured document, and in accordance with order in which the source nodes transit from one to another in the state transition diagram. The matchingness check means 103 determines whether there is matchingness between the source node and the new node in each of the selection pairs, on the basis of descriptions respectively of the source node and the new node. With regard to the source node and the new node of the selection pair, the node qualifying means 104 qualifies the source node as a node to be used for the new node when it is decided that there is matchingness between the source node and the new node. The transition-history information generating means 105 generates, as transition-history information, information concerning a transition history which goes on through a plurality of nodes to be used in a state transition diagram in order of transition. The degree-of-approximateness detecting means 106 detects a degree of approximateness between the source structured document 109 and the new structured document 110 on the basis of the transition-history information.

Figure 18:
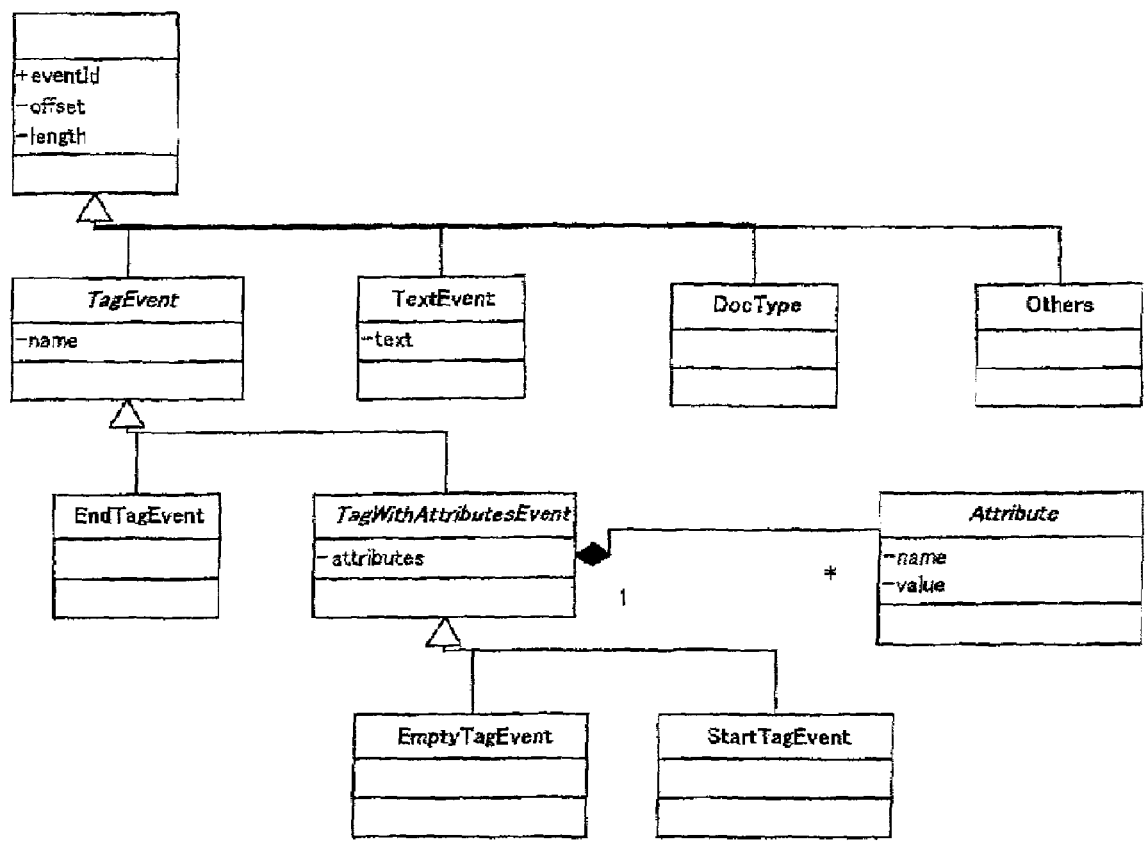
FIG. 18 is a diagram showing a data structure with which to store a result of parsing an XML document.
Figure 27:
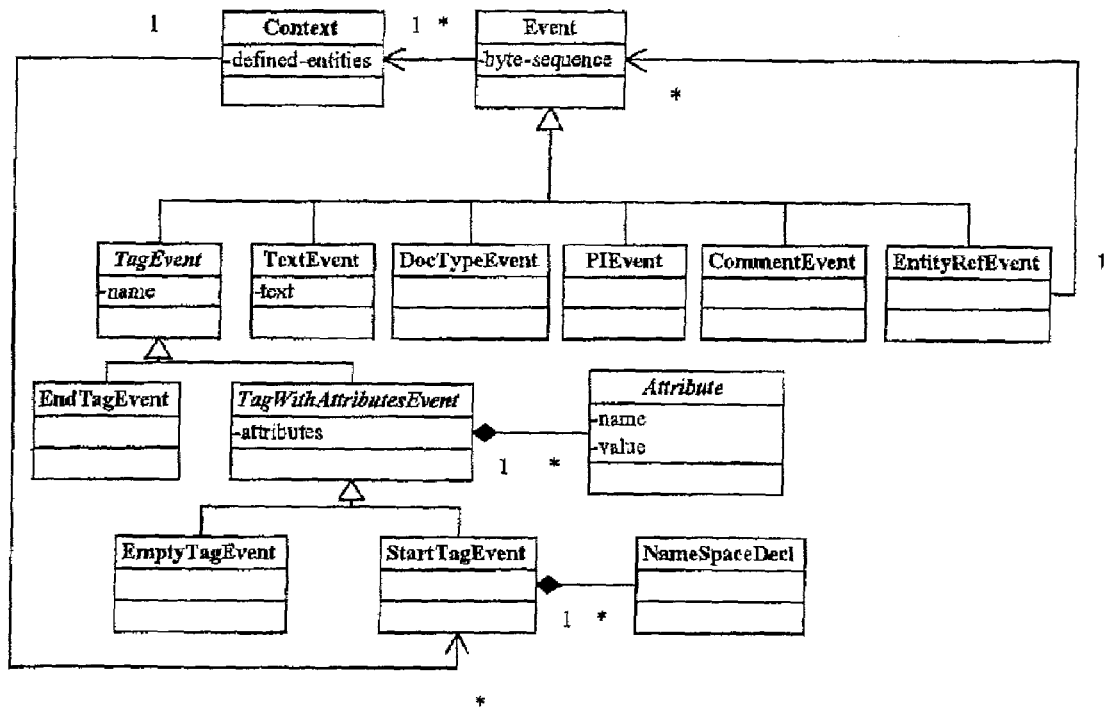
FIG. 27 is a diagram showing, in the form of a UML class diagram, nodes which are registered as states in a state transition diagram of a state machine.

The difference between the structured-document processing device 100 of FIG. 1 and a structured-document processing method 130 of FIG. 3 which will be described later comes only from the difference between a device category to which the device 100 belongs and a method category to which the method 130 belongs. Technological contents realized by the device 100 are substantially the same as those realized by the method 130. For this reason, descriptions will be provided for the structured-document processing device 100, having the device 100 represent the method 130. The source structured document 109 and the new structured document 110 are, for example, in the form of an XML document and an SGML document. In the XML document, a node is, for example, an equivalent to a leaf node as shown in FIGS. 18 and 27, both of which will be described later, corresponding to an event of an SAX interface. In other words, a node in an XML document is any one of a tag (a description part from a "<" to the next ">") and a contents portion (a description part outside the tag). Typically, there are a plurality of source structured documents 109. In this case, for example, the structured-document processing device 100 locates a single source structured document 109, which is the most approximate to the new structured document 110, out of the plurality of source structured documents. Alternatively, the device 100 locates a single source structured document, which is approximate to the new structured document 110 to an extent of satisfying the criteria, out of the plurality of source structured documents.

FIG. 1 shows an example of a ratio of the number of the source structured document 109 to the number of the new structured document 110 which is 1:1. However, a case where the ratio is n:1 (n is an integer equal to, or larger than, 2) is not excluded. In a case where the number of the source structured document 109 is 1, it is examined how approximate to the new structured document 110 the single source structured document 109 is. In a case where the number of the source structured document 109 is n, it is examined how approximate to the new structured document 110 all or some of the source structured documents 109 are.

In a typical case, when the matchingness deciding means 103 decides that there is no matchingness between a selection pair, which the selection-pair extracting means 102 has extracted, the selection-pair extracting means 102 does not change, but keeps, the new node in the selection pair which has been decided that there is no matchingness. Concurrently, the selection-pair extracting means 102, from the source node in the same selection pair, a source node which comes next in order of node transition. In other words, the selection-pair extracting means 102 updates contents of the selection pair. Subsequently, the selection-pair extracting means 102 has the matchingness deciding means 103 once again make a decision on the matchingness. When it is decided that the new node has no matchingness with any source node in the state transition diagram, the selection-pair extracting means 102 changes the new node in the same selection pair into a new node which is to come next in order of occurrence.

Figure 32:
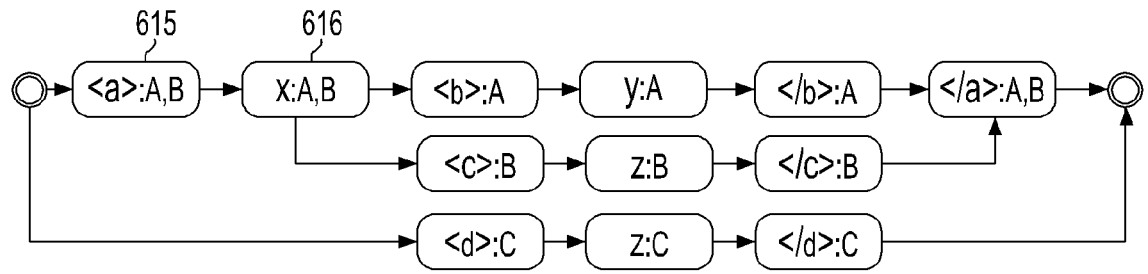
FIG. 32 is a state transition diagram concerning a plurality of XML documents.

When there are a plurality of source structured documents 109, there may be a state transition diagram for each of the source structured documents 109. Alternatively, there may be a single state transition diagram common to all of the source structure documents 109 (for example, as shown in FIG. 32). In a case where a state transition diagram exists for each of the source structured documents 109, the selection-pair extracting means 102 is to search for a source node on the side of a source structured document 109, whose degree of approximateness to the new structured document 110 is going to be examined, in a selection pair, by use of a state transition diagram exclusive for the source structure document 109 to be investigated. When a single state transition diagram common to all of the source structured documents 109 exists, a state transition which would occur commonly in the same plurality of source structured documents 109 would be put together into a single state transition in a state transition diagram in a typical case (for example, a transit from a state designated by reference number 615 to a state designated by reference number 616 with regard to structured documents A and B in FIG. 32).

Figure 43:
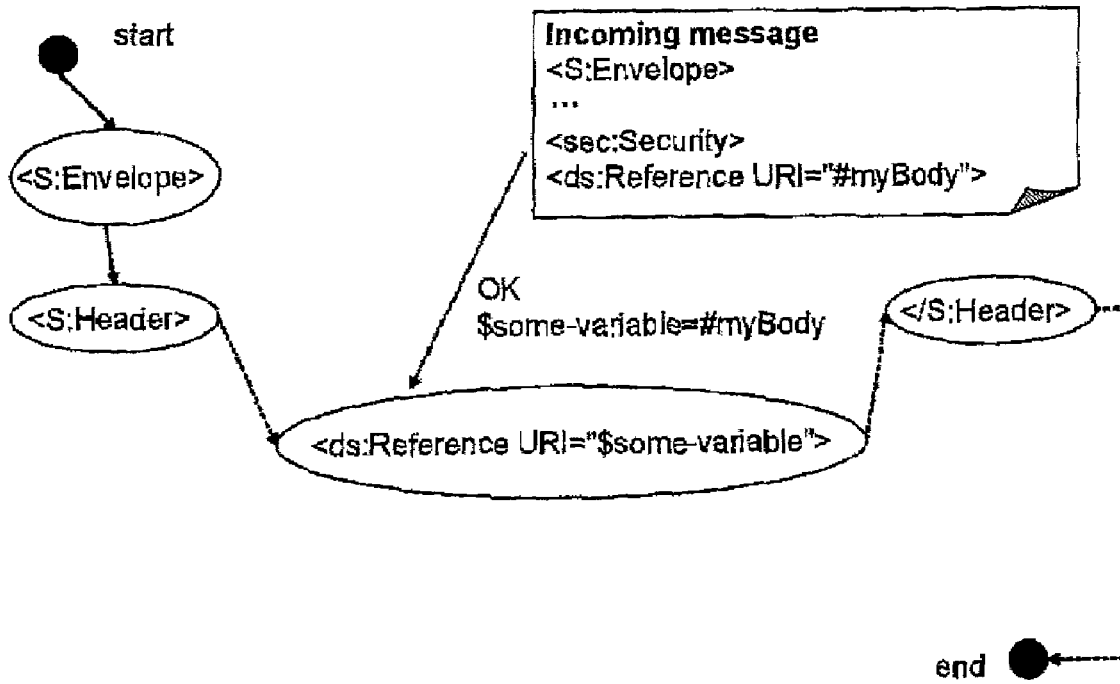
FIG. 43 is a diagram illustrating how an attribute value and a text are extracted from the incoming message.

In a typical case, matchingness between a source node and a new node in a selection pair is a complete match in description between the source node and the new node. However, the matchingness is not limited to this. As shown in FIG. 43, which will be described later, even if a source node and a new node in a selection pair have the respective different values of an attribute (for example, URI) while the source node and the new node share the same element name (for example, ds:Reference), it can be decided that there is matchingness between the source node and the new node. It is preferable that criteria be set for use of a result of parsing a source structured document 109 as a result of parsing a new structured document 110, and that, accordingly, if a difference between the source node and the new node of a selection pair is so negligible as to satisfy the criteria, it be recognized that the result of parsing the source structured document 109 is worth being used to parse the new structured document 110, thereby deciding that there is matchingness between the source node and the new node.

The following lists examples of use of the structured-document processing device 100.

(a1) an SAX (Simple API for XML) interface: This examines approximateness between a single source structured document 109 and a single new structured document 110. If a degree of approximateness is higher than a criterion value, the SAX interface uses a result of parsing the source structured document 109 as a result of parsing the new structured document 110.

(a2) another SAX interface: This locates a single source structured document 109, which is the most approximate to a new structured document 110, out of a plurality of source structured documents 109. Alternatively, the SAX interface locates a single source structured document 109 whose approximateness to the new structured document 110 is higher than a criterion value. Accordingly, a result of parsing the located source structured document 109 is used as a result to parsing the new structured document 110.

(b) The conjecturing of a document class of a new structured document 110 on the basis of approximateness of the new structured document 110 to each of the source structured documents 109. Alternatively, the associating of a source structured document 109 with a new structured document 110.

(c) A device for assisting a university professor in understanding what report(s) out of a multitude of reports, which had already been turned in, a report which has been newly turned in is approximate to. In addition, a device for assisting a university professor in understanding what makes similar reports, which have been turned in, look the same and different.

In this manner, the structured-document processing device 100 can detect approximateness between a single source structured document 109 and a new structured document 110, or approximateness between each of a plurality of source structured document 109 and a new structured document 110, efficiently and at a higher speed by use of an state machine.

Figure 2:
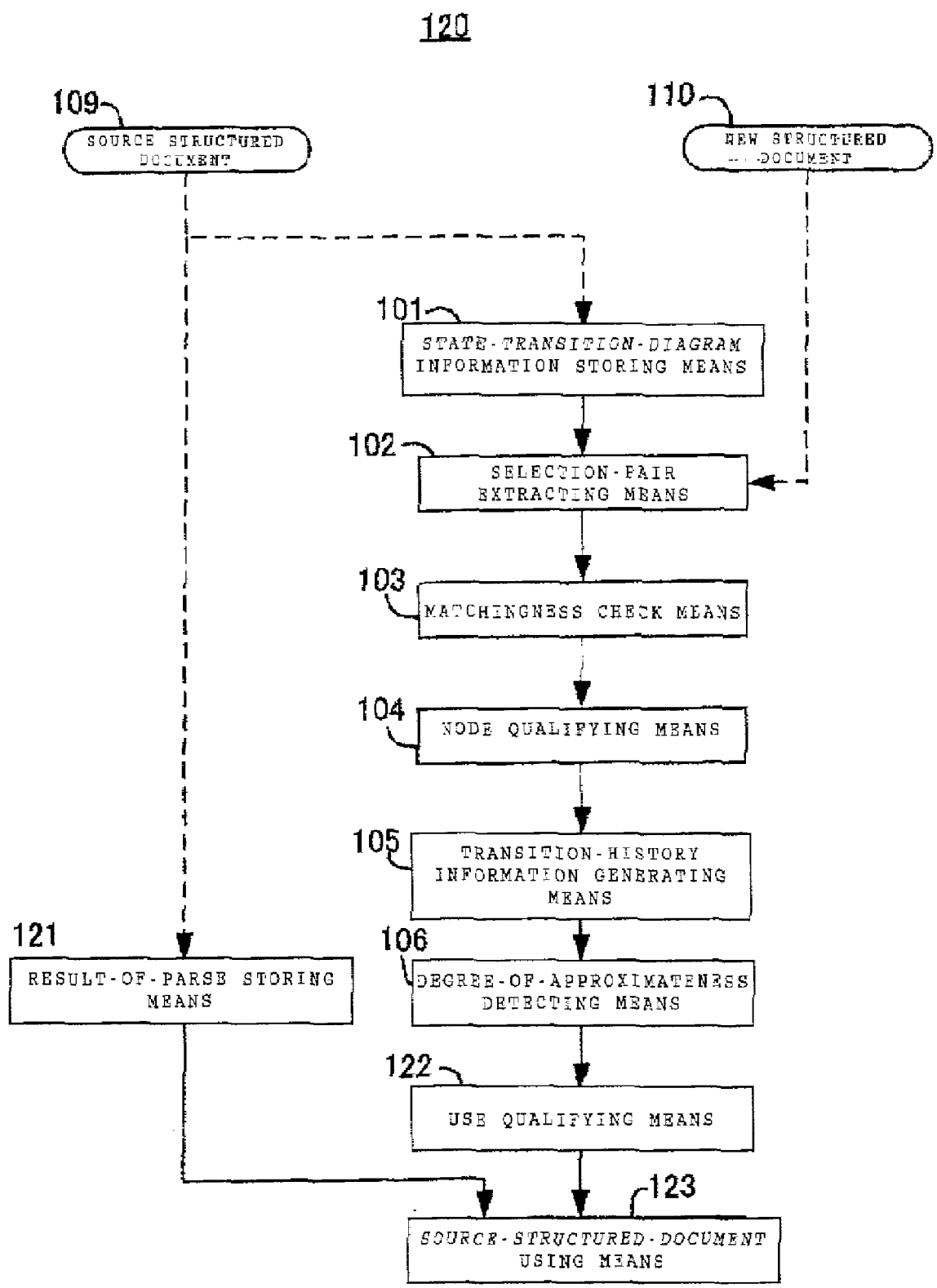
FIG. 2 is a functional block diagram of a second structured-document processing device.

FIG. 2 is a functional block diagram of a structured-document processing device 120. The structured-document processing device 120 includes state-transition-diagram information storing means 101, selection-pair extracting means 102, matchingness deciding means 103, node qualifying means 104, transition-history information generating means 105, degree-of-approximateness detecting means 106, result-of-parsing storing means 121, use qualifying means 122, and source-structured-document using means 123. All of the means 101 to 106 in the structured-document processing device 120, ranging from the state-transition-diagram information storing means 101 to the degree-of-approximateness detecting means 106, are the same as those in the structured-document processing device 100 of FIG. 1. Descriptions will be provided for differences between the structured-document processing device 120 and the structured-document processing device 100. The result-of-parsing storing means 121 stores a result of parsing each of the nodes in a source structured document 109. The use qualifying means 122 qualifies a source structured document 109 as a structured document to be used for a new structured document 110 when the approximateness between the source structured document 109 and the new structured document 110 is higher than a criterion value. The source-structure-document using means 123 uses a result of parsing a node to be used for a new node, the node being a node in a structured document to be used for the new structured document 110, as a result of parsing the new node of the new structured document 110.

The difference between the structured-document processing device 120 of FIG. 2 and a structured-document processing method 140 of FIG. 4 which will be described later comes only from the difference between a device category to which the device 120 belongs and a method category to which the method 140 belongs. Technological contents realized by the device 120 are substantially the same as those realized by the method 140. For this reason, descriptions will be provided for the structured document processing device 120, having the device 120 represent the method 140. "When the approximateness between the source structured document 109 and the new structured document 110 is higher than a criterion value" does not exclude when a source structured document 109, which is the most approximate to a new structured document 100, is selected in a case where there are a plurality of source structured documents 109. However, the source structured document 109 which is the most approximate needs to satisfy a condition of "when the approximateness between the source structured document 109 and the new structured document 110 is higher than a criterion value." With regard to a source structured document 109 which has been qualified as a structured document to be used for the new structured document 110, a result of parsing its predetermined source node (node to be used) is used as a result of parsing a new node corresponding to the new structured document 110. The reason for this is that, when the approximateness between the source structured document 109 and the new structured document 110 is higher than a criterion value, parsing can be carried out at a higher speed by parsing the new structured document 110 by use of a result of parsing concerning the source structured document 109 on which parsing has already been performed than parsing carried out by parsing the whole of the new structured document 110. A criterion value to be used in the use qualifying means 122 is set from a viewpoint of whether or not use of a result of parsing the source structured document 109 can contribute to carrying out parsing of the new structured document 110 at a higher speed. In a case where the structured-document processing device 120 is applied to an SAX interface, if the source structured document 109 did not have a source node which is an equivalent to a node to be used for a new node, the new node needs to be parsed newly. In a case where the structured-document processing device 120 is applied to parsing of an SOAP message in the Web service, a result of parsing the source structured document 109 is prepared in advance, for example, as a template (for example, as shown in FIG. 40). Accordingly, data which have been extracted from the new structured document whenever deemed necessary are filled in blanks in the template, and thereby a result of parsing for the new structured document 110 is completed.

The structured-document processing device 120 uses a state machine, thereby making it possible to locate, at a higher speed, a source structured document 109 having a result of parsing which can be used as a result of parsing a new structured document 110. In addition, it is made possible to locate, at a higher speed, a template which can be used as parsing of a SOAP message.

Figure 3:
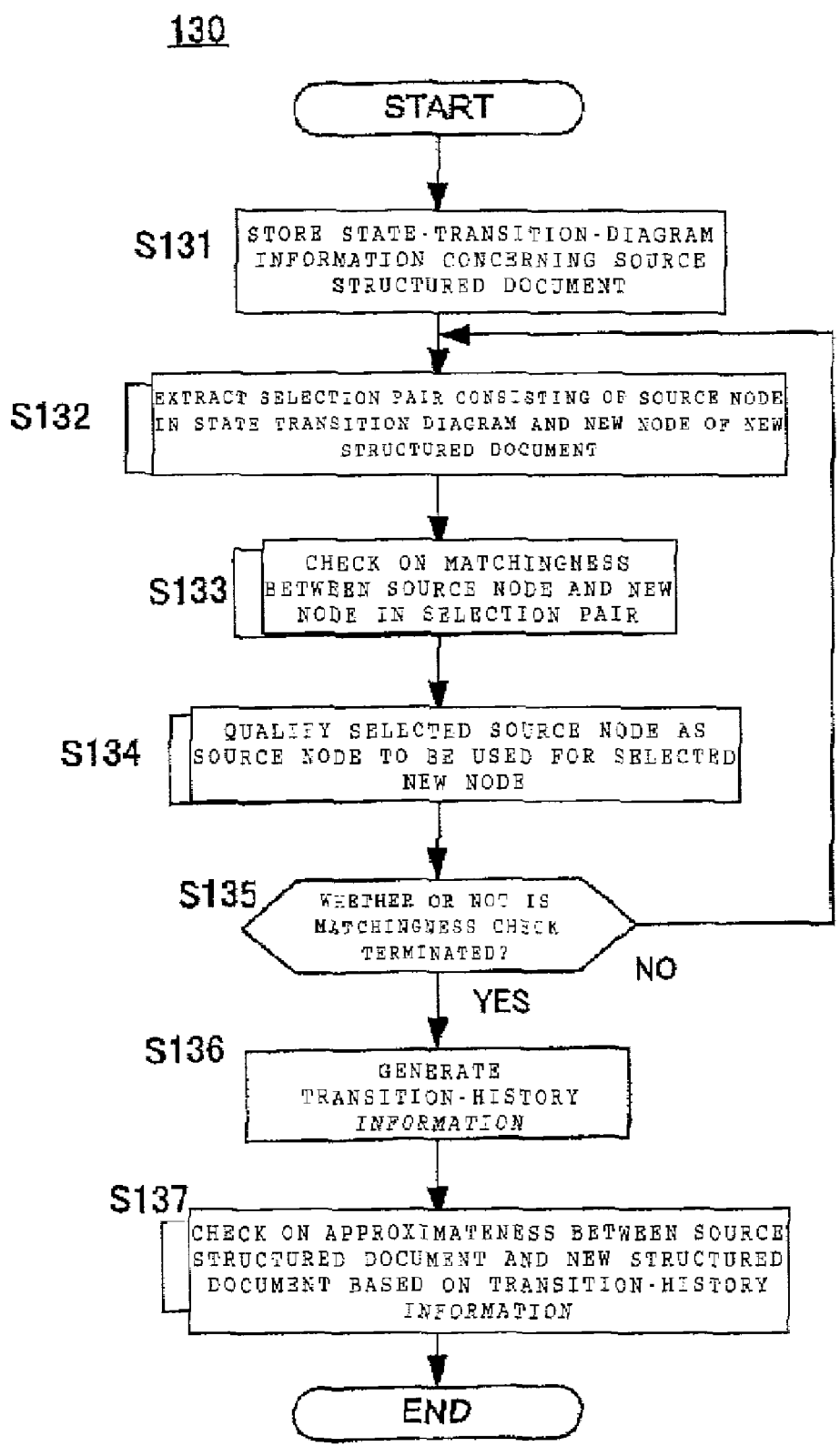
FIG. 3 is a flowchart of a first structured document processing method.

FIG. 3 is a flowchart of a structured document processing device 130. In S131 (a step of storing state-transition-diagram information), for a source structured document which is designed to be able to be partitioned into a plurality of source nodes as a plurality of nodes concerning the structure partition, information concerning a state transition diagram, in which source nodes of the source structured document transit from one to another in order of occurrence from the head of the source structured document, is stored as state-transition-diagram information. In step S132 (a step of extracting a selection pair), for a new structured document which is designed to be able to be partitioned into a plurality of new nodes as a plurality of nodes concerning the structure partition, a pair of each of the new nodes of the new structured document and each of the source nodes of the state transition diagram, the new node and the source node corresponding to each other, is extracted as a selection pair in accordance with order in which the new nodes of the new structured document occur from the head, and in accordance with order in which the source nodes transit from one to another in the state transition diagram. In step S133 (a step of deciding matchingness), it is determined whether there is matchingness between the source node and the new node in each of the selection pairs, on the basis of descriptions respectively of the source node and the new node. In step S134 (a step of qualifying a node), for the source node and the new node of the selection pair, the source node is qualified as a node to be used for the new node when it is decided that there is matchingness between the source node and the new node.

In step S135, it is determined whether or not a decision on the matchingness needs to be terminated. If a result of the determination is YES, the processing proceeds to step S136. If the result of the determination is NO, the processing returns to step S132. The case where a result of the determination in step S135 is YES is such as a case where a determination on the matchingness is terminated concerning each of the nodes in a new structured document 110, and a case where it is decided that a determination on the matchingness is no longer worth being continued concerning a new structured document 110 because the number of new nodes in the new structured document 110 which have no matchingness with any source nodes in a state transition diagram becomes higher than a predetermined value.

In step S136 (a step of generating transition-history information), information concerning a transition history, which goes on through a plurality of nodes to be used in a state transition diagram in order of transition, is generated as transition-history information. In step S137 (a step of detecting a degree of approximateness), a degree of approximateness between the source structured document 109 and the new structured document 110 is detected on the basis of the transition-history information.

Figure 4:
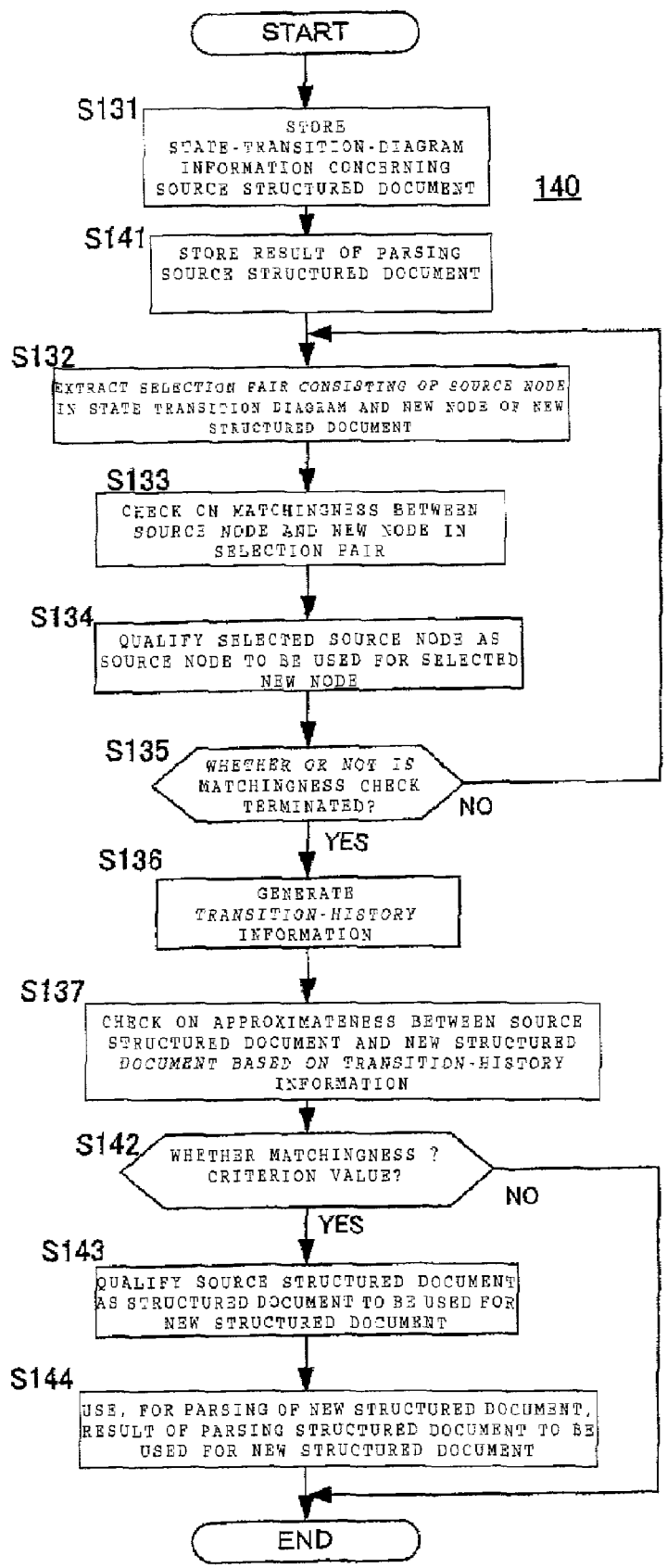
FIG. 4 is a flowchart of a second structured document processing method.

FIG. 4 is a flowchart of another structured-document processing method 140. The same reference numerals designates steps in the structured-document processing method 140 which are the same as those in the structured-document processing method 130 (shown in FIG. 3). Descriptions will be provided for differences between the method 140 and the method 130.

In step S141 (a step of storing a result of parsing), a result of parsing concerning each of the nodes of a source structured document is stored. Incidentally, step S131 and step S141 may be replaced with each other in terms of their orders. In step S142, it is determined whether or not approximateness which has been detected in step S137 is higher than a criterion value. Only when a result of the determination is YES, the processing proceeds to a subsequent step of using the source structured document 109 as the following processing.

In step S143 (a step of qualifying use), when the approximateness between the source structured document and the new structured document is higher than a criterion value (a result of the determination in step S142 is YES), the source structured document is qualified as a structured document to be used for the new structured document. In step S144 (a step of using a source structured document), a result of parsing the node to be used for the new node in the structured document to be used for the new structured document is used as a result of parsing the new node of the new structured document.

Here, "the structured-document processing device 100 and the like" is meant to designate the structured-document processing device 100 (shown in FIG. 1) and the structured-document processing device 120 (shown in FIG. 2), both of which have already been described above, as well as a structured-document processing device 210 (shown in FIG. 6), a structured-document processing device 220 (shown in FIG. 7), a structured document processing device 300 (shown in FIG. 13), and a structured-document processing device 320 (shown in FIG. 14), the four of which will be described later. In addition, "the structured-document processing method 130 and the like" is meant to designate the structured-document processing method 130 (shown in FIG. 3) and the structured-document processing method 140 (shown in FIG. 4), both of which have already been described above, as well as a structured-document processing method 250 (shown in FIG. 8), a structured-document processing method 260 (shown in FIG. 9), a structured-document processing method 270 (shown in FIGS. 10 to 12), a structured-document processing method 340 (shown in FIG. 15), a structured-document processing method 360 (shown in FIG. 16), and a structured-document processing method 380 (shown in FIG. 17), the six of which will be described later. The structured-document processing device 100 and the like as well as the structured-document processing method 130 and the like can be realized by use of hardware, by use of software, or by use of a combination of hardware and software. In a case where the structured-document processing device 100 and the like as well as the structured-document processing method 130 and the like are realized by use of a combination of hardware and software, the realizing of a computer system having a predetermined program installed thereon can be listed as a typical example of them. In such a case, the predetermined program is loaded into the computer system and executed, whereby the program controls the computer system, and thus causes the computer system to carry out processes concerning the structured-document processing device 100 and the like.

This program is constituted of a group of commands which are capable of being described by use of an arbitrary language, an arbitrary code and an arbitrary notation. Such a group of commands enables the computer system to carry out a specific function directly. Alternatively, the group of commands enables the computer system to carry out a specific function after one or both of the following are performed: (a) conversion into another language, another code or another notation; and (c) duplication into other media is performed. It goes without saying that the structured-document processing device 100 and the like include, within its scope, not only such a program itself but also media in which the program is stored. A program for carrying out the functions of the structured-document processing device 100 and the like can be stored into arbitrary computer-readable storage media such as a flexible disc, an MO, a CD-ROM, a DVD, a hard disc drive, a ROM, an MRAM, and a RAM. In order to store such a program into storage media, the program can be downloaded from another computer which is connected through a communications line, or can be duplicated from other storage media. In addition, such a program can be compressed, or can be partitioned into a plurality of sections, thereby enabling the program to be stored into a single storage medium, or into a plurality of storage media.

Figure 5:
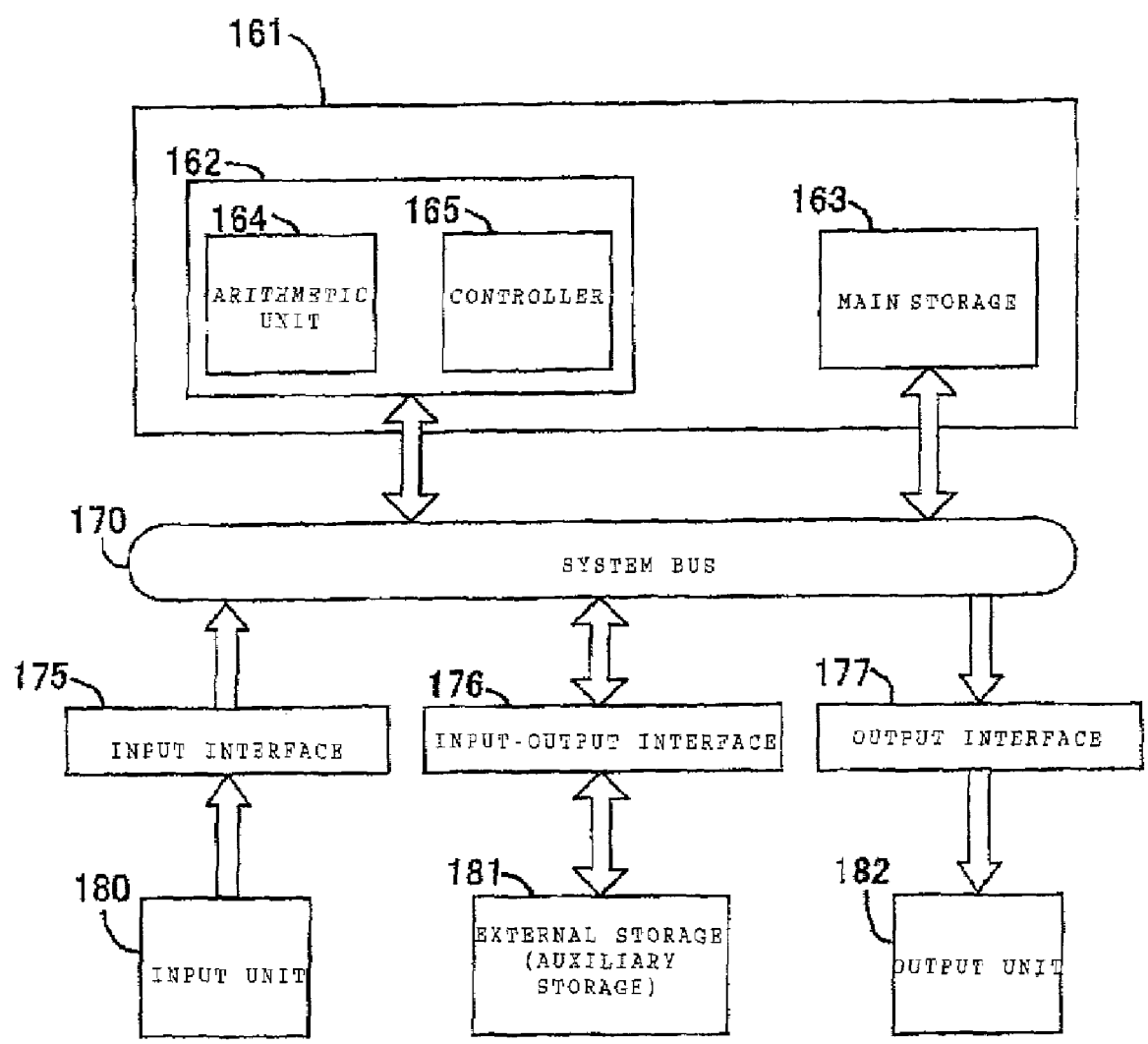
FIG. 5 is a schematic configuration diagram of a computer into which a program for the structured-document processing device and the like, and for the structured-document processing method and the like, are installed.

FIG. 5 is a schematic configuration diagram of a computer 160 into which a program for the structured-document processing device 100 and the like, or for the structured-document processing method 130 and the like, is installed. The program causes the computer 160 to function as each means of the structured-document processing device 100 and the like. Alternatively, the program causes the computer 160 to execute each of the steps of the structured-document processing method 130 and the like. A computer main body 161 includes a CPU 162 and a main storage 163. The CPU 162 further includes an arithmetic unit 164 and a controller 165. The arithmetic unit 164 does things such as arithmetic, comparison and decision. The controller 165 controls the main storage 163, the arithmetic unit 164 and the like. A system bus 170 is constituted of a data bus, an address bus and a control bus. The system bus 170 is connected with the CPU 162, the main storage 163, an input interface 175, an input-output interface 176 and an output interface 177. An input device 180 is such as a keyboard, a read-only CD drive and the like. The input device 180 feeds data into the system bus 170 through the input interface 175. An external storage 181 is such as an HD (hard disc) drive, a readable/writable CD drive and the like. The external storage 181 feeds data into the system bus 170, and accepts data from the system bus, through the input-output interface 176. An output unit 182 is such as a display and a printer, and receives data from the system bus 170 through the output interface 177. A program for the structured-document processing device 100 and the like is stored, for example, in the external storage 181 such as an HD drive, and is loaded into the main storage 163 when the program is going to be executed.

Figure 6:
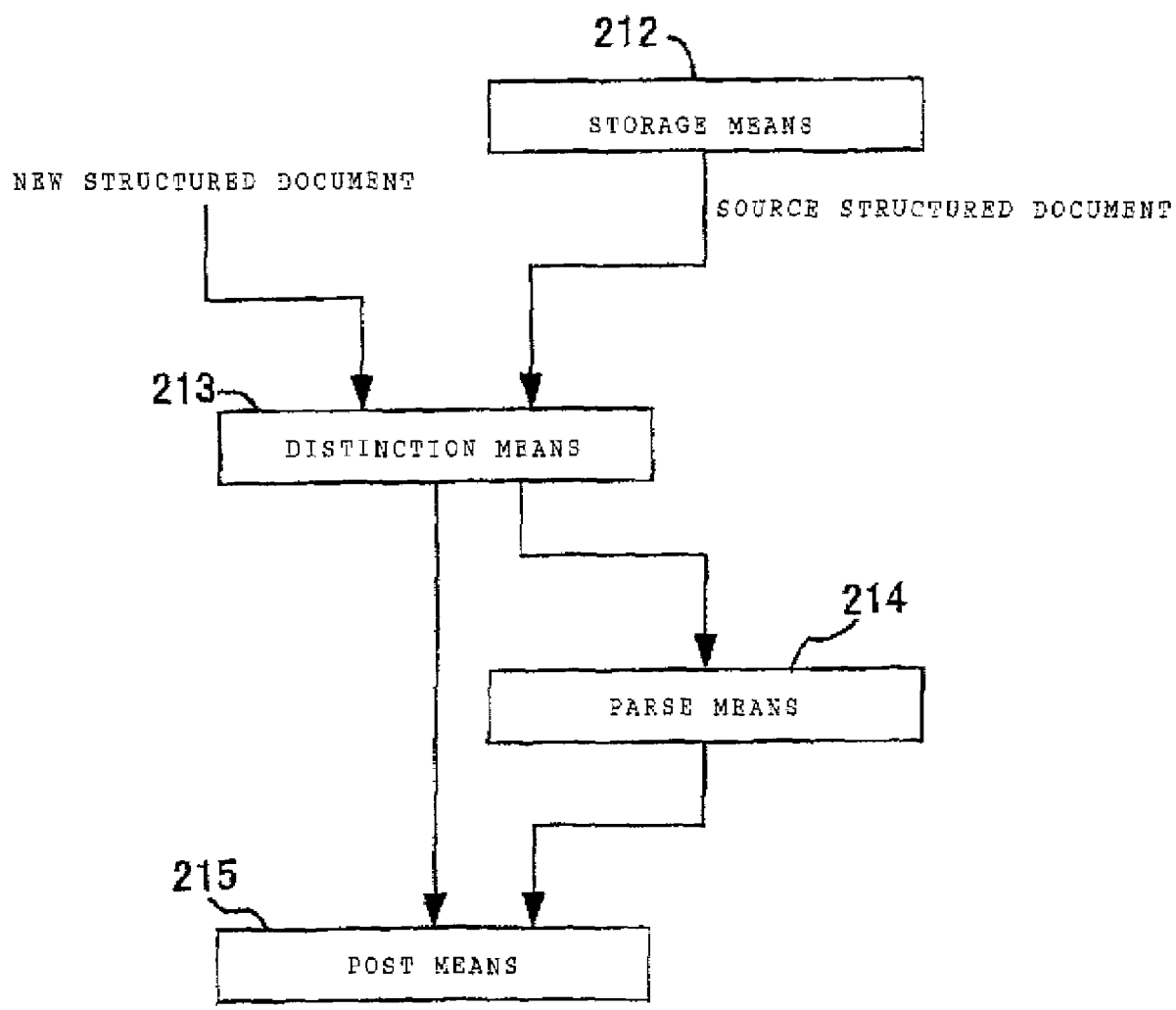
FIG. 6 is a functional block diagram of yet a third structured-document processing device.

FIG. 6 is a functional block diagram of the structured-document processing device 210. The structured-document processing device 210 parses a structured document in response to a request from an application program to parse the structured document, thereby posts a result of parsing the structured document to the application program. The structured-document processing device 210 includes storage means 212, distinction means 213, parsing means 214 and posting means 215. With regard to a source structured document as a structured document which has been parsed, the storage means 212 stores its contents as source contents, and stores a result of parsing the structured document as a source result of parsing. With regard to a new structured document as a structured document which the application program requests to be parsed, the distinction means 213 compares contents of the new structured document and the source contents of the source structured document by use of their respective contents portion which correspond to each other in a predetermined manner. The distinction means 213 distinguishes each of the contents portions of the new structured document between a first contents portion and a second contents portion: the first contents portion is a contents portion of the new structured document for which a source result of parsing the source structured document can be used, and the second contents portion is a contents portion of the new structured document for which a source result of parsing the source structured document can not be used. The parsing means 214 parses the second contents portion of the new structured document, thereby outputting a new parsed part as the result of parsing. With regard to a result of parsing the first contents portion of the new structured document, the posting means 215 posts to the application program a part of the source result of parsing of the source structured document corresponding to the first contents portion. With regard to a result of parsing of the second contents portion of the new structured document, the posting means 215 posts to the application program a part which has been newly parsed.

Not only in the structured-document processing device 210, but also in the structured-document processing device 220 and the structured document processing method, both of which will be described later, a structured document is such as the SGML (Standard Generalized Markup Language) or an XML document. The storage means 121 and the below-mentioned storage means 221 are such as a hard disc drive and a cache memory. Storage in a cache memory disappears when the computer is turned off. For this reason, in order to use a result of parsing a source structured document the next time the computer is activated, data concerning the result of parsing the source structured document in the cache memory need to be stored in the hard disc drive, whenever deemed necessary, for the backup purpose.

Usually, a lexical analysis of a structured document and a check on a form of the structured document are needed to parse the structured document. Accordingly, a process of parsing a structured document includes a process of analyzing the structured document lexically and a process of checking on the form of the structured document. For this reason, it is natural that a structured document whose result of parsing is stored into the storage means 212 and 221 should have been gone through a lexical analysis and a check on the form of the structured document. A typical parsing which covers a lexical analysis and a check on a form includes the following processes.

(a) a process of decoding a character code of an XML document into predetermined characters in a Unicode.

(b) a process of recognizing a tag in a character sting in the XML document, and of checking on the basis of the recognition whether or not a character string of each of an element name, an attribute name, an attribute value and a text node satisfies an XML generating rule.

(c) in a process in the namespace, a process of recognizing a declaration of the namespace, and binding the URI of the namespace on the basis of the suffixes respectively of an element and an attribute thereof.

A result of parsing a source structured document to be stored in the storage means 212 may be information concerning tree structure of a DOM (document Object Model) interface, or may be information concerning a series of events of an SAX (Simple API for XML) interface. For the distinction between the first and second contents portions in the distinction means 213, criterion is used whether or not a contents portion of a new structured document and a contents portion of a source structured document, which are compared with each other, match each other. If the compared contents portions match each other, it is determined that the contents portion of the new structured document is a first portion. If the compared contents portions do not match each other, it is determined that the contents portion of the new structured document is a second portion. In a case where a result of parsing is in the form of information concerning an event, a contents portion of a new structured document and a contents portion of a structured document, which are compared with each other, may correspond to the event.

Since, in a case where the result of parsing the new structured document is posted to the application program, the first contents portion out of the contents of the new structured document is not parsed newly, and a portion of a result of parsing concerning the source structured document which has already been parsed, the portion corresponding to the first contents portion, can be used for the first contents portion, a time needed to parse the whole of the new structured document can be shorten.

Figure 7:
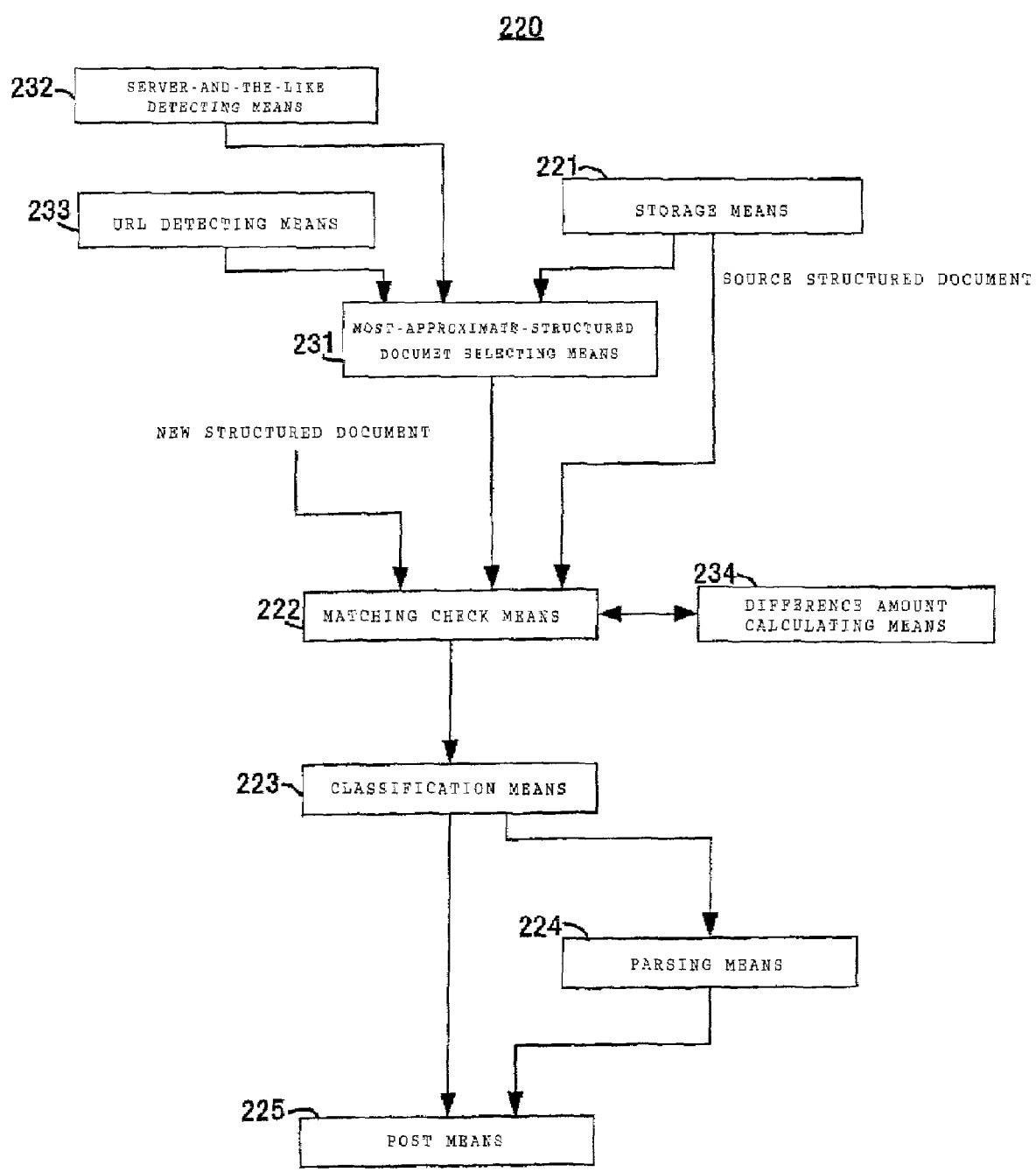
FIG. 7 is a functional block diagram of still a fourth structured-document processing device.

FIG. 7 is a functional block diagram of another structured document processing device 220. The structured-document processing device 220 parses a structured document in response to a request from an application program to parse the structured document, thereby posts a series of events as a result of parsing the structured document to the application program. The structured-document processing device 220 includes storage means 221, match check means 222, classification means 223, parsing means 224 and posting means 225. With regard to a source structured document as a structured document which has already been parsed, the storage means 221 stores the contents of the source structured document as source contents, and stores a result of parsing each of the structured partitions of the source structured document as a source parsed partition. The match check means 222 performs a match check on whether or not source contents of a source structured document and contents of a new structured document as a structured document which an application program requests to be parsed match each other by comparing a pair consisting of one of the structured partitions of the source structured document and corresponding one of the structured partitions of the new structured document, one by one in order from the heads of the source and new structured documents. The classification means 223 classifies each of the structured partitions of the new structured document into two categories, or a first-class structured partition and a second class structured partition, on the basis of a decision on whether or not the source contents of the source structured document and the contents of the new structured document match each other. The parsing means 224 parses a structured partition which the classification means 223 has classified as a second-class structured partition, thereby generating a new parsed partition as a result of parsing the structured partition. The posting means 225 posts to the application program an event concerning each of the structured partitions in order from a structured partition in the head of the new structured document to a structured partition in the tail of the new structured document. If each of the structured partitions of the new structured document is the first-class structured partition, the posting means 225 posts to the application program an event concerning a source parsed partition of the source structured document corresponding to the structured partition as a result of parsing the structured partition. If each of the structured partitions of the new structured document is the second-class structured partition, the posting means 225 posts to the application program an event concerning a new structured partition corresponding to the structured partition as a result of parsing the structured partition.

The structured document processing device 220 is, for example, an SAX interface. The structured partition is, for example, a partition which can be associated with an SAX event. As for the structured partition, the structured partition may be associated with an event which has been defined in the SAX, or a designer may add a new event to the event which has been defined in the SAX, or may integrate a plurality of events into one. However, when the designer intends to pursue the event addition or the event integration, such an event needs to be one which can be converted to the event which has been defined in the SAX. As described below, the event of the SAX and the event which the designer added or integrated are termed as "event type."

The structured document processing device 220 does not parse all of the contents of a new structured document. Instead, the structured document processing device 220 parse only a structured partition which contents of the new structured document does not match contents of the source structured document. The rest of the contents portions of the new structured document deals with the posting of an event to the application program by use of source parsed partitions concerning the source structured document corresponding to the rest of the contents portions. Accordingly, time needed for parsing the new structured document can be reduced.

Each of the below-described functions can be added to the structured document processing device 220 by arbitrarily combining one function with another when deemed necessary. The functions include not only functions which are newly added but also functions which have been installed, and which are implemented. These functions are achieved by adding means and/or by implementing contents to be processed by means which have been installed.

Descriptions will be provided for functions which are contributed to by the parsing means 224, the match check means 222 and the posting means 225. The parsing means 224 includes, in its parsing of a structured partition, a check which is made on the basis of the result of the parsing, and which is on whether or not a new structured document is a non well-formed structured document. If a result of performing a match check on a structured partition of the new structured document is NO, the match check means 222 holds a match check on the following structured partition until a check by the parsing means 224 on whether or not the new structured document is a non well-formed structured document is completed. If it is decided by the check that the new structured document is a non well-formed structured document, a match check on the new structured document is aborted. If it is decided by the check that new structured document is the non well-formed structured document, the posting means 225 posts to the application program a notice that the new structured document is the non well-formed document, in stead of posting an event.

According to a SAX rule, in a case where a structured document which the application program requests to be parsed is a non well-formed structured document, a notice that the structured document is the non well-formed structured document is designed to be posted to the application program, in stead of a notice concerning a series of events as a result of parsing the structured document in order of structured partitions of the structured document. Specific non well-formed structured documents include, for example, a structured document in which a start tag name does not match an end tag name, and a structured document in which one element has two or more same attribute names. Incidentally, a valid XML document is a special case out of well-formed XML documents. In a case where a regular well-formed XML document is intended to be parsed, only an XML syntax rule is required. However, in a case where a valid XML document is intended to be parsed, a DTD (Document Type Definition) is required in addition to the XML syntax rule. Usually, a check on whether or not a structured document is a well-formed document can not be made by use of a single structured partition on which a well-formed check is being performed in a new structured document. Accordingly, information concerning a result of the parsing ranging from a structured partition in the head of a new structured document to a structured partition in the tail of the new structured document is required. A source parsed partition corresponding to the source structured document is used for information concerning a result of the parsing related to each of first-class structured partitions in the information concerning the result of the parsing of the above-mentioned range.

With regard to a check on whether or not a new structured document is a non well-formed structured document, the check is required to be performed on contents of the new structured document from the head towards the tail until a predetermined known part is checked. According to a process of a well-formed check to be carried out by the conventional structured-document processing device, all of the contents of the new structured document have had to be parsed from the head to the known part. By contrast, according to a process of a well-formed check to be carried out by the structured-document processing device 220, with regard to a structured partition of the new structured document which is the same as that of the source structured document, the check gets to the known part with the parsing of the structured partition omitted. Accordingly, a time needed for getting to the known part is shortened. As a result, it is made possible to post the notice to the application with a check on whether or not the new structured document is a non well-formed structured document made earlier.

Descriptions will be provided for functions of the structured document processing device 220 to which the match check means 222 makes contributions. With regard to the match check means 222, a match check is designed to be made by checking on whether or not a structured partition of contents of a new structured document and a corresponding structured partition of contents of a source structured document match each other for each unit of data represented by one byte or one character from the head towards the tail.

In a case where it is checked whether or not the contents of the source structured document and the contents of the new structured document match each other for each unit of data represented by one byte or one character from the head towards the tail, a location of each piece of data in the structured document can be grasped by use of the number of bytes or characters from the head of the structured document, thereby enabling the check to be made efficiently.

Next, description is provided for the function of the structured document processing device 220 to which the storage means 221, the most-approximate-structured-document selecting means 231 and the match check means 222 make contributions. The storage means 221 stores a source content and a source parsed partition concerning a plurality of source structured documents which are different from one another. The most-appropriate-structured document selecting means 231 selects, as the most approximate structured document, a source structured document whose contents are the most approximate to contents of the new structured document, out of the plurality of source structured documents, the source contents and source parsing partitions of which are stored in the storage means 221. The match check means 222 turns the structured document concerning the match check into the most approximate structured document.

Which source structured document is the most approximate to a new structured document is determined, for example, by the below-described criteria. Even though the source structured document is not the most approximate to the new structured document, when a difference amount between the new structured document and the source structured document is within a predetermined amount, the source structured document can make a sufficient contribution to parsing the new structured document at a higher speed.

Descriptions will be provided for the functions of the structured document processing device 220 to which the server-and-the-like detecting means 232 and the most-approximate-structured document selecting means 231 make a contribution. With regard to the server-and-the-like detecting means 232, a new structured document is concerned with a response of a server to a request from a client in the Web service. The server-and-the-like detecting means 232 detects a server, and an operation, which have been requested, on the basis of the request. The most-approximate-structured-document selecting means 231 selects a most approximate structured document on the basis of the server and operation thus detected.

In the Web service, a client (requester) sends a request to a server (provider), and the server sends a client a response to this request. The client can easily estimate that a source structured document whose server and operation are the same as those of a new structured document would be approximate to the new structured document. The reason for this is that, in many cases, an application program leaves a process of generating a message, which has been encoded with the XML, performed by middleware such as a library and an application server, although an XML document is generated by the application program. In other words, there is a similarity in a byte string and a character string between XML documents which are generated by the same library, and whose contents are similar to one another. Accordingly, a time needed for a process of parsing a new structured document can be reduced by selecting, as a most approximate structured document, a source structured document whose server and operation are the same as those of the new structured document.

Descriptions will be provided for the functions of the structured document processing device 220 to which the URL detecting means 233 and the most-approximate-structured document selecting means 231. With regard to the URL detecting means 233, a new structured document is concerned with a request for the Web service. The URL detecting means 233 detects an URL to which the request is going to be sent. The most-approximate-structured document selecting means 231 selects a most approximate structured document on the basis of the URL thus detected.

A typical server assigns a single URL to a single operation. Accordingly, the server can easily estimate that a source structured document whose URL is the same as that of a new structured document would be approximate to the new structured document. Accordingly, a time needed for a process of parsing a new structured document can be reduced by selecting, as a most approximate structured document, a source structured document whose URL is the same as that of the new structured document.

Descriptions will be provided for the functions of the structured document processing device 220 to which the difference amount calculating means 234 and the classification means 223 make a contribution. The difference amount calculating means 234 increases the difference amount between contents of a new structured document and a source structured document by one unit, each time it is decided that both of them do not match each other. The classification means 223 classifies, as second class structured partitions, all of the structured partitions ranging from a structured partition, on which a match check has been performed for the last time, to a structured partition in the tail of the document, after the difference amount exceeds a threshold value.

The threshold value can be set arbitrarily. The threshold value can be set at a larger value, for example, depending on the increase in size of a new structured document. The difference amount between contents of a new structured document and contents of a source structured document is in proportion to the number of locations where the new structured document and the source document do not match each other, and the difference amount is calculated from the head to the tail of the contents of the new structured document. In addition, when the difference amount exceeds the threshold value in the middle of the new structured document, it is decided that the approximateness of the source structured document to the new structured document is small, or that use of a result of parsing the source structured document as a result of parsing the new structured document may cause much trouble. Accordingly, the comparison between the new structured document and the source structured document is terminated, thus classifying, as second class structured partitions, all of the structured partitions in the new structured document ranging from a structured partition, on which a match check has been performed for the last time, to a structured partition in the tail. Thereby, all of the structured partitions are parsed by the parsing means 224, and new parsed partitions corresponding respectively to the structured partitions are generated so that events concerning the respective new parsed partitions are posted to the application program. Incidentally, all of the structured partitions of the new structured document can be classified as second class structured partitions in stead of limiting all of the structured partitions ranging from a structured partition, on which a match check has been performed for the last time, to a structured partition in the tail. In other words, it is also possible to parse the entire new structured document.

Descriptions will be provided for the structured document processing device 220 to which the difference amount calculating means 234 and the match check means 222 make a contribution. The difference amount calculating means 234 increases the difference amount between contents of a new structured document and a source structured document by one unit, each time it is decided that both of them do not match each other. After the difference amount exceeds a threshold, the match check means 222 replaces the current source structured document with another source structured document, and the same process which has been performed on the new structured document and the pre-replaced source structured document is once again performed on the new structured document and the post-replaced source structured document from its beginning.

In some cases, a selection of a source structured document is so poor that the selected source structured document is not approximate to the new structured document unexpectedly. When a new structured document is large in size, there are some cases where the parsing of the new structured document by use of a result of parsing the source structured document is expected to take a shorter time for a parsing process than the parsing of the entire new structured document after all if the number of times of replacements of the source structured document is within a predetermined value. Accordingly, a speed at which the new structured document is parsed can be increased by using a result of parsing the source structured document for the parsing of the new structured document while limiting the number of times of replacements of the source structured document within the predetermined value.

Figure 8:
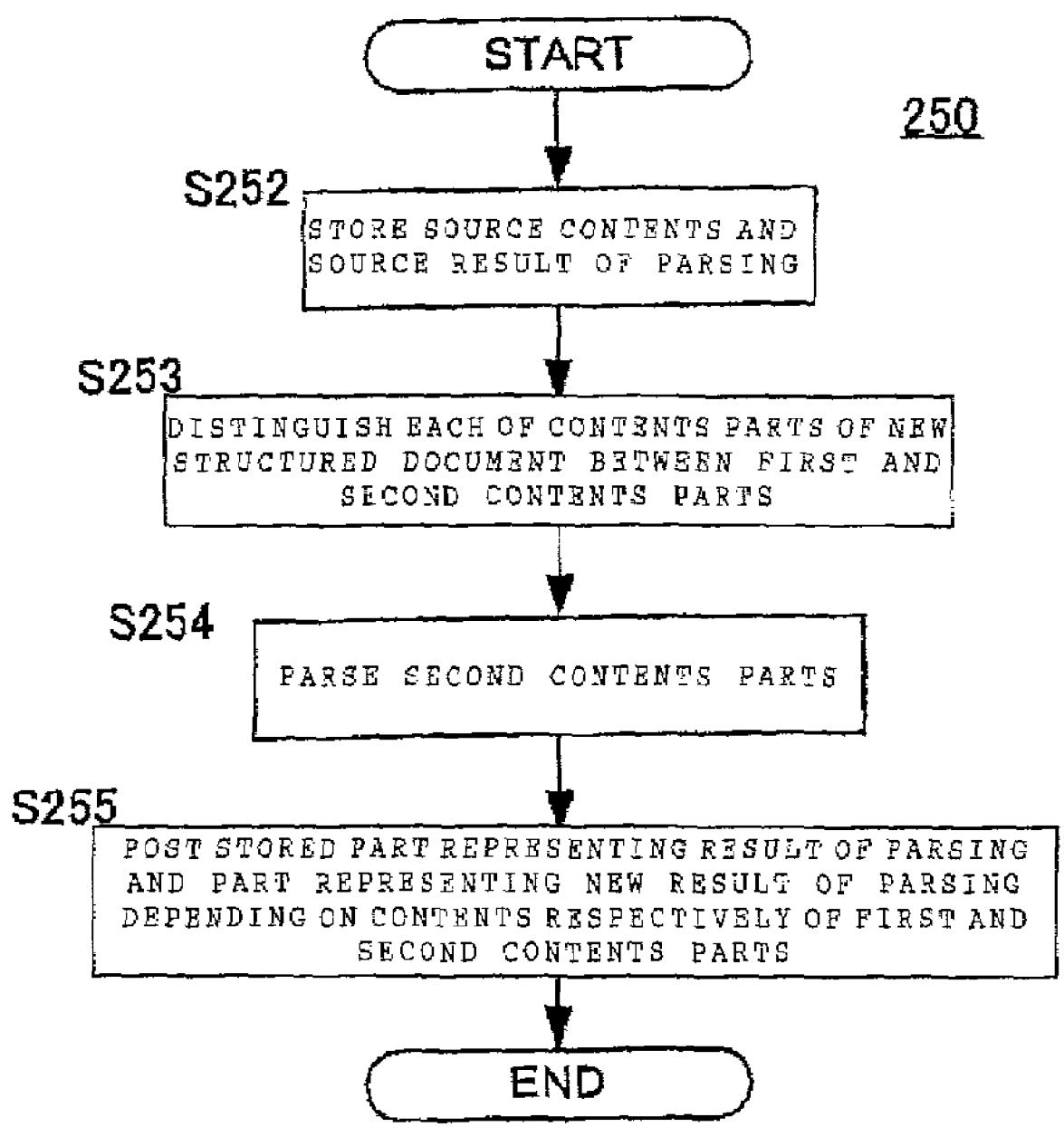
FIG. 8 is a flowchart of a third structured document processing method.

FIG. 8 is a flowchart of the structured-document processing method 250. The structured-document processing method parses a structured document in response to a request by the application program to parse the structured document, and thereby posting the result of parsing the structured document to the application program. The structured-document processing method includes S252 (a storing step), S253 (a distinguishing step), S254 (a parsing step) and S255 (a posting step). In step S252 (the storing step), with regard to a source structured document as a structured document which has been parsed, the contents of the structured document and the result of parsing the structured document are stored respectively as the source contents and the source result of parsing. In step S253 (the distinguishing step), with regard to a new structured document as a structured document which the application program has requested to be parsed, contents of the new structured document and source contents of the source structured document are compared by use of contents portions of the new structured document and corresponding contents partitions of the source structured document. Thereby, each of the contents portions of the new structured document is distinguished between a first class contents portion, for which a source result of parsing the source structured document can be used, and a second class contents portion, for which the source result of parsing the source structured document can not be used. In step S254 (the parsing step), second contents portions in the new structured document are parsed, thereby causing new parsed portions as results of parsing the second contents portions to be outputted. In step S255 (the posting step), as results of parsing the first contents portions in the new structured document, a source result of parsing the source structured document corresponding to the first contents portions in the new structured document is posted to the application program. In addition, as results of parsing the second contents portions in the new structured document, a new result of parsing is posted to the application program.

Figure 9:
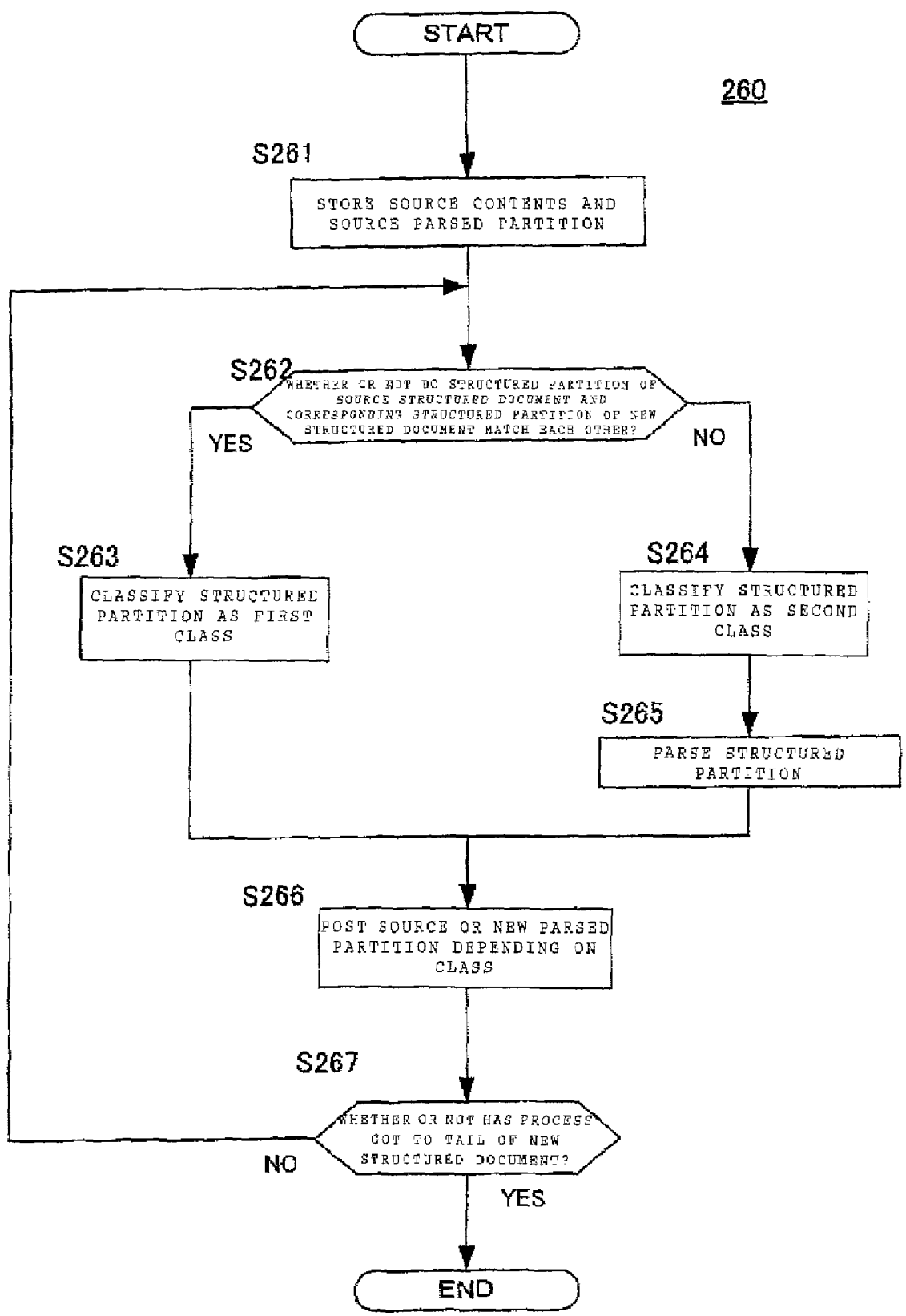
FIG. 9 is a flowchart of a fourth structured document processing method.

FIG. 9 is a flowchart of another structured-document processing method 260. The structured-document processing method 260 parses a structured document in response to a request by the application program to parse the structured document, thereby posting a series of events as a result of parsing the structured document to the application program. This structured-document processing method includes S261 (a storing step), S262 (a match check step), S263 and S264 (classifying steps), S265 (a parsing step), as well as S266 (a posting step). In S261 (the storing step), with regard to a source structured document as a structured document which has been parsed, the contents of the structured document and a result of parsing each of the structured partitions are stored respectively as the source contents and a source result of parsing. In S262 (the match check step), it is checked whether or not the source contents of the source structured document and the contents of the new structured document as a structured document which the application program has requested to be parsed match each other, by use of each of the pairs consisting of their corresponding structured partitions, and sequentially starting with a pair consisting of their corresponding structured partitions to be located in the heads respectively of the source structured document and the new structured document. In S263 and S264 (classifying steps), each of the structured partitions in the new structured document is classified into a first class structured partition or into a second class structured partition depending on whether or not the structured partition in the new structured document and the corresponding structured partition in the source structured document match each other. In S265 (the parsing step), a structured partition which has been classified as a second class structured partition in S263 and S264 (the classifying steps) is parsed, and thereby a new parsed partition as a result of parsing the structured partition is generated. In S266 (the posting step), an event concerning each of the structured partitions is posted to the application program sequentially from a structured partition in the head of the new structured document towards a structured partition in the tail of the same document. In S266 (the posting step), if each of the structured partitions in the new structured document is a first class structured partition, an event concerning a source parsed partition of the source structured document corresponding to the structured partition is posted, as a result of parsing the structured partition, to the application program. In addition, if each of the structured partitions in the new structured document is a second class structured partition, an event concerning a new parsed partition of the structured partition is posted, as a result of parsing the structured partition, to the application program.

Here, "current locations" respectively of a source structured document and a new structured document will be defined for the convenient purpose of descriptions. The "current locations" respectively of the source structured document and the new structured document mean to be locations respectively concerning a structured partition of the source structured document and a corresponding structured partition of the new structured document, both of which a match check is performed in step S262. In S267 (a decision-on-arrival-at-tail step), the current locations respectively of the source structured document and the new structured document are moved towards the tails of the respective structured documents by an amount corresponding to a structured partition which an event has been posted to the application program in S266. Thereafter, it is checked whether or not the current locations arrive at the tails respectively of the source structured document and the new structured document as a result of the movements of the current locations. If it is decided that the current locations arrive at the respective tails, this routine is terminated. If not, the process returns back to S262.

Figure 10:
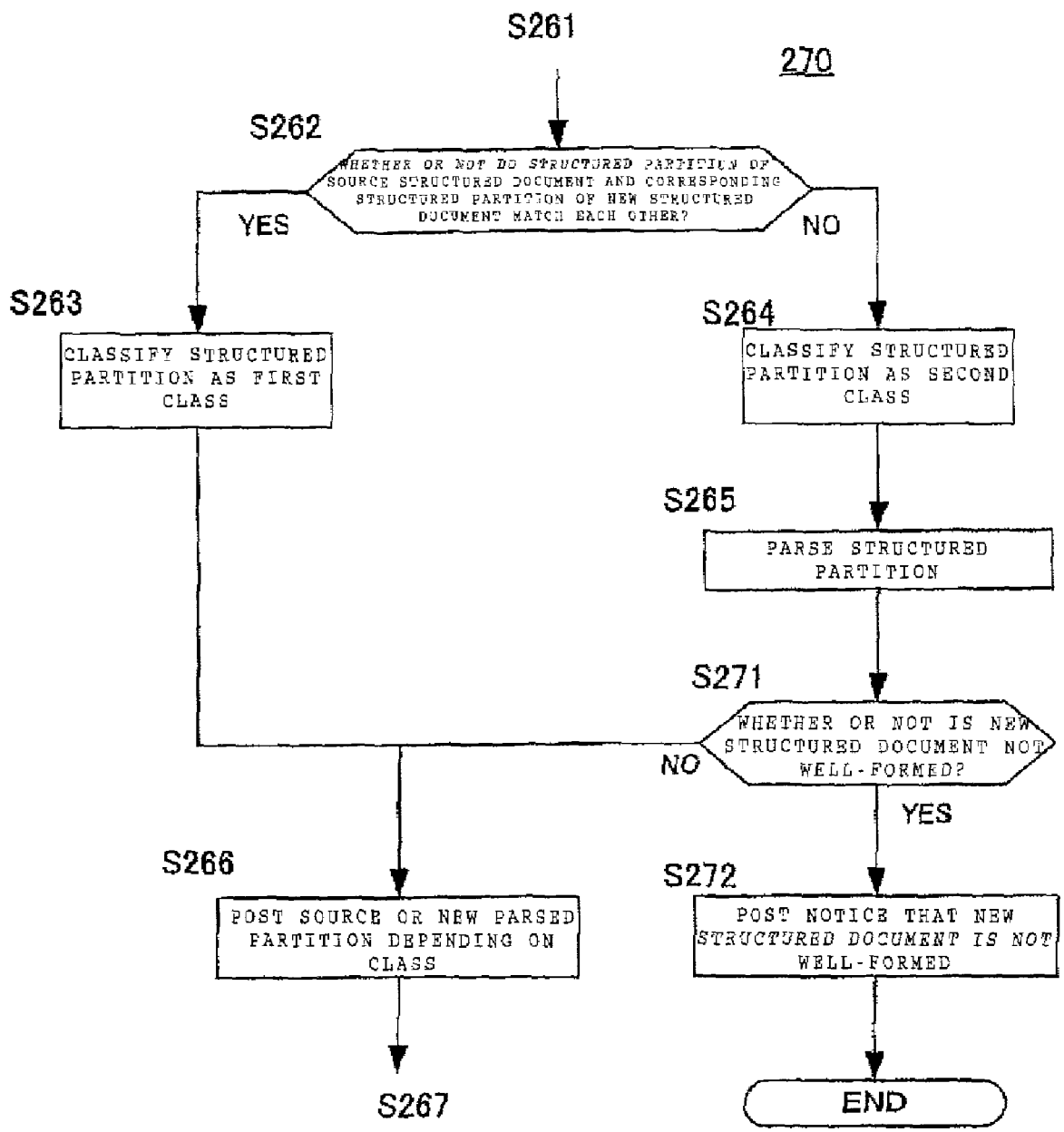
FIG. 10 is a diagram showing a first part of a flowchart of the structured-document processing method of FIG. 9 in a case where various functions are added to the structured-document processing method.
Figure 11:
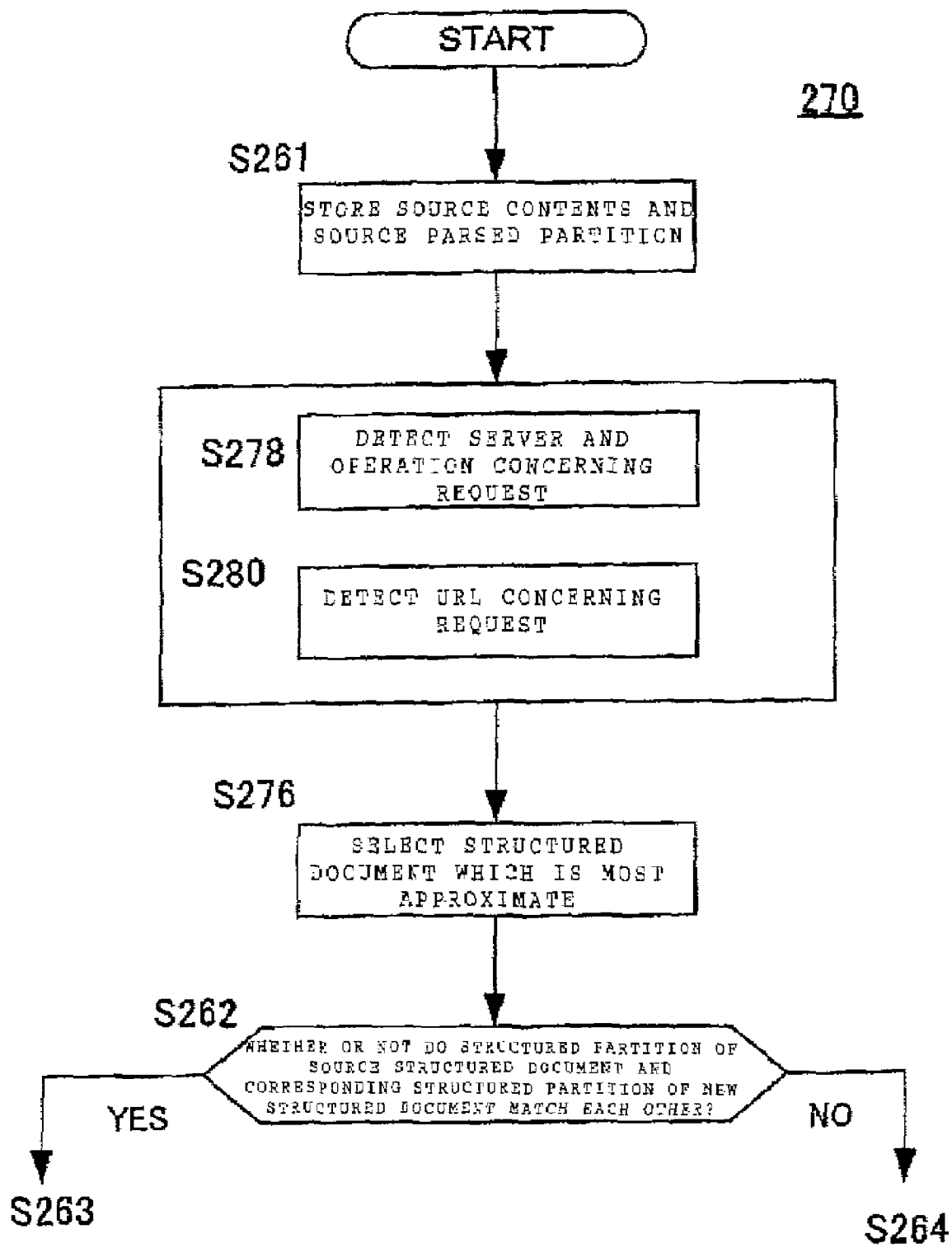
FIG. 11 is a diagram showing a second part of a flowchart of the structured-document processing method of FIG. 9 in a case where various functions are added to the structured-document processing method.
Figure 12:
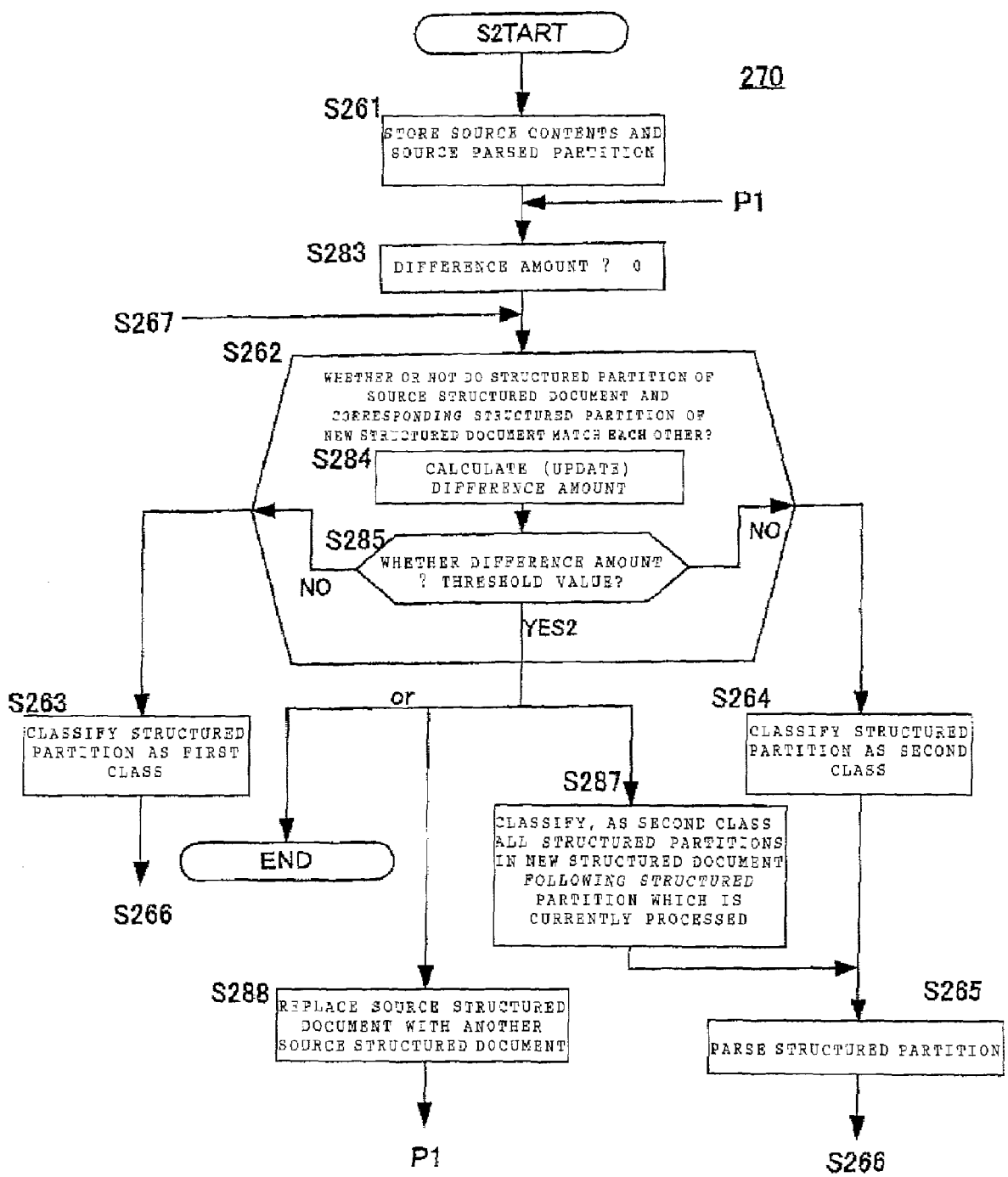
FIG. 12 is a diagram showing a third part of a flowchart of the structured-document processing method of FIG. 9 in a case where various functions are added to the structured-document processing method.

The structured-document processing method of FIG. 9 is so designed that various functions can be added to the method through an arbitrary combination of the functions. Each of the functions is implemented by adding a new step or by embodying a process to be performed in a step which has been packaged. FIGS. 10 to 12 are diagrams showing parts of a flowchart of the structured-document processing method 270 to be designed by adding various functions to the structured-document processing method 260 of FIG. 9. Descriptions will be provided below for functions added to the structured-document processing method 270 with reference to any one of FIGS. 9 to 12.

One of the added functions is implemented by a combination of S265 (a parsing step), S262 (a match check step), S271 (a non well-formed check step) and S272 (a posting step). With regard to FIG. 10, in S265 (the parsing step), the parsing of a structured partition includes a check which is performed on the basis of a result of the parsing, and which is made on whether or not a new structured document is a non well-formed structured document. In S271 (the non well-formed check step), a non well-formed check is performed on whether or not the new structured document is non well-formed, as a result of parsing the structured partition in S265 (the parsing step). If a result of the check is YES in S271, the process proceeds to S272 (the posting step), thereafter terminating the routine. In other words, in S262 (the match check step), if a result of a match check on the structured partition of the new structured document is NO, a match check to be performed on a structured partition following the structured partition is held until a non well-formed check which the parsing means is performing on the structured partition is terminated. If the check proves that the new structured document is non well-formed, a match check on the new structured document is aborted. In S272 (the posting step), if the check proves that the new structured document is non well-formed, a notice that the new structured document is a non well-formed structured document is posted to the application program, instead of an event being posted.

A second added function is implemented by S262 (the match check step). With regard to FIG. 9, in S262 (the match check step), the match check is made on whether or not a structured partition of contents of a new structured document and a corresponding structured partition of contents of a source structured document match each other by unit of data represented by one byte or one character from the head to the tail.

A third added function is implemented by a combination of S261 (the storage step), S276 (a most-approximate-structured document selecting step) and S262 (the match check step). With regard to FIG. 11, in S261 (the storage step), with regard to a plurality of source structured documents which are different from one another, the respective contents and the respective source parsed partitions are stored. In S276 (the most-approximate-structured document selecting step), out of the plurality of source structured documents which have been stored in S261, a source structured document whose source contents is the most approximate to those of a new structured document is selected as the most approximate structured document. In S262 (the match check step), a source structured document concerned with the match check is assigned as the most approximate structured document.

A fourth added function is implemented by a combination of S278 (a server-and-the-like detecting step) and S276 (the most-approximate-structured-document selecting step). With regard to FIG. 11, in S278 (the server-and-the-like detecting step), a new structured document is concerned with a response of a server to a request from a client in the Web service, and the server and an operation which have been requested are detected on the basis of the request. In S276 (the most-approximate-structured document selecting step), the most approximate structured document is selected on the basis of the server and operation thus detected.

A fifth added function is implemented by a combination of S280 (a URL detecting step) and S276 (the most-approximate-structured document selecting step). In S280 (the URL detecting step), a new structured document is concerned with a request for the Web service, an URL to which the request is going to be sent is detected. In S276 (the most-approximate-structured document), the most approximate structured document is selected on the basis of the URL thus detected.

A sixth added function is implemented by a combination of S283 and S287 as well as the two sub-steps S284 and S285 within S262. With regard to FIG. 12, in S283 (an initial-value-for-difference-amount setting step), an initial value for a difference amount is set at zero. In S284 (a difference amount calculating step), the difference amount between contents of a new structured document and contents of a source structured document is increased by one unit each time a result of the match check in S262 is NO. In S285 (a difference amount check step), it is checked whether or not the difference amount is larger than a threshold. If a result of the check is YES, the process proceeds to S287. In S278 (a classification step), all of the structured partitions in the new structured document, ranging from a structured partition, on which a match check has been performed for the last time, to a structured document in the tail, are classified a second class structured document. Thereafter, the process proceeds to S265.

A seventh added function is implemented by a combination of S283 and S288 as well as the two sub-steps S284 and S285 within S262. With regard to FIG. 12, in S283 (the initial-value-for-difference-amount setting step), an initial value for the difference amount is set at zero. In S284 (the difference amount calculating step), the difference amount between contents of a new structured document and contents of a source structured document is increased by one unit each time a result of the match check in S262 is NO. In S285 (the difference amount check step), it is checked whether or not the difference amount is larger than a threshold. If a result of the check is YES, the process proceeds to S288 (a source-structured-document replacing step). In S288, a current source structured document is replaced with another source structured document. Thereafter, the process returns back to S283.

In a case where a result of the check in S285 is YES, the routine may be terminated (S285→end).

Figure 13:
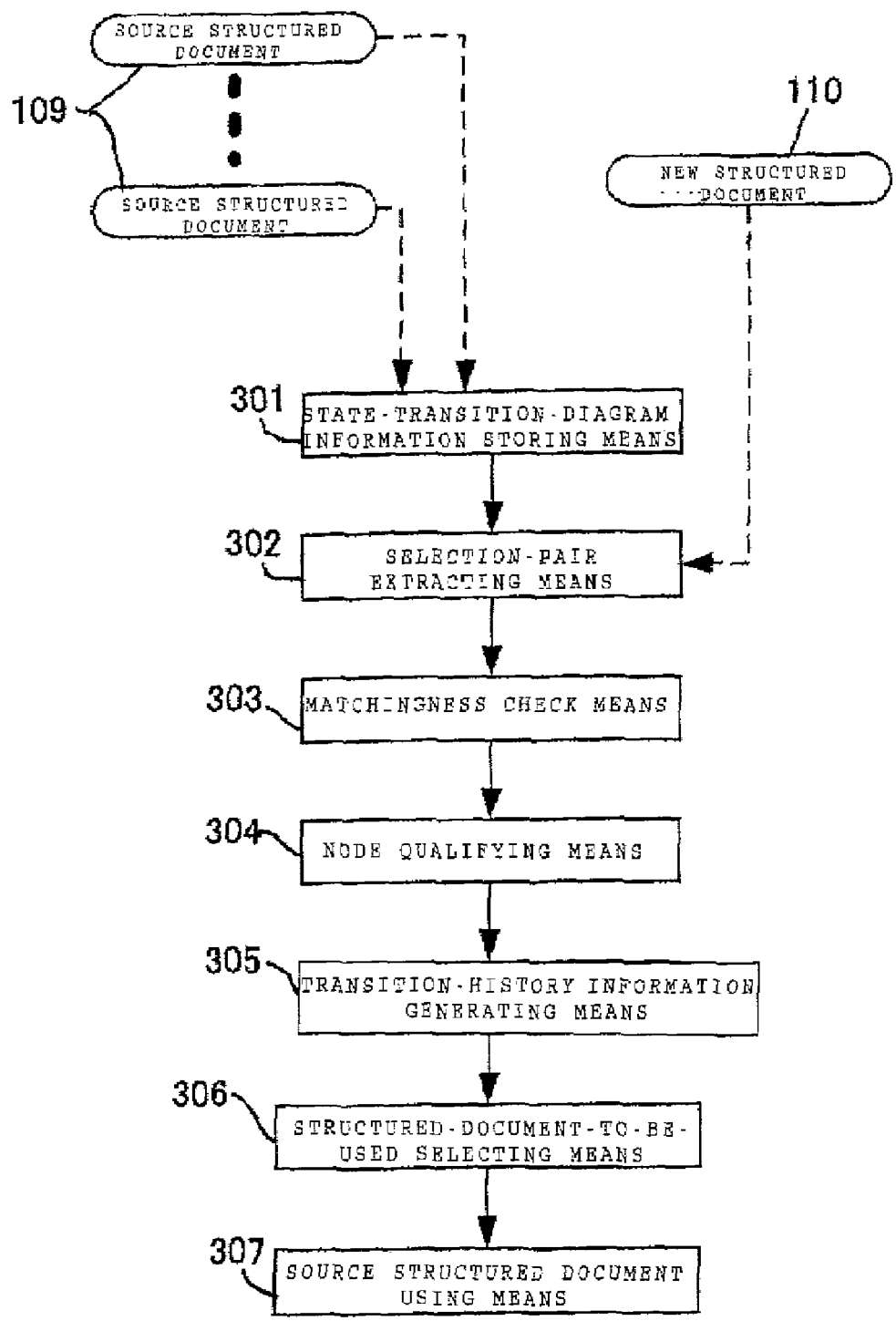
FIG. 13 is a functional block diagram of still a fifth structured-document processing device.

FIG. 13 is a functional block diagram of another structured-document processing device 300. The structured-document processing device 300 includes state-transition-diagram information storing means 301, selection-pair extracting means 302, matchingness checking means 303, node qualifying means 304, transition-history information generating means 305, structured-document-to-be-used selecting means 306 and source-structured-document using means 307. With regard to a plurality of source structured documents 109 each of which is designed to be able to be partitioned into a plurality of source nodes as a plurality of nodes concerning the respective structure partitions, the state-transition-diagram information storing means 301 stores, as state-transition-diagram information, information concerning a state transition diagram in which source nodes of the source structured document 109 transit from one to another in order of occurrence from the head of the source structured document. In addition, in the state-transition-diagram information storing means 301, a state transition, which would occur commonly in some source structured documents 109 among the plurality of source structured documents 109, is stored as a single common state transition in the state transition diagram. With regard to a new structured document 110 which is designed to be able to be partitioned into a plurality of new nodes as a plurality of nodes concerning the respective structure partitions, the selection-pair extracting means 302 extracts, as a selection pair, a pair consisting of one of the new nodes of the new structured document 110 and corresponding one of the source nodes of the state transition diagram, in accordance with order in which the new nodes occur from the head of the new structured document 110, and in accordance with order in which the source nodes transit from one to another in the state transition diagram. The matchingness check means 303 determines whether there is matchingness between the source node and the new node in each of the selection pairs, on the basis of descriptions respectively of the source node and the new node. With regard to the source node and the new node of the selection pair, the node qualifying means 304 qualifies the source node as a node to be used for the new node when it is decided that there is matchingness between the source node and the new node. The transition-history information generating means 305 generates, as transition-history information, information concerning a transition history which goes on through a plurality of nodes to be used in a state transition diagram in order of transition. The structured-document-to-be-used selecting means 306 selects a single source structured document 109 as a structured document to be used for the new structured document 110, on the basis of the transition-history information. The source-structured-document using means 307 uses, as a result of parsing a new node of the new structured document, a result of parsing a node, which is one in the structured document to be used for the new structured document 110, and which is a node to be used for the new node.

The difference between the structured-document processing device 300 of FIG. 13 and a structured-document processing method 340 of FIG. 15 which will be described later comes only from the difference between a device category to which the device 300 belongs and a method category to which the method 340 belongs. Technological contents realized by the device 300 are substantially the same as those realized by the method 340. For this reason, descriptions will be provided for the structured-document processing device 300, having the device 300 represent the method 340. A state transition diagram (for example, as shown in FIG. 32) includes state transitions respectively concerning a plurality n (n=3 in FIG. 32) of source structured documents 109. State transitions (from a state 615 to a state 616 concerning a structured documents A and B, in FIG. 32) which occur commonly in a plurality m (m≦n; m=2 in FIG. 32) of source structured documents 109 are put together into a single state transition in the state transition diagram. In other words, the state transitions are commonly expressed by a state transition. This common expression enables an amount needed for storing the state-transition-diagram information to be rather reduced in spite of a total number of the source structured documents 109 and a total number of the nodes. Incidentally, state transitions which occur in a plurality of source structured documents 109 do not have to be commonly expressed in the state transition diagram. In a typical case, if the matchingness check means 303 decides that a selection pair which the selection pair extracting means 302 has no matchingness, the selection pair extracting means 302 updates the selection pair by replacing the current node to be used with a node to be used whose transition order follows that of the current node to be used, while leaving unchanged the source node of the selection pair which has been decided to have no matchingness. In addition, if it is proved that the new node in the selection pair has no matchingness with any source node in the state transition diagram, the new node is replaced with a new node whose occurrence order follows that of the current new node.

In some cases, a state transition in a state transition diagram may be made, for example, from a state 601 to a state 602 as in a state transition diagram 600 of FIG. 31 which will be described later. In other cases, the state transition in the state transition diagram may be made, for example, from a state 601 to a state 608 as in the state transition diagram 600 of FIG. 31 which will also be described later. Against the background of such possible cases, suppose that, when a state machine proceeds to a state 601, the ensuing node in a new structured document be "<y/>." The larger in number possible source nodes in the state transition diagram into which the state transition would be made are, the longer it would take to perform a process of looking into the possible source nodes to find a source node corresponding to the new node as the "<y/>" in the state 602 or the state 608 after the entire "<y/>" has been recognized. With this taken into consideration, it is preferable that the process be performed at a higher speed by use of the following arrangement. First, all of the possible states which could follow the state 601 are sorted out in advance. Then, when "<" of the new node appears (in other words, when the first byte in the byte string or the first character in the character string of the new node is identified), or when it is proved that neither the first byte nor the first character is "text" of the state 602, the state 602 is decided not to be a state on which the matchingness check needs to be performed. Thereby, the matchingness check focuses only on the state 608. In order to do so, a developed version of the structured-document processing device 300 causes state-transition-diagram information storing means 301 to sort, and to store, descriptions (byte strings or character strings) of the respective possible source nodes into which the state transition would be made. In addition, selection pair extracting means 302 assigns all of the possible source nodes, into which the state transition would be made, as source nodes for selection pairs. In other words, the selection nodes are constituted by pairing a single new node and each of the plurality of possible source nodes. Thus, the selection pair extracting means 302 extracts selection pairs, and transfers the selection pairs to matchingness check means 303. With regard to each of the source nodes, the matchingness check means 303 compares each sequential byte of the source node with each sequential byte in the byte string, as the single new node, one-by-one from the first byte, and accordingly narrows candidate for a matchingness check down to only source nodes whose bytes respectively match the bytes of the new node, when the nodes are constituted of bytes (the narrowing-down can go through at a higher speed, since the source nodes have been sorted in advance). Alternatively, when the nodes are constituted of characters, the matchingness check means 303 compares each sequential character of the source node with each sequential character in the character string, as the single new node, one-by-one from the first character, and accordingly narrows candidate for a matchingness check down to only source nodes whose characters respectively match the characters of the new node (the narrowing-down can go through at a higher speed, since the source nodes have been sorted in advance). Thereafter, the matchingness check is performed on a pair consisting of a single node which has eventually survived this elimination process and the new node.

A source structured document 109 which a structured-document-to-be-used selecting means 306 selects as a structured document to be used for a new structured document 110 is, for example, a source structured document 109 whose state transition most resembles that of the new structured document 110 expressed in the state transition diagram. In addition, the source structured document 109 whose state transition most resembles that of the new structured document 110 expressed in the state transition diagram is, for example, a source structured document which has the largest number of nodes to be used for the new structured document 110 in the transition history.

In a case where the structured document to be used for the new structured document does not have a node to be used which corresponds to a new node of the new structured document, the new node is a difference between the new structured document and the structured document to be used. Incidentally, a result of parsing a source structured document 109 cannot be used for a result of parsing the new node equivalent to the difference. If, therefore, the result of parsing the new node equivalent to the difference is required, the result of parsing the new node is obtained by parsing the new node directly.

Thus, with the use of the state machine, it is possible to parse a new structured document 110 at a higher speed by finding out a source structured document 109, which has a result of parsing to be used optimally for the purpose of parsing the new structured document 110, and using the result of parsing the source structured document 109.

Figure 14:
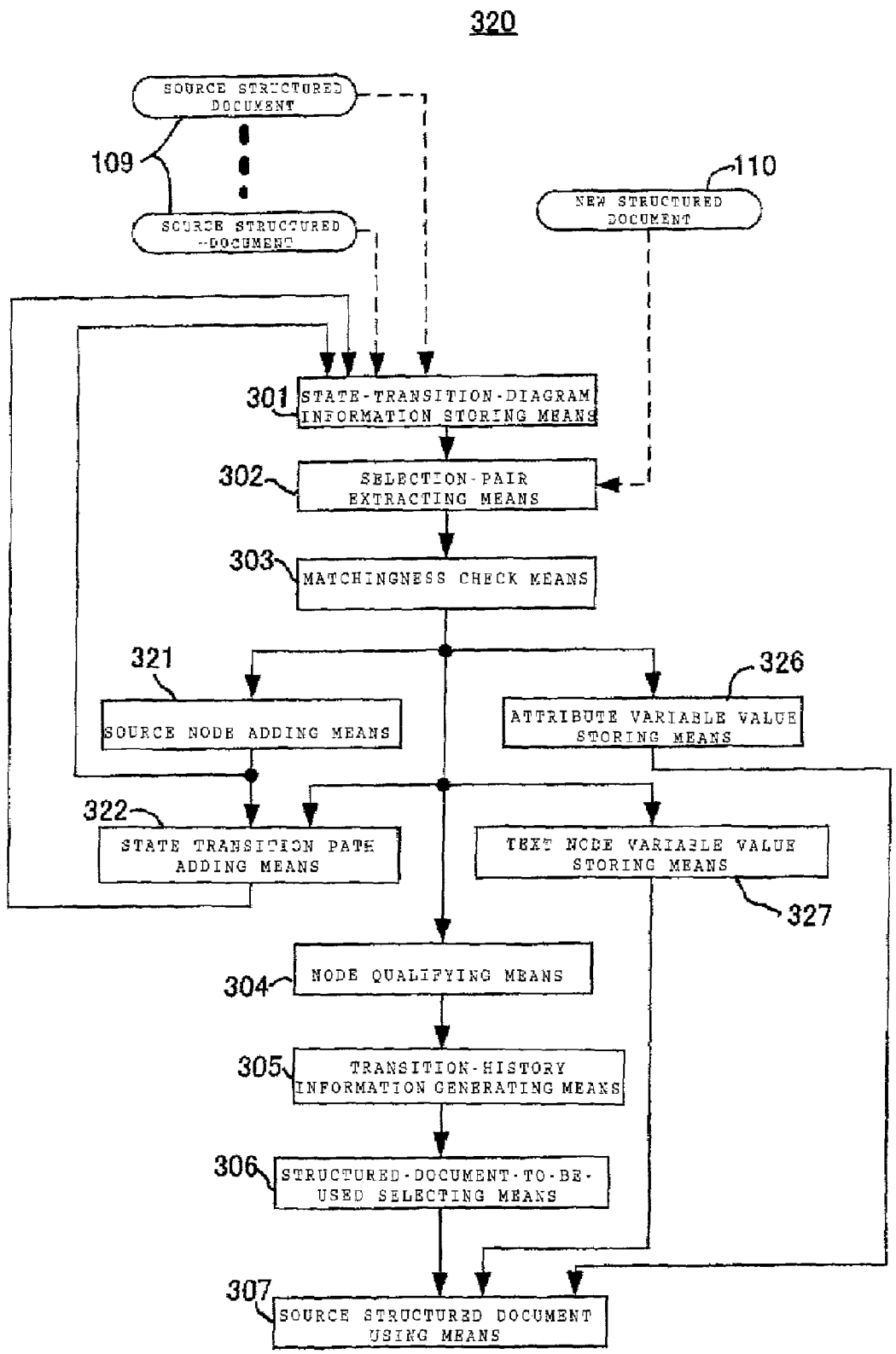
FIG. 14 is a functional block diagram of still a sixth structured-document processing device.

FIG. 14 is a functional block diagram of yet another structured-document processing device 320. The structured-document processing device 320 includes state-transition-diagram information storing means 301, selection-pair extracting means 302, matchingness checking means 303, node qualifying means 304, transition-history information generating means 305, structured-document-to-be-used selecting means 306 and source-structured-document using means 307. The structured-document processing device 320 additionally includes source node adding means 321, state transition path adding means 322, attribute variable value storing means 326 and text-node variable value storing means 327. The means ranging from the state-transition-diagram information storing means 301 to the source-structured-document using means 307 are virtually the same as those of the structured-document processing device 300 of FIG. 13. The structured-document processing device 320 does not have to be equipped with all of the source node adding means 321, the state transition path adding means 322, the attribute variable value storing means 326 and the text-node variable value storing means 327. The structured-document processing device 320 may be equipped (a) only with the source node adding means 321 and the state transition path adding means 322, (b) only with the attribute variable value storing means 326, (c) only with the text-node variable storing means 327, and with an arbitrary combination of (a), (b) and (c).

Figure 30:
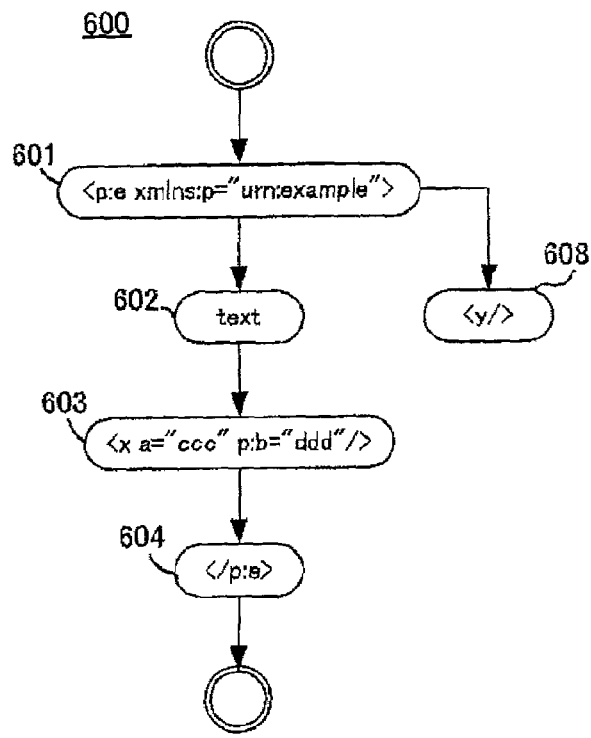
FIG. 30 is a diagram showing how a node is added to the state diagram.

When a first new node is defined as a new node which has no matchingness with any pairing source node in the state transition diagram, the source node adding means 321 adds the first new node, as a first source node, onto the state transition diagram, while forming a state transition to the first new node from a source node, the source node being one from which the state transition to the first new node is originated, and being one in the state transition diagram (for example, a state 608 in FIG. 30). Here, which node is anterior or posterior to another node is determined according to the order in which the nodes occur from the head of a structured document. In addition, when a node whose contents are an object to be grasped uniquely is termed as an object node, a context is defined as described parts which are included in the description of a structured document from the head of the structured document immediately prior to the object node, the described parts uniquely determining the contents of the object node in cooperation with the description of the object node itself. This definition will be used for a structured-document processing method 360, which will be described. Here, a new node which is posterior to the first new node is defined as a second new node. With regard to a selection pair to be checked on its recombination of the second new node and the second source node which is a selection pair concerning the second new node, the matchingness check means 303 checks whether there is matchingness between the source node and the new node in terms of not only their descriptions but also their contexts. When it is determined that the second new node and the second source node in the selection pair to be checked on its recombination have matchingness in terms of both their descriptions and their contexts, the state transition path adding means 322 newly adds a state transition path from the first source node to the second source node (for example, a transition from the state 608 to the state 603 in FIG. 31).

The difference between the structured-document processing device 320, which has been additionally equipped with the source node adding means 321 and the like, and a structured-document processing method 360 of FIG. 16, which will be described later, comes only from the difference between a device category to which the device 320 belongs and a method category to which the method 360 belongs. Technological contents realized by the device 320 are substantially the same as those realized by the method 360. For this reason, descriptions will be provided for the structured-document processing device 320, having the device 320 represent the method 360. The reason for which "a second new node" is limited to "being a new node posterior to a first new node" is that all of the second new nodes are not necessarily new nodes next to the new first node. In other words, in some cases, a new node next to a first new node may not be added to a state transition diagram, since a source node corresponding to the new node may not exist in the state transition diagram, and also because of the below-described reasons (a) to (c).

The structured-document processing device 320 has a function of adding a result of parsing a new structured document to a state transition diagram when a source structured document which matches the new structured document has not been registered in the state transition diagram. This increases source structured documents, which have been registered in the state transition diagram, in number. Accordingly, after the new structured document is additionally registered as a source structured document, when the structured-document processing device 320 receives a new structured document which is approximate to the new structured document thus additionally registered as a source structured document, the structured-document processing device 320 can deal with the newly received new structured document adequately. Incidentally, it is preferable that appropriate conditions be imposed on a new structured document having a state transition diagram to which a new node is going to be added as a source node. Such conditions, for example, are that the new structured document is a new structured document whose result of the parsing is sufficiently different from results of parsing the respective source structured documents which have been registered, and that the new structured document is a new structured document which is expected that similar new structured documents will arrive frequently hereafter.

The source node adding means 321 does not necessarily add a first new node, as a first source node, to the state transition diagram, when a new node of a new structured document 110 is the first new node. This is because, even if the new node of the new structured document 110 is the first new node, in some cases, it is preferable that the first new node be not registered in the state transition diagram. In other words, with regard to a new structured document 110 which will be received thereafter, in some cases, it is expected that the parsing of the first new node instead of using a result of parsing a node to be used concerning a source structured document 109 will not particularly reduce a speed at which a process of parsing is performed. In addition, in some cases, a speed at which a process of parsing is performed can be increased when a source structured document 109 which is not sufficiently different from already-registered source structured documents is indiscriminately registered to the state transition diagram. The following can be listed as cases that avoid registering the first new node.

(a) A short Text event (for example, shorter than four characters)
(b) Events which have already occurred repeatedly in the state machine.
(c) A PI (Processing Instruction) event and a Comment event (described as <!—~—> in an XML document), both of which are poor in regularity.

The state transition path adding means 322 checks on matchingness between a source node and a new node constituting a selection pair in terms of not only their descriptions but also their contexts. The contexts include, for example, an entity declaration list, a namespace which is currently effective, and a node hierarchy. Even if the description of the source node and the description of the new node are equal to each other in terms of their forms, in some cases, the substantial contents of the source node and the substantial contents of the new node are not equal to each other depending on their contexts. With this taken into consideration, in order to check whether the contents of the source node and the contents of the new node are equal to each other, it is concurrently checked on matchingness between the context of the source node and the context of the new node. The matchingness check on the contexts causes a well-formed check on the new structured document 110 to be performed in conjunction with a decision on a source structured document into which a transition is made in the state transition diagram, thereby enabling the new structured document 110 to be parsed at a higher speed. Incidentally, the reason for which the source node adding means 321 omits performing a matchingness check in terms of contexts is that it is assured that a source structured document 109 in the state transition diagram is well-formed. In other words, since the source structured document 109 follows a source node which it is assured that is well-formed until possible source nodes into which a state transition is made from the current source node are branched, it is assured that the source structured document 109 is well-formed only if there is matchingness between the description of the source node and the description of the new node.

In order to construct a state machine (automaton) for recognizing a well-formed XML document, the context may be constituted of at least an entity declaration, a namespace declaration and a node hierarchy. If, however, the context is loosely defined (a recombination is allowed at more states in the course of the state transition), the space of the context which is in charge of the state machine can be enlarged.

It is preferable that the state-transition-diagram information be managed by use of a dictionary. When "x" is used as an operation symbol for direct product, a state is expressed with Item 1 (the description of the node)×Item 2 (the context of the node). The state is designed to be registered in the dictionary. In addition, the state is designed to be consulted with the dictionary on the basis of Items 1 and 2. For example, the matchingness check means 303 includes matchingness inspection means, and the matchingness inspection means is designed to be able to check, for a second new node, whether or not there is a state (node) in the dictionary by consulting the dictionary while the description and the context are used as items. If the state exists in the dictionary, the matchingness check means 303 determines that there is matchingness between the source node and the new node. Thereby, a retrieval of the second source node can be performed at a higher speed. In response to this, when a source node is intended to be added into the state transition diagram, the source node adding means 321 performs a process for this addition, and concurrently registers the source node to the dictionary in a way that the source node thus added can be looked up in the dictionary by use of Items 1 and 2.

The difference between the structured-document processing device 320 which is additionally equipped with the attribute variable value storing means 326 and a structured-document processing method 380 (especially between S384 and S385) of FIG. 17 which will be described later comes only from the difference between a device category to which the device 320 belongs and a method category to which the method 380 belongs. Technological contents realized by the device 320 are substantially the same as those realized by the method 380. For this reason, descriptions will be provided for the structured-document processing device 320, having the device 320 represent the method 380. The structured-document processing device 320 which is equipped with the attribute variable value storing means 326 can determine that there is matchingness between a source node and a new node of a selection pair, even if the source node and the new node do not match each other completely, or even if the source node and the new node are slightly different from each other, and can use a result of parsing the source structured document 109 concerning the structured document to be used can be used for the parsing of the new structured document 110.

Descriptions will be provided for differences between the structured-document processing device 300 of FIG. 13 and the structured-document processing device 320 which is equipped with the attribute variable value storing means 326. With regard to state-transition-diagram information which is stored in the state-transition-diagram information storing means 301, a predetermined source node in the state transition diagram is set at a source node with an attribute variable which a predetermined attribute is defined as. When a source node in a selection pair is a source node with an attribute variable, and concurrently when the element name and the attribute name of the source node in the selection pair are equal to the element name and the attribute name of the new node in the same selection pair, the matchingness check means 303 determines that there is matchingness between the source node and the new node in the selection pair. With regard to the selection pair whose source node and new node have been decided to have matchingness, if the source node in the selection pair is a source node with an attribute variable, the attribute variable value storing means 326 stores an attribute value of the new node in the selection pair as the attribute variable value. In a case where a result of parsing a node to be used for a new node of a new structured document 110, the node to be used being a node of a structured document to be used for the new structured document 110, is going to be used for a result of parsing the new node of the new structured document 110, if the node to be used is a source node with an attribute variable, the source structured document using means 307 uses, as a result of parsing the node to be used for the new node of the new structured document 110, a result of the parsing which is obtained by substituting an attribute variable value for the attribute variable in a result of parsing the node to be used for the new node of the new structured document 110.

Figure 45:
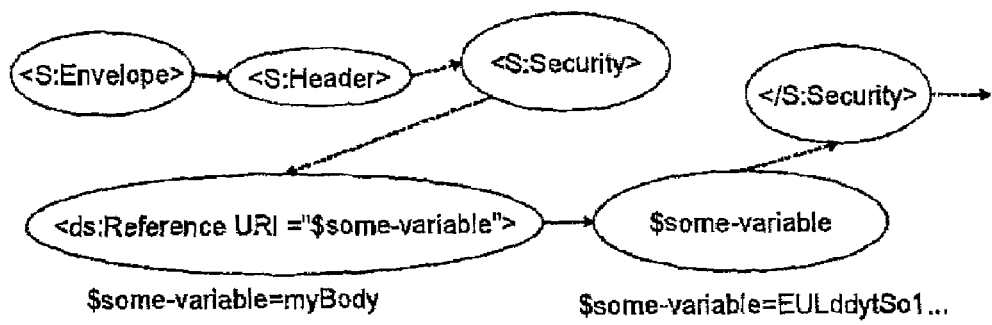
FIG. 45 is a diagram showing an example of a template instance.

How to express an attribute value of a node with a function is described in detail in FIGS. 43 and 45, both of which will be described later. Specifically, an attribute variable (the attribute variable $some-variable of an attribute name URI in an example shown in FIG. 43) is set to a source node with an attribute variable in the state transition diagram. Thereby, an attribute value (#myBody in the example shown in FIG. 43) of a new node of a new structured document 110 constituting a selection pair along with the source node with the attribute variable in the state transition diagram, the new node and the source node having matchingness, is stored so that the attribute value is associated with the attribute variable. With regard to a source structured document 109 which has become a structured document to be used for a new structured document 110, an attribute value (#myBody in the example shown in FIG. 43) of a new node is substituted for a location corresponding to an attribute variable in a result of parsing a source node with the attribute variable of the source structured document 109, thereby producing a result of parsing the new node.

The difference between the structured-document processing device 320 which is additionally equipped with the text-node variable storing means 327 and a structured-document processing method 380 (especially between S388 and S389) of FIG. 17 which will be described later comes only from the difference between a device category to which the device 320 belongs and a method category to which the method 380 belongs. Technological contents realized by the device 320 are substantially the same as those realized by the method 380. For this reason, descriptions will be provided for the structured-document processing device 320, having the device 320 represent the method 380. The structured-document processing device 320 which is equipped with the text-node variable storing means 320 determines that there is matchingness between a source node and a new node of a selection pair, even if the contents of the source node and the contents of the new node are completely different from each other, when both the source node and the new node are in the form of text node. Thereby, a result of parsing the source structured document 109 concerning the structured document to be used can be used for the parsing of the new structured document 110.

Descriptions will be provided for differences between the structured-document processing device 300 of FIG. 13 and the structured-document processing device 320 which is equipped with the text-node variable value storing means 327. The state-transition-diagram information storing means 301 sets a source node, as a predetermined text node in the state transition diagram, at a text node variable. The matchingness check means 303 determines that a source node and a new node in a selection pair have matchingness, when the source node and the new node are in the form of a text node variable and in the form of a text node in the selection pair, respectively. With regard to a selection pair whose source node and new node are decided to have matchingness, the text node variable value storing means 327 stores the text of the new node in the selection pair as a text node variable value, when the source node in the selection pair is in the form of a text node variable. In a case where a result of parsing a node to be used for the new node in a new structured document 110, the node to be used being a node of a structured document to be used for the new structured document 110, is intended to be used for a result of parsing a new node of the new structured document 110, if the node to be used is in the form of a text node variable, the source structured document using means 307 uses, as a result of parsing the node to be used for the new node of the new structured document 110, a result of the parsing which is obtained by substituting a text node variable value for the text node variable in a result of parsing the node to be used for the new node of the new structured document 110.

Figure 44:
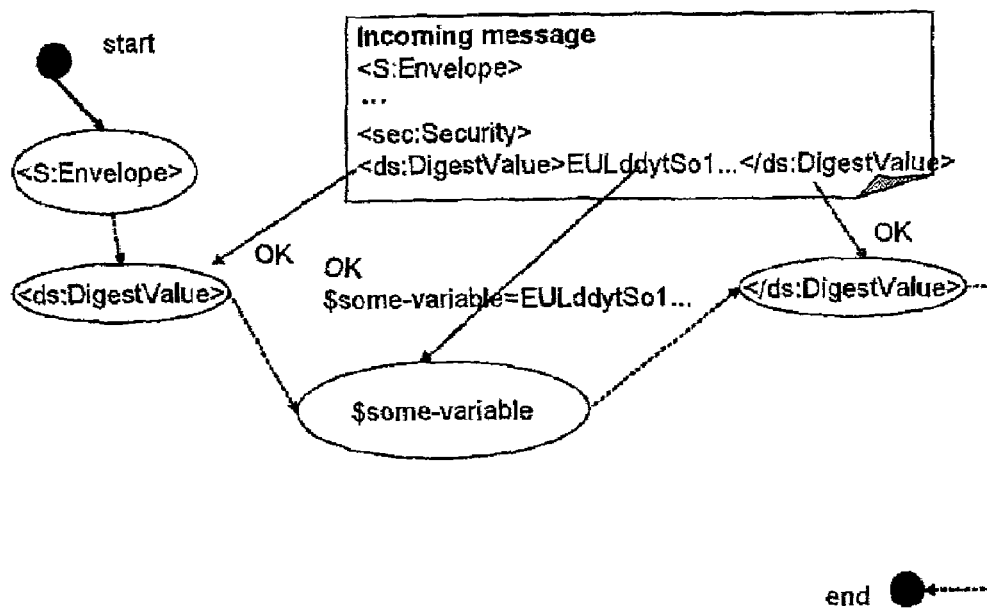
FIG. 44 is a diagram illustrating how a text is extracted from the incoming message.

How to express a text node with a function is described in detail by use of FIGS. 44 and 45, both of which will be described later. Specifically, a text node variable (the text node variable $some-variable in an example shown in FIG. 44) is set to a predetermined text node in the state transition diagram. Thereby, text contents (EULddytSo1 . . . in the example shown in FIG. 44) of a new node of a new structured document 110 constituting a selection pair along with the text node variable in the state transition diagram, the new node and the source node having matchingness, is stored so that the text contents are associated with the text node variable. With regard to a source structured document 109 which has become a structured document to be used for a new structured document 110, when the text contents of the new structured document 110 which has been stored so as to be associated with the text node variable exists, the text contents EULddytSo1 . . . is substituted for a location corresponding to a text node variable in the source structured document 109 as the structured document to be used. Thereby, a result of parsing the source node with the attribute variable is used for a result of parsing the new node of the new structured document 110.

It is preferable that each of the structured documents be in the form of a template (FIG. 40) when the structured-document processing device 320 is applied to a process of parsing an SOAP message, particularly an SOAP message with WS-Security. In addition, the structured-document processing device 320 calls modules (for example, a token consumer 703, a signature consumer 704 and a cipher consumer 705 in FIG. 46) which correspond to the respective transition history parts of the transition history, and which are needed for processing of the WS-Security. Thereby, the structured-document processing device 320 causes each of the modules to perform a process of parsing the respective message parts of the SOAP message as the new structured document. A plurality of templates exclusive for the respective modules are prepared, and a single adequate template is selected for each of the modules. With regard to the token consumer 703 and the signature consumer 704, in use of the template, their respective parts corresponding to the modules of the SOAP message are normalized. The normalization means to be addition of a namespace declaration, and rearrangement of attributes (descriptions will be provided later for specific processes of the normalization with reference to FIGS. 47 and 48). In other words, the structured-document processing device 320 prepares (not-normalized) templates as a source structured document which allows the parsing of an SOAP message as the new structured document to be omitted, and additionally prepares normalized templates (for example, a template 745 in FIG. 47) which correspond to the respective (not-normalized) templates. Accordingly, an attribute value and text node variable value which have been extracted from the SOAP message are written into a blank part of each of the respective normalized templates. Thereafter, a digest value and the like are calculated.

Figure 49:
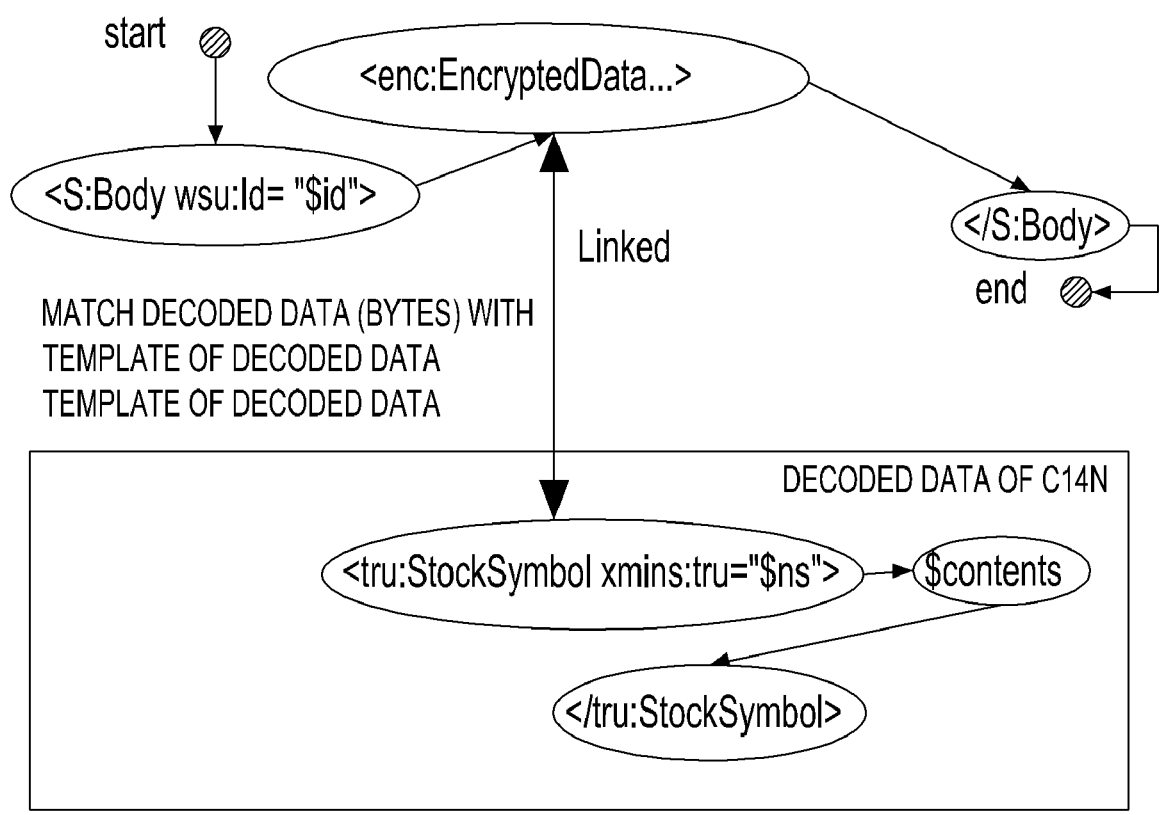
FIG. 49 is a diagram illustrating how the template is used while a decoding process is being performed.

Furthermore, with regard to the structured-document processing device 320, templates can be prepared for data which are obtained by decoding an SOAP message with WS-Security, thereby adding a state machine (Detailed description will be provided for this with reference to FIG. 49). In other words, templates for the respective decoded data whose contents parts (for example, $contents in a template shown in FIG. 49) have been defined respectively as text node variables, and other nodes of which have been parsed, are prepared. Thereby, values of the respective decoded contents are extracted on the basis a decoded SOAP message (an XML document). In addition, a desired template for the decoded data is selected by use of the state machine. Consequently, a contents value is substituted for the contents part in the template for the decoded data thus selected.

Figure 15:
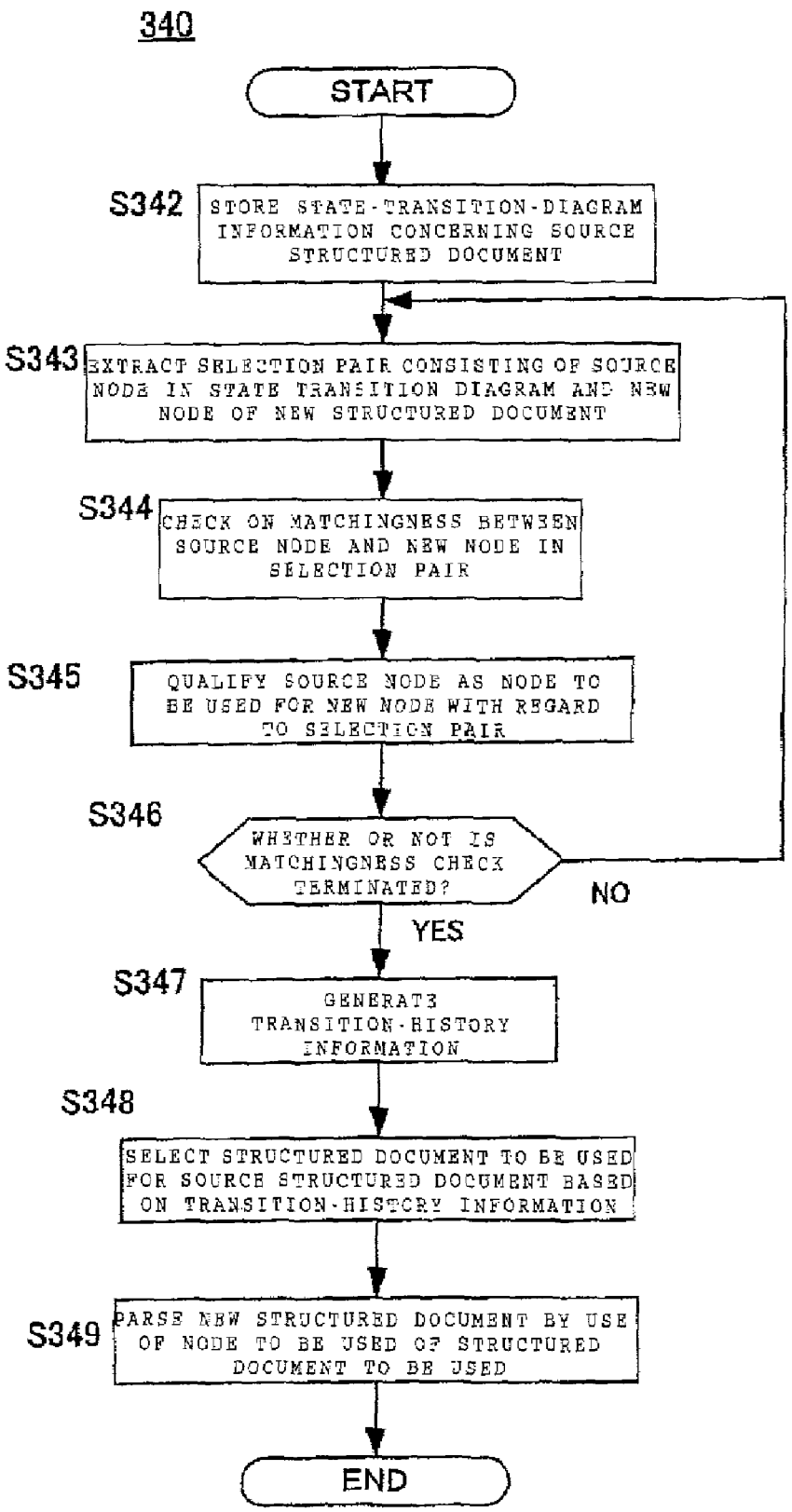
FIG. 15 is a flowchart of a fifth structured document processing method.

FIG. 15 is a flowchart of the structured-document processing method 340. In step S342 (a state-transition-diagram information storing step), with regard to a plurality of source structured documents, each of which can be partitioned into a plurality of source nodes respectively as a plurality of nodes concerning the structured partition, information concerning a state transition diagram in which source nodes of the source structured document transit from one to another in order of occurrence from the head of the source structured document is stored as state-transition-diagram information. In step S342, a state transition, which would occur commonly in a plurality of source structured documents, is treated as a single common state transition to be expressed in the state transition diagram. In step S343 (a selection pair extracting step), with regard to a new structured documents, which can be partitioned into a plurality of new nodes respectively as a plurality of nodes concerning the structured partition, a pair consisting of one of the new nodes of the new structured document and corresponding one of the source nodes of the state transition diagram is extracted as a selection pair, in accordance with order in which the new nodes occur from the head of the new structured document, and in accordance with order in which the source nodes transit from one to another in the state transition diagram. In step S344 (a matchingness check step), it is determined whether or not the source node and the new node in each of the selection pairs have matchingness, on the basis descriptions respectively of the source node and the new node. In step S345 (a node qualifying step), with regard to the source node and the new node in the selection pair, the source node is qualified as a node to be used for the new node, when it is decided that the source node and the new node have matchingness.

In step S346, it is determined whether or not the matchingness check needs to be terminated. If the matchingness check needs to be terminated, the process proceeds to step 347. If the matchingness check needs to be continued, the process returns to step S343. A time when it is decided in step S346 that the matchingness check needs to be terminated means to be (a) a time when the matchingness check has been completed with regard to all of the new nodes of the new structured document 110, or (b) a time when the current new structured document 110 is so singular that the number of new nodes whose respective pairing source nodes which do not have matchingness with the new nodes is larger than a threshold value. In the case of (b), new nodes in the current new structured document 110 whose respective pairing source nodes which do not have matchingness with the new nodes may be added, as source nodes, onto the state transition diagram, in common with the structured-document processing device 360, which will be described later.

In step S347 (a transition-history information generating step), information concerning a transition history which goes on through a plurality of nodes to be used in a state transition diagram in order of transition is generated as transition-history information. In step S348 (a structured-document-to-be-used selecting step), a single source structured document is selected as a structured document to be used for the new structured document on the basis of the transition-history information. In step S349 (a structured-document using step), a result of parsing the nodes to be used respectively for the new nodes in the structured document to be used for the new structured document is used for a result of parsing the new nodes of the new structured document.

Figure 16:
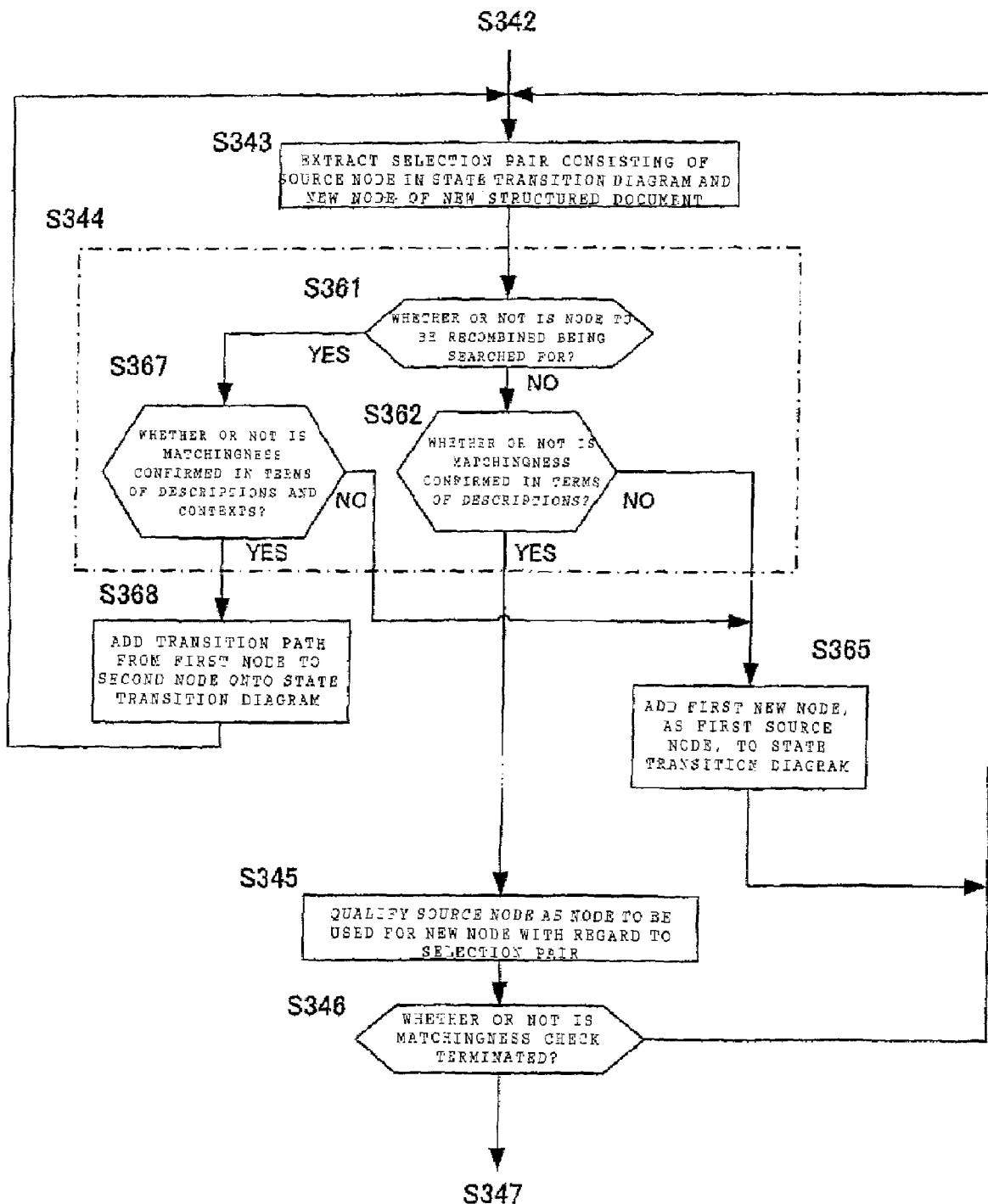
FIG. 16 is a flowchart of a chief part of the fifth structured document processing method.

FIG. 16 is a flowchart of main parts of the structured-document processing method 360. In the structured-document processing method 360, steps prior to step S342 and steps anterior to S347 are the same as those of the structured-document processing method 340 of FIG. 15. For this reason, illustrations for steps prior to step S342 and steps anterior to step S347 are omitted. Descriptions will be provided for differences between the structured-document processing method 360 and the structured-document processing method 340.

With regard to the structured-document processing method 360, when a first new node is defined as a new node which does not have match with any pairing source node in the state transition diagram, in step S365 (a source node adding step), the first new node is newly added, as a first source node, onto the state transition diagram, while forming a state transition to the first new node from a source node in the state transition diagram, the source node being one from which the state transition to the first new node is originated with the state transition relationship. When a second new node is defined as a new node which is anterior to the first new node, in step S367 in step S344 (a matchingness check step), with regard to a selection pair to be checked on its recombination of the second new node and the second source node which is a selection pair concerning the second new node, it is checked whether the source node and the new node have matchingness in terms of not only their descriptions but also their contexts. When it is determined that the second new node and the second source node in the selection pair to be checked on its recombination have matchingness in terms of both their descriptions and their contexts (when a result of the check in step S367 is YES), a state transition path from the first source node to the second source node is newly added.

FIG. 16 shows detailed contents of step S344 in the structured-document processing method 360 and proceeding paths to, and from, step S368 and the like. Steps S361, S362 and S367 are the sub-steps of step S344. In addition, after a process is terminated in step S365, the process returns to step S343. After a process is terminated in step S368, the process returns to step S343. If a result of the check in step S367 is NO, the process proceeds to step S365, and the new node in step S367 is added, as a first source node, onto the state transition diagram. When a result of the check in step S367 is NO, the process may return to step S343, instead of to step S365. With regard to step S344 of the structured-document processing method 340 which includes neither step S365 nor step S368 (shown in FIG. 15), it is considered that the contents of step S344 is only step S362. In step S362, matchingness between the source node and the new node in a selection pair is checked in terms of their descriptions only.

Figure 17:
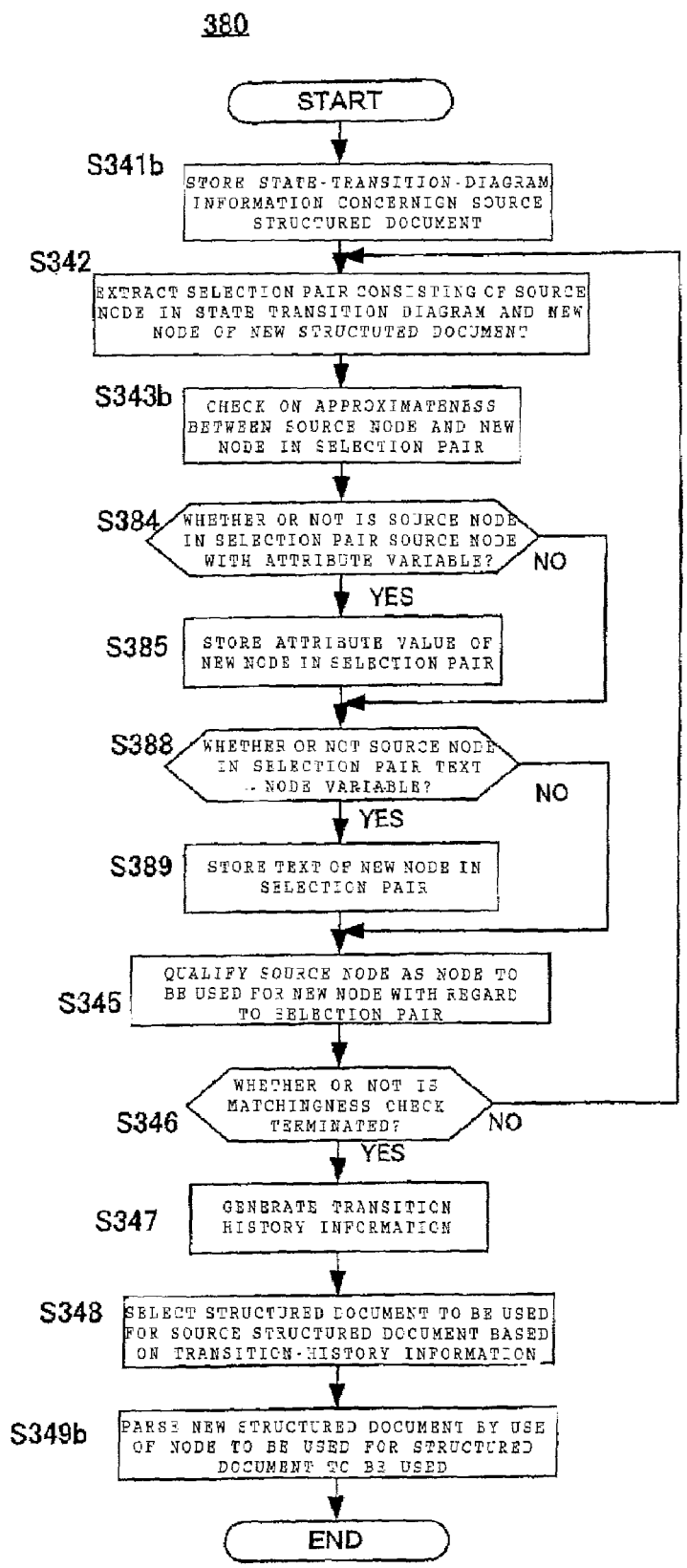
FIG. 17 is a flowchart of a sixth structured document processing method.

FIG. 17 is a flowchart of the structured-document processing method 380. The same step reference numerals will be used to designate steps which are the same as those of the structured-document processing method 340 (shown in FIG. 15). The reference numerals which have designated the steps in the structured-document processing method 340 will be used in the structured-document processing method 380, with "b" suffixed, to designate steps which have been incorporated in, or added to, the structured-document processing method 340. Descriptions will be provided for differences between the structured-document processing method 380 and the structured-document processing method 340. In the structured-document processing method 380, steps S384, S385, S388 and S389 have been added to the structured-document processing method 340. However, (a) only steps S384 and S385 may be added, or (b) only steps S388 and S389 may be added.

With regard to the structured-document processing method 380 where a difference between predetermined attribute values in the respective predetermined element names is regarded as being within the range of matchingness, in step S341b (a state-transition-diagram information storing step), a predetermined source node in the state transition diagram is set to a source node with an attribute variable which a predetermined attribute is defined as. In step S343b (a matchingness check step), when a source node in a selection pair is a source node with an attribute variable, and concurrently when the element name and the attribute name of the source node in the selection pair are equal to the element name and the attribute name of the new node in the same selection pair, it is decided that there is matchingness between the source node and the new node in the selection pair. In step S385 (an attribute variable value storing step), with regard to the selection pair which has been decided to have matchingness between the source node and the new node, if the source node in the selection pair is a source node with an attribute variable (in step S384), an attribute value of the new node in the selection pair is stored as the attribute variable value. In step S349b (a source structured document using step), in a case where a result of parsing a node to be used for a new node of a new structured document, the node to be used being a node of a structured document to be used for the new structured document, is going to be used for a result of parsing the new node of the new structured document, if the node to be used is a source node with an attribute variable, a result of the parsing, which is obtained by substituting an attribute variable value for the attribute variable in a result of parsing the node to be used for the new node of the new structured document, is used for a result of parsing the node to be used for the new node of the new structured document.

With regard to the structured-document processing method 380 where a difference between predetermined texts in the respective predetermined text nodes is regarded as being within the range of matchingness, in step S341b (a state-transition-diagram information storing step), a source node as a predetermined text node in the state transition diagram is set to a text node variable. In step S343b (a matchingness check step), when a source node and a new node in a selection pair are a text node variable and a text node, respectively, it is decided that there is matchingness between the source node and the new node. In step S389 (a text node variable value storing step), with regard to the selection pair which has been decided to have matchingness between the source node and the new node, if the source node in the selection pair is a text node variable (in step S388), a text of the new node in the selection pair is stored as the text node variable value. In step S349b (a source structured document using step), in a case where a result of parsing a node to be used for a new node of a new structured document, the node to be used being a node of a structured document to be used for the new structured document, is going to be used for a result of parsing the new node of the new structured document, if the node to be used is a text node variable, a result of parsing the node to be used for the new node of the new structured document is used for an text node variable value of the new node.

EMBODIMENT 1

According to Embodiment 1, in a case where a source structured document and a new structured document are compared with each other in terms of their respective structured partitions (for example, nodes) as partitions concerning their respective structures, a byte string of the source structured document and a byte string of the new structured document are directly compared with each other, or a character string of the source structured document and a character string of the new structured document are directly compared with each other. In other words, a byte string in a structured partition of a new structured document is compared with a byte string in a corresponding structured partition of a source structured document, or a character string in the structured partition of the new structured document is compared with a character string in the corresponding structured partition of the source structured document. On the basis of these comparisons, it is checked whether or not there is a structured partition in the source structured document which can be used, as a result of parsing each of the structured partitions in the new structured document. Incidentally, in Embodiment 1, an XML document is adopted as a structured document.

It takes a longer computation time to parse an XML document. It has been awaited to reduce this load for a system of processing a large amount of XML documents. An XML document is a form which humans can write and read easily. Because of its nature, however, the XML document is highly redundant as a syntax having a form which is read and written by a machine. A specific load which has been caused owing to the high redundancy is as follows.

(a) An XML document is described by use of a character set of Unicode. For this reason, in a step of decoding a character code, an individual character code (for example, ASCII, ISO-8859-1, UTF-8, Shift-JIS and the like) has to be decoded in terms of which character in Unicode the individual character code corresponds to.

(b) In steps of performing a lexical analysis and parsing, with regard to a character string of an XML document, its tags are recognized, and accordingly it is checked, with reference to XML generating rules, whether or not there is a syntax error, such as whether or not a character string in each of the element name, the attribute name, an attribute value and the text node is described by use of characters which are not included in a set of characters which are allowed to be used there.

(c) With regard to a well-formed check, it is checked whether or not the name of a start tag and the name of an end tag match each other, and whether or not there are two attribute names or more of the same name in a single element.

(d) In a process in the namespace, the namespace declarations are recognized, and thereby URIs of the respective namespaces are bound by use of the prefixes of their respective elements and attributes. In addition, it needs to be checked whether or not an undeclared prefix has been used.

In the XML, the same or similar contents can be expressed by use of various byte strings or various character strings. However, byte strings and character strings which are actually distributed are similar to each other. This tendency is conspicuous particularly in a case where the Web service and the like by use of the XML are used. In many cases, an application program leaves a process of generating a message, which has been encoded by use of the XML, performed by middleware such as a library and an application server, although an XML document is generated by the application program. Consequently, byte strings and character strings of the respective XML documents having similar contents, which have been generated by the same library, are similar to each other. The present invention has the feature that it utilizes such similarities for parsing an XML document, although, heretofore, the similarities have not been used for parsing an XML document.

In the first round of processing an XML document, an XML parsing device according to the present invention performs the same syntax analysis as the conventional XML parsing device does. In addition to this, the XML parsing device of the present invention stores the XML document, as the byte string (or the character string), into a predetermined storage unit.

FIG. 18 shows a data structure with which to store a result of parsing an XML document. FIG. 18 is described by use of a notation form in compliance with a class diagram of UML (Unified Modeling Language). A result of parsing an XML document is broken down into events as a data structure based on the class diagram, and is stored into a predetermined storage unit. In the present invention, the XML document is partitioned according to predetermined structured partitions. The partitioning is performed on the basis of an event of a class located at a leaf in a tree structure of the class diagram of FIG. 18. An event which has been defined in the class diagram may be caused to be completely the same as an event which has been defined by use of SAX (Simple API for XML), or may be changed depending upon necessity. In order to utilize a result of parsing a source XML document for the parsing of a new XML document efficiently, an event other than the event which has been defined by use of SAX can be added, or a plurality of events which have been defined by use of SAX can be united into a single event.

Figure 19:
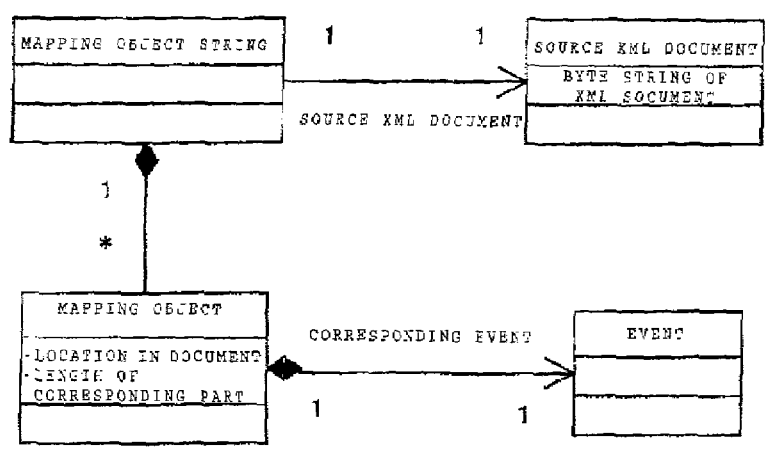
FIG. 19 is a mapping object diagram showing a corresponding relationship between an event and a result of parsing an XML document.

FIG. 19 is a mapping object diagram showing a corresponding relationship between an event and a result of parsing an XML document. The mapping object diagram is also in compliance with the UML notation form.

With regard to the recording of a result of parsing, all of the events which are a result of parsing are recorded, and a location of each of the events, or a part from which byte (what ordinal number the byte is in) to which byre (what ordinal number the byte is in) of the XML document the event corresponds to, is recorded.

Descriptions will be provided for the extracting of a difference (more specifically, algorithm for extracting a difference and a data structure with which to store the difference). In the second and ensuing rounds of processing the XML document, first of all, a process is performed of comparing between the XML document and an already-stored XML document on which parsing has been performed. In order to perform this comparison process, a difference by a byte unit (or a character unit) is calculated. This difference calculation is required to be performed so efficiently that time needed for the calculation can be reduced. Various conventional algorithms can be used for this difference calculation. However, in the present invention, an efficient difference generation specialized for an XML parsing device is performed.

A threshold value is determined in advance. Thereby, when a difference amount exceeds the threshold, it is decided that the approximateness is small. At this time, accordingly, the difference calculation is terminated, even if the calculation is in the middle of being performed. When a difference is intended to be calculated in a rigid manner, if the length of one of two documents to be compared is defined as N, the number of times of the comparison is in the order of the second power of N in a worst case. By contrast, if two documents to be compared are approximately equal to each other, the number of times of the comparison becomes very small. For example, if there is no difference which is longer than M (M<N), the number of times of the comparison is in the order of the second power of M in a worst case. The difference calculation can be performed efficiently by choosing only documents which are highly approximate to each other as objects of the calculation. An object of the difference calculation according to the present invention is to fetch only documents which are highly approximate to each other.

Figure 20:
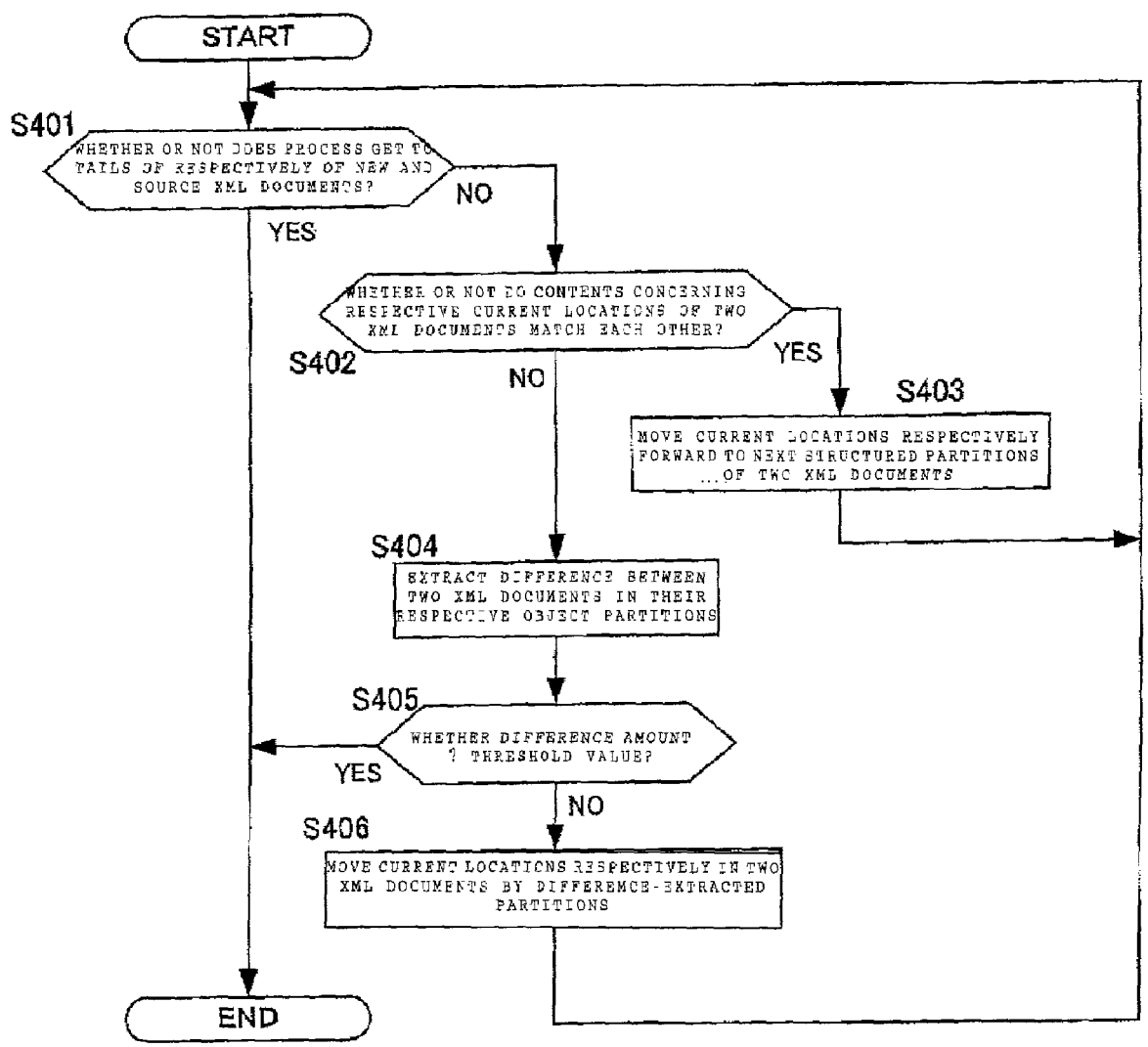
FIG. 20 is a flowchart of a routine for determining whether or not a difference amount exceeds the threshold value in a case where the difference operation is performed.

FIG. 20 is a flowchart of a routine for determining whether or not a difference amount exceeds the threshold value when the difference is taken. First of all, in step S401, it is determined whether or not the current locations of the two respective XML documents (locations where the two respective XML documents are compared) have reached their respective ends. If the result of this determination is YES, the routine is terminated. If the result of this determination is NO, the process proceeds to step S402. In step S402, it is determined whether or not contents of the respective partitions at the current locations match each other in the two respective XML documents. If a result of the determination in step S402 is YES, the process proceeds to step S403. If a result of the determination in step S402 is NO, the process proceeds to step S404. In step S403, the current locations are moved forward to the head of the next partitions in the two XML documents. In step S404, a difference of the two respective XML documents is extracted. In step S405, the difference amount is calculated, and it is determined whether or not the difference amount thus calculated exceeds a predetermined threshold value. According to this calculation of the difference amount, a post-updated difference amount is obtained by finding the sum of a pre-updated difference amount and the difference amount concerning the partitions which has been calculated in step S404. The difference amount can be also calculated, for example, by setting an initial value of the difference amount at zero, and by incrementing the difference amount by one each time a result of the determination in step S402 is NO. If a result of the determination in step S405 is YES, the routine is terminated. If a result of the determination in step S405 is NO, the process proceeds to step S406. In step S406, the current location in the respective XML documents is moved toward the ends by the partitions on which the difference extraction has been performed. Thereafter, the process returns to step S401.

When the difference is actually intended to be extracted, the difference extraction is performed while the respective XML structures are being recognized. Specifically, when contents of the respective XML documents do not match each other, a corresponding event which has already been parsed is fetched, and the new document is partially parsed starting at the initial point of the event. The ensuing process is different depending on a result of this parsing.

Figure 21:
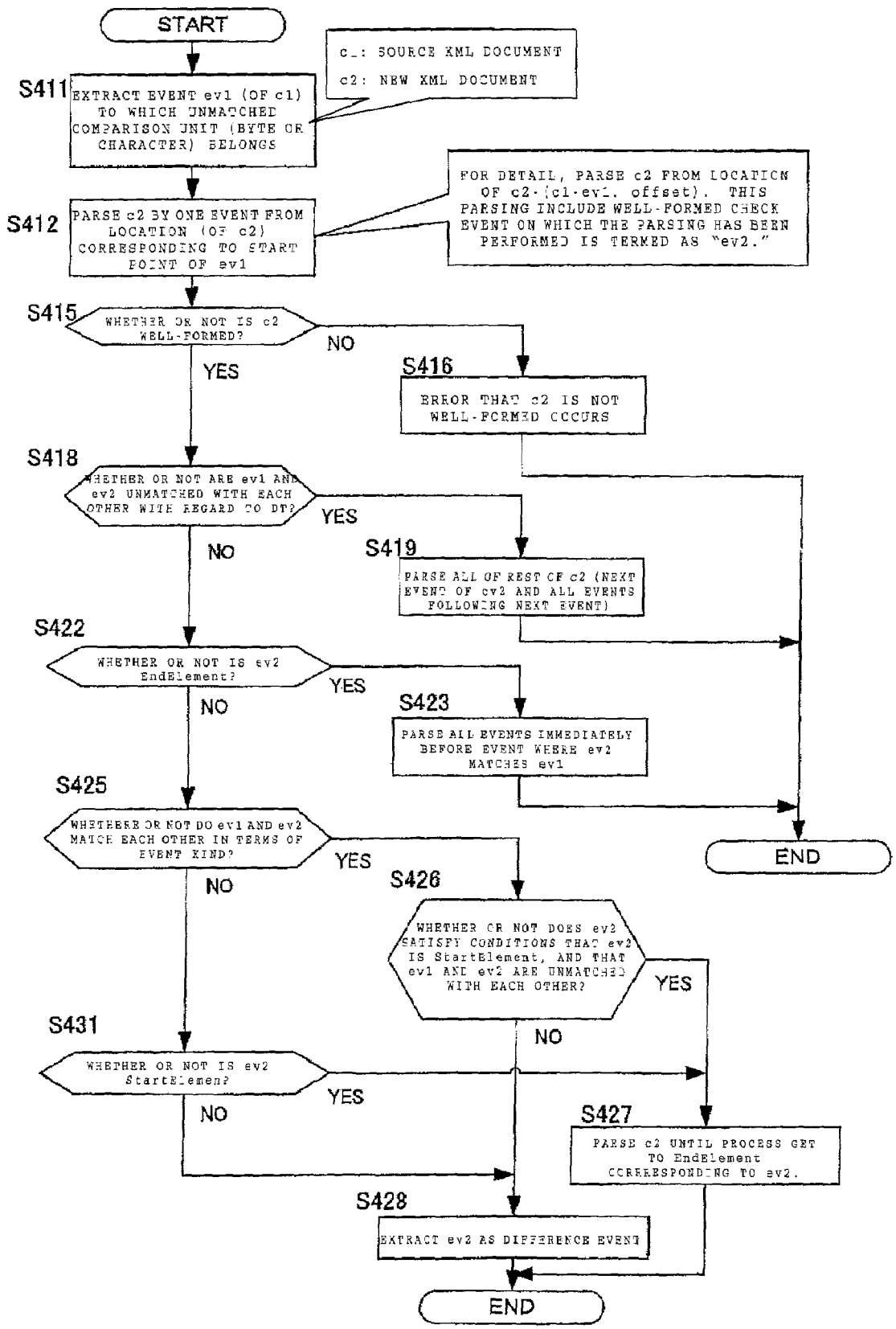
FIG. 21 is a flowchart of a routine for a parsing process to be performed when an event of a source XML document and an event of a new XML document are different from each other.

FIG. 21 is a flowchart of a routine for a parsing process to be performed when an event of a source XML document and an event of a new XML document do not match each other. A unit to be used for a comparison when it is determined whether or not a source XML document c1 and a new XML document c2 match each other is one byte or one character. An event ev1 to which a comparison unit in the source XML document c1, which does not match a corresponding comparison unit in the new XML document, belongs is extracted (S411). Subsequently, the new XML document c2 is parsed by one event from a location in the new XML document c2 corresponding to an initial point of the event ev1 of the source XML document c1. At this time, the event of the new XML document c2 on which a parsing is performed is termed as ev2. By parsing the event ev2, it is checked whether or not the new XML document c2 is well-formed. In a case where it is decided in step S415 that the new XML document c2 is well-formed, the process proceeds to step S418. In a case where it is decided that the new XML document c2 is not well-formed, the process proceeds to step S416. In step S416, a notice that the new XML document c2 is not well-formed is posted to the application program, instead of an event being posted. Thereafter, the routine is terminated.

Processing to be performed posterior to step S418 is divided into the following depending on contents respectively of the events ev1 and ev2.

(1) In a case where the event ev2 is of a DT (Document Type), and concurrently, the event ev1 is not the same as the event ev2 (step S418→step S419): The DT affects an entity reference throughout the document. For this reason, if this part has been changed, a normal parsing is performed on the entire document (in step S419).

(2) In a case where the event ev1 is EndElement (step S422→step S423): In this case, if a new document is well-formed, the same EndElement as occurs in the event ev1 is supposed to necessarily occur in the event ev2 at the same depth (in a tree structure of an XML document). For this reason, a partial parsing is performed on the new document at the same depth to a location where the events ev1 and ev2 match each other (in step S423). Thereby, an event string thus generated is assigned as a difference event string (specifically, a partial event string if evidiff[j] which will be described later with regard to step S471 of FIG. 24 mentioned below).

(3) In a case where the event type of the source XML document and the event type of the new XML document are the same as each other (a result of the determination in step S425 is YES): When an event is referred to simply, it is likely that the event is limited to being an event which has been defined by use of SAX. With this taken into consideration, an event type will be defined. The event type means to be an event equivalent to a leaf in the class diagram of FIG. 18. As described above, the event equivalent to the leaf does not have to be caused to completely match an event which has been defined by use of SAX. The event equivalent to the leaf includes an event which has been defined by use of SAX, and additionally includes an event which is obtained by adding another event depending on necessity, or by putting together a plurality of events, which have been defined by use of SAX, into a single event, for the purpose of performing a process at a higher speed through fully utilizing an event as a result of parsing the source XML document or through putting together events which rarely occur.

(3-1) In a case where the event ev2 is StartElement, and concurrently the namespace declaration of the event ev1 and the namespace declaration of the event ev2 are different from each other (in step S425→in step S426→in step S427):

Specific Example

Source XML document: <a xmlns="ns1"><b/></a/>

New XML document: <a xmlns="ns2"><b/></a/>

In this case, it is likely that all of the QName in an element are different from each other. For this reason, all in the element are parsed (in step S427). (parts of the tree are parsed).

(3-2) In the other case (in step S425→in step S426→in step S428): There is no non-local affects that are different between the events ev1 and ev2. For this reason, the event ev2 is adopted as a difference of the event ev1 (in step S428).

(4) In a case where the types of the respective events are different from each other (a result of the determination in step S425 is NO):

(4-1) When the event ev2 is StartElement (in step S431→in step S427): As in the case of (3-1), an element corresponding to the event ev2 is parsed (in step S427). The result of the parsing is adopted as the difference.

Specific Example

Source XML document: <a><b/></a>

New XML document: <a><b>test</b></a>

(4-2) In the other case (in step S431→in step S428): The event ev2 has no non-local affect. For this reason, the event ev2 is adopted as the difference (in step S428).

While a difference amount is being calculated in this manner, if the difference amount exceeds a predetermined threshold value, the process is changed. Processing concerning the new XML document is divided into the following depending on the difference amount.

(a) In a case where an XML document to be compared, whose difference is sufficiently small, is found: A difference amount which has been generated is merged with a source event string, and this is posted to the application program. In this case, it is expected that almost all of the events which have been generated are reused.

(b) In a case where an XML document to be compared, whose difference is sufficiently small, is not found: A parsing by use of the difference is abandoned. In common with the first round of parsing the XML document, the same parsing as the conventional XML parsing device performs is performed. In addition, the XML document is stored as a byte string (or a character string). Thereby, a result of the parsing is recorded. Accordingly, this XML document is added as an object to be compared on which parsing is performed subsequently. Thereafter, a document which is highly approximate to this XML document can be parsed efficiently.

Figure 22:
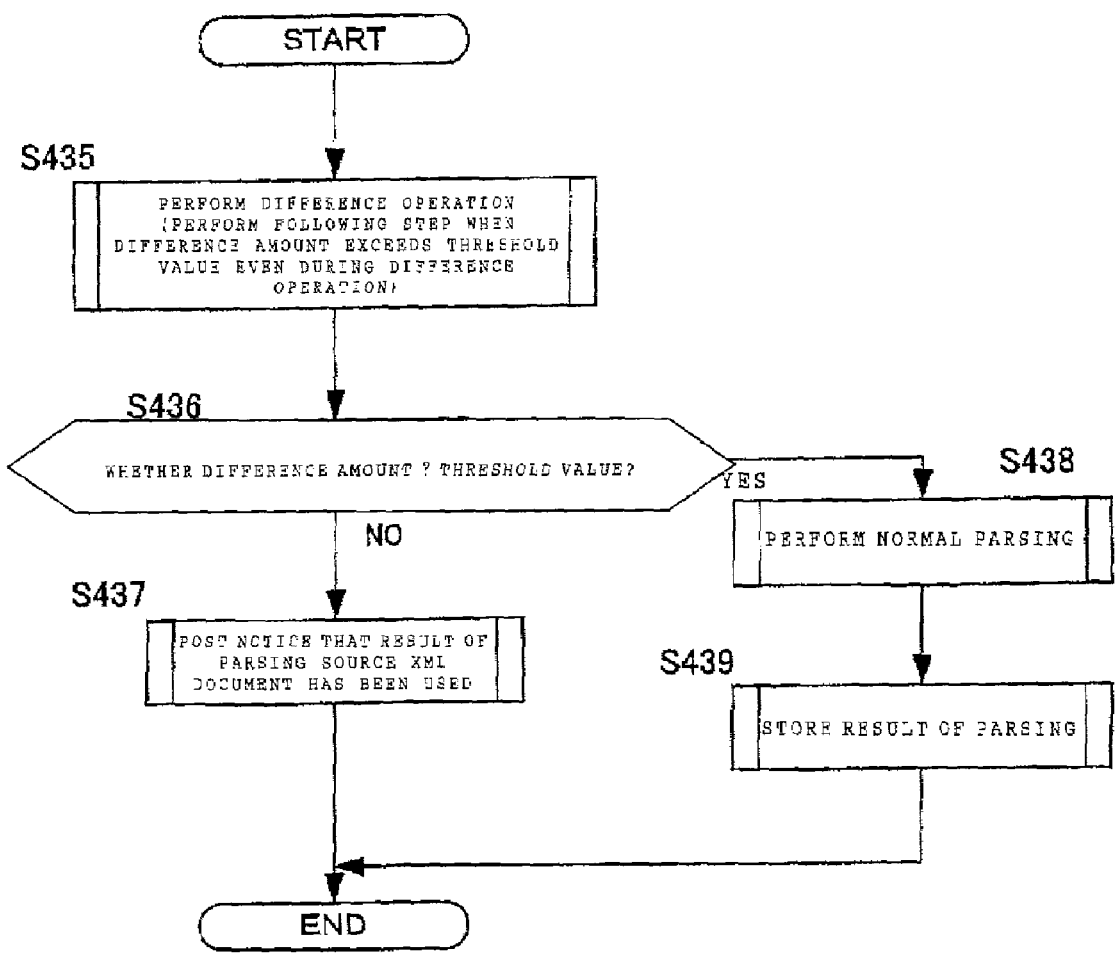
FIG. 22 is a flowchart of a routine concerning the processing of an XML document on the basis of a difference amount.
Figure 23:
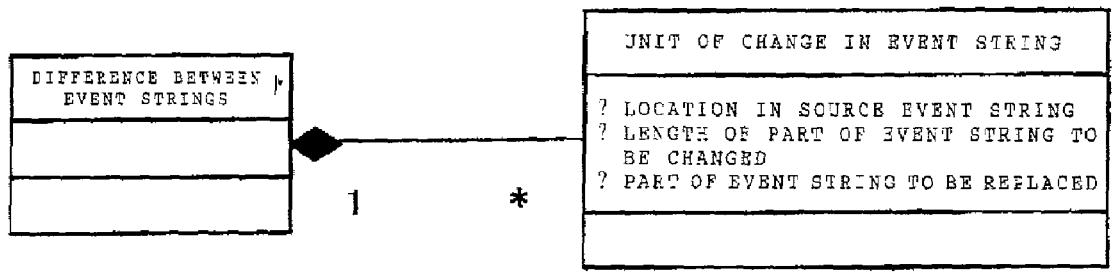
FIG. 23 is a class diagram expressing information concerning the final difference.

FIG. 22 is a flowchart of a routine concerning the processing of an XML document on the basis of a difference amount. It is checked whether or not each of the structured partitions of a source XML document and each of the corresponding structured partitions of a new XML document match each other, and thereby an amount of difference between the source XML document and the new XML document is calculated (in step S435). If the difference amount exceeds the threshold value, the process proceeds to step S438. Alternatively, when the entire check on whether or not each of the structured partitions of a source XML document and each of the corresponding structured partitions of a new XML document match each other is completed, it is determined, in step S436, whether or not a difference amount exceeds the threshold value. If a result of the determination is NO, the process proceeds to step S437. If a result of the determination is YES, the process proceeds to step S438. In step S437, a notice that a result of parsing the source XML document is used is posted to the application program. In step S438, a normal parsing is performed on the new XML document, or a process of parsing the new XML document is performed to the tail of the new XML document from the head or from an event where the using of a result of parsing the source XML document has been abandoned. In step S439, with regard to the new XML document, the result of the parsing in step S438 is stored in the storage unit. Thereby, the new XML document will hereafter play a role as a source XML document. FIG. 23 is a class diagram expressing information concerning the final difference.

Figure 24:
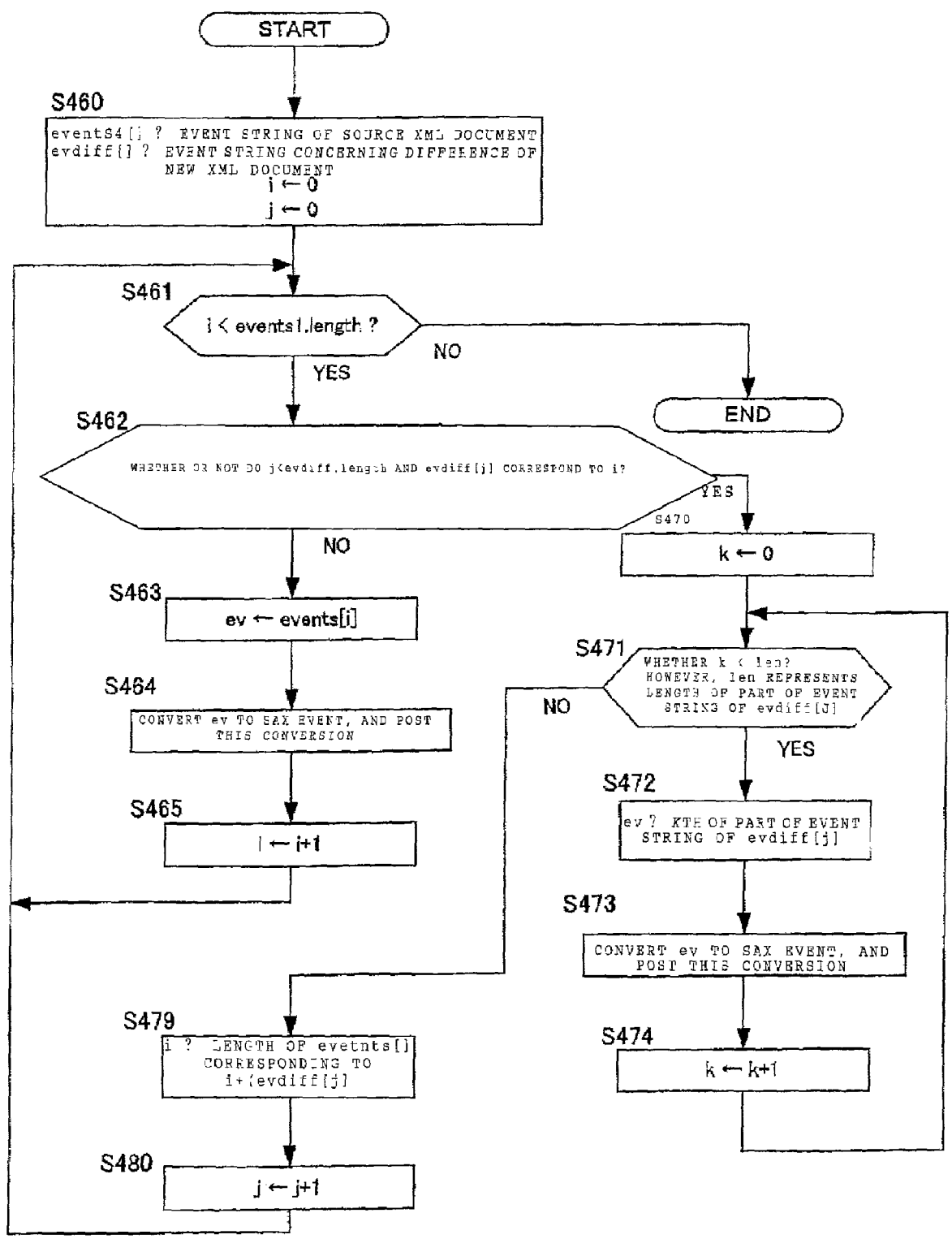
FIG. 24 is a flowchart concerning the generating (replaying) of a result of parsing a new XML document.

FIG. 24 is a flowchart concerning the generating (replaying) of a result of parsing a new XML document. In a case where an operation as SAX is performed, while an event string of an XML document which has already been parsed is being replaced with an SAX event, this replacement is posted to the application program sequentially. With regard to an event which has a difference, the event is merged with the difference, and the merging is posted to the application program. In FIG. 24, notation is in compliance with an object-oriented language, for example, the rule of Java (a registered trade mark). In other words, "." stands for a method of an instance. ".length" is to return the length of an array. The array is defined from zero to (*.length-1). In step S460, an event string of the source XML document is substituted for an array events1[ ], an event string concerning the difference of the new XML document is substituted for an array evdiff[ ], and zero is substituted, as an initial value, for i and j. In step S461, it is checked whether or not the posting of all of the events has been completed with regard to the new XML document. If the posting has not been completed, the process proceeds to step S462. In step S462, it is checked whether or not the current difference (i.e., evdiff[j]) of the new XML document corresponds to the current difference (i.e., events[i]) of the source XML document, or whether or not the current events[i] needs to be an alternative to evdiff[j]. In addition, it is checked whether or not the current evdiff[j] is within the array evdiff[ ]. If both a result of the former check and a result of the latter check are YES, the process proceeds to step S470. If one of the two results of the respective checks is NO, the process proceeds to step S463.

If one of the two results of the respective checks in step S462 is NO, the current events1[i] is posted to the application program (in steps S463 and S464), and i is incremented by one. Thereafter, the process returns to step S461.

If both of the two results of the respective checks are YES, zero is substituted for k (in step S470). Each of the evdiff[j] is associated with the partial event string event_j_sub[k]. The event_j_sub[k] corresponds to an event which has been obtained by newly parsing the new XML document corresponding to event[j]. Thus, each of the partial event strings event_j_sub[k] corresponding to the current evdiff[j] is posted to the application program (in step S471→in step S472→in step S473→in step S474→in step S471 •••). When the posting corresponding to the partial event strings which are objects to be posted is completed, i is incremented by the length of evetnts[ ] corresponding to evdiff[j] (in step S479). In addition, j is incremented by one (in step S480). Thereafter, the process returns to step S461.

Specific descriptions will be provided further.

First Example of a Parsing Process in Embodiment 1

Suppose that the below-mentioned XML document is parsed as a source XML document at the first round of the parsing.

```
<SOAP-ENV:Envelope
xmlns:SOAP-ENV="http://schemas.xmlsoap.org/soap/envelope/"
xmlns:xsi="http://www.w3.org/1999/XMLSchema-instance"
xmlns:xsd="http://www.w3.org/1999/XMLSchema">
    <SOAP-ENV:Body>
        <ns1:doGetCachedPage        xmlns:ns1="urn:GoogleSearch"
            SOAP-ENV:encodingStyle="http://schemas.xmlsoap.org/
soap/encoding/">
            <key
xsi:type="xsd:string">00000000000000000000000000000000</key>
            <url xsi:type="xsd:string">http://www.google.com/
            <url>
        </ns1:doGetCachedPage>
    </SOAP-ENV:Body>
</SOAP-ENV:Envelope>
```

A result of the parsing to be stored at this time is as follows.

```
00: Start Document: (0, 0), -
01: Start Element: (0, 88), "SOAP-ENV:Envelope" ..
.. (omitted) ..
12: Characters: (777, 22), "http://www.google.com/"
.. (omitted) ..
20: End Document: (2109, 0), -
```

For example, (777, 22) in Line 12 means that "h" at the head of "http://www.google.com/" is the 777th character from the first character in the source XML document, and that the total number of characters to be used in the "http://www-.google.com/".

Next, let's think about a case where the below-mentioned XML document is parsed as a new XML document.

```
<SOAP-ENV:Envelope
xmlns:SOAP-ENV="http://schemas.xmlsoap.org/soap/envelope/"
```

-continued

```
xmlns:xsi="http://www.w3.org/1999/XMLschema-instance"
xmlns:xsd="http://www.w3.org/1999/XMLSchema">
    <SOAP-ENV:Body>
        <ns1:doGetCachedPage xmlns:ns1="http://www.yahoo.com/"
            SOAP-ENV:encodingStyle="http://schemas.xmlsoap.org/
soap/encoding/">
            <key
xsi:type="xsd:string">00000000000000000000000000000000</key>
            <url xsi:type="xsd:string">http://www.yahoo.com/</url>
        </ns1:doGetCachedPage>
    </SOAP-ENV:Body>
</SOAP-ENV:Envelope>
```

In the new XML document, the "http://www.google.com/" of the source XML document is replaced only with the "http://www.yahoo.com/."

Difference Extraction:

At this time, according to a processing system of the present invention, the new XML document goes through its comparison with an XML document which has already been parsed. It is verified that the new XML document and the already-parsed XML document match each other in the range of up to the 787th character of the two respective documents (up to the http://www. of the http://www.yahoo.com/), and it is found that the two documents are different from each other at the 788th character of the two respective documents (i.e., "g" of the already-parsed XML document, and "y" of the new XML document).

On the basis of a result of the process which has been stored, it will be found that the 788th character included in the 22 characters following the 777th character is within a text node (Characters). A partial XML syntax analysis is performed on the new document, as the text node, starting at the 777th character, and the analysis goes through to the 798th character (the head of the "</url>"). The text node "http://www.yahoo.com," which has been obtained by the partial XML syntax analysis, is stored as an alternative to the text node "http://www.google.com/" in the already-parsed document, and a variable representing the difference amount is changed from zero to one.

Since the difference amount has not exceeded the threshold value, the byte string comparison is continued. It is verified that each of the sequential characters following the 799th character (the start of the ensuing event) in the already-parsed document and each of the sequential characters following the 798th character in the new document match each other. When it has been verified that the byte string in the already-parsed document and the byte string in the new document match each other up to the ends of the two documents, the process of extracting the difference is terminated.

A difference result which has been obtained by performing the process of extracting the difference will be shown as follows.

Offset 12 length 1=>length 1

<Characters "http://www.google.com/"

>Characters "http://www.yahoo.com/"

In the "Offset 12 length 1=>length 1," the "Offset 12" means the 12th line of the above result of the parsing in the source XML document. In addition, with regard to the new XML document, the "Offset 12" means that the 12th character of a result of parsing the source XML document is changed, so that the single event (the "length 1" on the left of the "=>") in Line 12 of the source XML document has been replaced with the single event (the "length 1" on the right of the "=>") of the new XML document.

Generation of the Result:

The events of the already-parsed document are used as the SAX events from the 0th event to the 11th event. The text node "http://www.yahoo.com/" on which partial processing has been newly performed is used for the 12th event. The events of the already-parsed document are used as the SAX events from the 13th event to the 20th event.

Second Example of a Parsing Process in Embodiment 1

In order to describe the following example, supposed that the below-described document has already been parsed.

```
<aaa>
    <bbb xxx="xxx"/>
</aaa>
```

A result of the parsing which has been stored at this time is as follows.

```
00: Start Document: (0, 0), —
01: Start Element: (0, 5), "aaa"
02: Characters: (5, 3), "¥n "
03: Empty Element: (8, 16), "bbb", [Attribute name "xxx",
    Value "xxx"]
04: Characters: (24, 1), "¥n"
05: End Element: (25, 6), "aaa"
06: End Document: (31, 0), —
```

Next, let's think about a case where a corresponding sentence of a new XML document as follows is parsed.

```
<aaa>
    <ccc yyy="zzz"> test </ccc>
</aaa>
```

In this document, first of all, it will be found that, at the 9th character, "b" is replaced with "c" (A space is counted as one character. The ¥n means to a line feed, and is counted as one character.). On the basis of the result of the parsing which is stored, it will be found that the 9th character corresponds to the EmptyElement event "bbb xxx="xxx"/>" of the already-parsed document. When events including the 9th character of the new document are parsed, it will be found that the events are the StartElement event "<ccc yyy="zzz">." Since the EmptyElement event and the StartElement event are different from each other in terms of their respective types, and since the events of the new document are StartElement, the partial tree is parsed. The events up to the EndElement corresponding to the StartElement are parsed, or the part expressed by the "<ccc yyy="zzz">test </ccc>" is parsed. Thereafter, the process returns to the difference calculation. The aforementioned calculation enables a difference of the events as follows to be found.

Offset 3 length 1 => length 3
< EmptyElement "bbb", [Attribute Name "xxx", Value "xxx"]

-continued

```
> StartElement "ccc", [Attribute Name "yyy", Value "zzz"]
> Characters " test "
> EndElement "ccc"
```

Generation of the Result:

The events of the already-parsed document are used as the SAX events from the 0th event to the 2nd event. Three events on which partial processing has been newly performed are used for the events from the 3rd event to the 5th event. The events from the 4th event to the 6th event of the already-parsed document are used as the SAX events from the 6th event to the 8th event.

Third Example of a Parsing Process in Embodiment 1

In order to describe the following example, supposed that the below-described document has already been parsed.

```
<aaa>
    <bbb xxx="xxx"/>
</aaa>
```

At this time, let's think about a case where a sentence of a new XML document as follows is parsed.

```
<aaa>
    <bbb xxx="xxx"> test </ccc>
</aaa>
```

In the new XML document, first of all, it will be found that, at the 22nd character, "/" is replaced with ">." On the basis of the result of the parsing which is stored, it will be found that the 22nd character corresponds to the EmptyElement event "<bbb xxx="xxx"/>" of the already-parsed document. When events including the 23rd character of the new document are parsed, it will be found that the events are the StartElement event "<bbb xxx="xxx">." Since the EmptyElement event and the StartElement event are different from each other in terms of their respective types, and since the events of the new document are StartElement, the partial tree is parsed. The events up to the EndElement corresponding to the StartElement are parsed, or the part expressed by the "<bbb xxx="xxx" test </ccc>" is parsed. However, the element name of this EndElement does not correspond to the element name of the StartElement. For this reason, it is found that the EndElement is not well-formed. Accordingly, the result of the parsing is regarded as an error.

Example of Applying Embodiment 1 to Web Service

Figure 25:
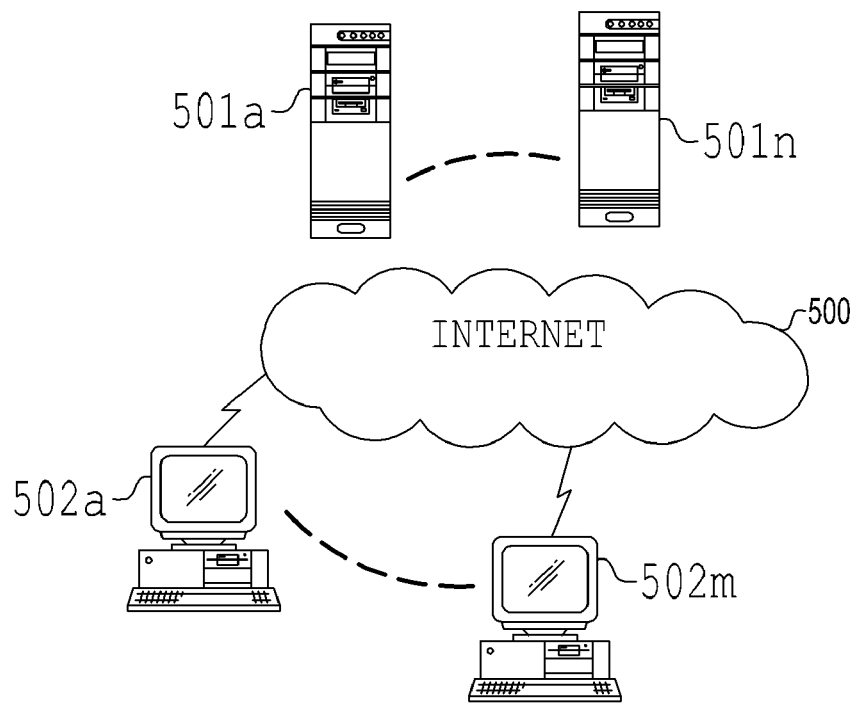
FIG. 25 is a diagram showing a system of the Web service.

A scene where the present invention functions effectively will be taken up next. FIG. 25 is a schematic diagram showing a system of the Web service. A plurality of servers providers 501a to 501n and a plurality of clients (requesters) 502a to 502m are connected to the Internet 500 or an intranet. In the Web service, each of the servers 501a to 501n is designed to accept a message of request from each of the clients 502a to 502m, and is designed to send back a message of response to the request. These messages are XML documents to be defined by use of SOAP. A structured-document processing device according to the present invention is packaged in each of the servers 501a to 501n and each of the clients 502a to 502m, and performs parsing of a message. In the Web service, an XML document to be parsed by a server is a document which has been created by a client which is the server's counterpart, and an XML document to be parsed by a client is a document which has been created by a server which is the client's counterpart. It should be noted that, in some cases, an XML document (a new structured document) to be parsed by the structured-document processing device according to the present invention may be created by a predetermined application program of a computer into which the structured-document processing device has been packaged. In addition, it should be noted that, in other cases, an XML document (a new structured document) to be parsed by the structured-document processing device according to the present invention may be an XML document which has been stored in a hard disc unit of the computer. Descriptions will be provided for specific examples of applying the present invention to the Web service.

(a) A case where a client in the Web service parses an XML document as a response from the server. In this case, the client knows which operation of which server the client has sent the request to, and accordingly knows which XML document the client needs to compare the response XML document with. In other words, the client may store a fist single XML document as an object to be compared for each operation, and thereafter, may make a comparison with the XML document selectively whenever the client calls the operation. As long as the process is performed in this manner, the number of objects to be compared will not be increased.

(b) A case where a server in the Web service parses an XML document as a request from a client. The server is configured to assign one URL to one operation in advance. In this case, if XML documents to be compared are switched depending on a URL from which a request has been sent, the number of objects to be compared can be reduced. In addition, if it is determined which client has sent the request on the basis of information concerning the IP address of the requester, the User-Agent header of the request and the like, the number of objects to be compared can be reduced. As long as the process is performed in this manner, the number of objects to be compared will not be increased.

Modification of Embodiment 1

With regard to the present invention, it may be assumed that the number of XML documents as objects to be compared so increase that the process will possibly be performed increasingly inefficiently as the parsing is repeated. However, after a single document having a high approximateness is found, the comparison need not be made any longer. In addition, if the comparison with XML documents having the respective low approximatenesses is continuously made, the difference amount exceeds the threshold value in an early stage. For these reasons, large load will not be imposed on the structured-document processing device according to the present invention.

By contrast, if a comparison is made between XML documents whose respective contents match each other up to the middle, but whose respective ensuing contents are significantly different from each other, the parsing takes longer so that the process will be performed less efficiently. As measures against such a case, rearrangement of order with which to make a comparison between XML documents to be compared, and placement of an upper limit on the number of XML documents to be compared, can be listed. For the purposes of rearranging the comparison order, and of reducing the XML documents to be compared in number, a technique of using statistical information concerning how often their results of the parsing have so far been used can be used. Otherwise, an algorithm for switching cache entries, such as LRU (Least Recently Used) and FIFO (First in First Out) can be used.

Result of Experiment with Embodiment 1

In a case where an XML document created by a certain processing system has already been parsed, a process of parsing another XML document which has been created by the same processing system can be performed at a higher speed. By contrast, a process of parsing an XML document which has still not been parsed is performed at a lower speed. In a case where documents which have been created by the same processing system, and which are approximate to one another, are frequently processed, a process of the parsing can be performed at a higher speed as a whole.

The present invention is extremely effective in processing the Web service in an application server, such as WebSphere (the name of a server sold by IBM United States), at a higher speed. With regard to the processing of the Web service, it has caused trouble that overhead in the XML process is large. The present invention is designed to cope with the trouble.

Figure 26:
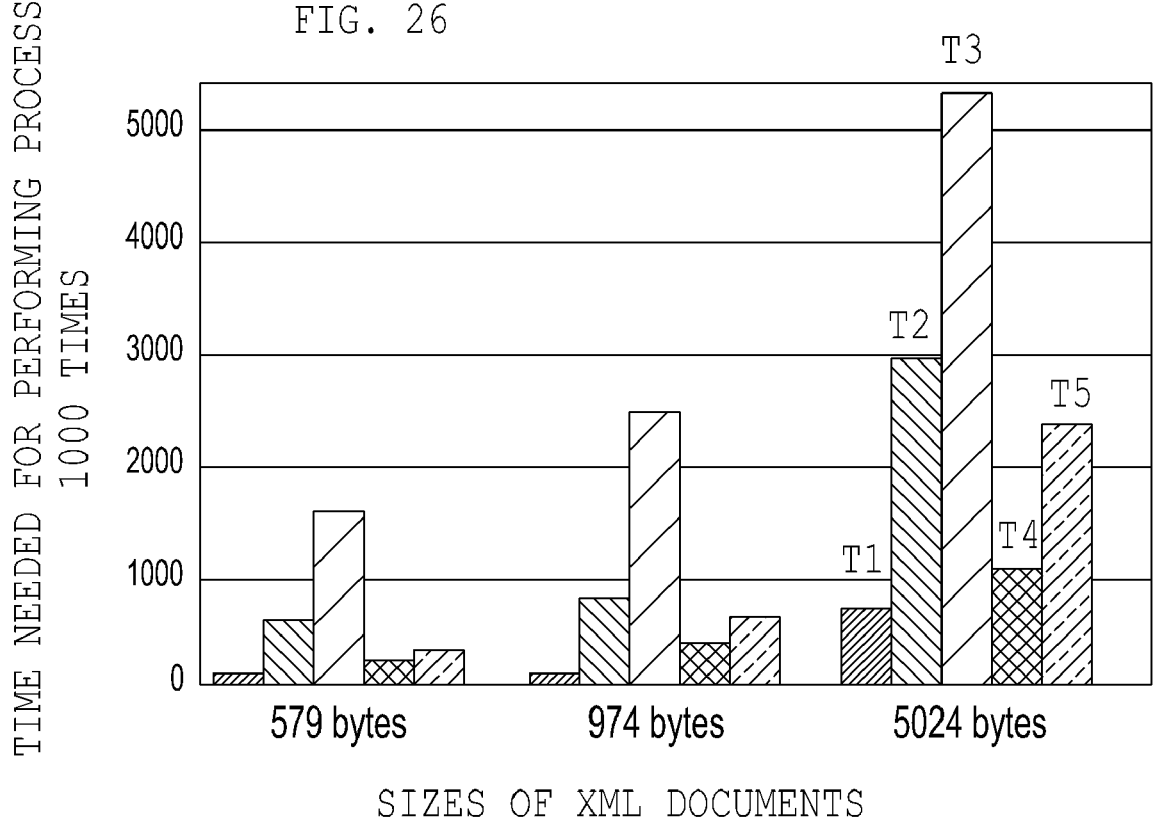
FIG. 26 is a graph showing a result of comparative experiment on times needed for processing to obtain a result of parsing respectively by use of the prior art and the present invention.

FIG. 26 is a graph showing a result of comparative experiment on times needed for processing to obtain a result of parsing respectively by use of the prior art and the present invention. Times needed for processing various XML documents (579 bytes+1 change, 974 bytes+8 changes, and 5024 bytes+16 changes) respectively by use of a SAX parser (Xerces2 SAX) of Apache Xerces 2.6.2 which is the most commonly-used conventional SAX parser and by use of the present invention (Diff+EventReplay) were measured. The times needed for the process means to be total times for which the Xerces2 SAX and the Diff+EventReplay respectively repeated the same parsing process one thousand times. The "change" means to be the number of events which are different between the source XML document and the new XML document. In some cases, a single event in the source XML document may be replaced with a plurality of events in the new XML document. In this experiment, however, the number of events in the source XML document and the number of events in the new XML document, the respective events being different between the source XML document and the new XML document, corresponded to each other with a ratio of 1:1. For example, the "8 changes" means that the source XML document and the new XML document were different from each other in eight events. The environment used for the experiment was Sun JDK1.3 in a notebook computer Think Pad T30 (the clock frequency was 1.8 GHz. The memory size was 512 MB. The "Think Pad" is a registered trademark of a notebook computer made by IBM.). In the graph shown in FIG. 26, with regard to each of the three XML documents with the respective sizes, the five bars from the left to the right are designated respectively by reference numerals T1 to T5. T1 represents time needed for reading the new XML document in the form of bytes. T2 represents time needed for reading the new XML document in the form of characters. T3 represents time needed for performing the process by use of the conventional SAX parser (Xerces2 SAX). T4 represents time needed for parsing a difference part in the new XML document. T5 represents the sum of T4 and time needed for replaying (time needed for posting the event string). Time needed for performing the process by use of the present invention is expressed by the sum of T1 and T5, or the sum of T2 and T5. The time needed for performing the process by use of the present invention was able to be reduced in comparison with T3 as the time needed for performing the process by use of the conventional SAX parser (Xerces2 SAX).

EMBODIMENT 2

In Embodiment 2, in a case where a source structured document and a new structured document are going to be compared by a unit of their respective structured partitions (for example, their respective nodes), a state transition diagram of the state machine is used. In Embodiment 2, an XML document is adopted as a structured document. Incidentally, each of the states in the state transition diagram of the state machine is associated respectively with the structured partitions of a structured document to be used. In addition, each of the states in the state transition diagram of the state machine will be termed as "nodes" depending on necessity.

FIG. 27 is a diagram showing, in the form of a UML class diagram, nodes which are registered respectively as states in the state transition diagram of the state machine, as in FIG. 18. Nodes equivalent to leaves of a tree structure are registered into the state transitions diagram. The nodes equivalent to the leaves are associated respectively with SAX events.

Let's think about the following XML document c21 as an example.

C21:<p:e    xmlns:p="urn:example">text<x    a="ccc"
p:b="ddd"/></p:e>

When the XML document c21 is parsed into events concerning leaf nodes in the UML diagram of FIG. 27, the following result is obtained. Incidentally, reference numerals at the left end of each line are line numbers to be assigned for the convenient purpose of the description.

```
801:[StartTag: name="e" uri="urn:example"
802:    {Attributes: }
803:    {NSDecls: (prefix="p", uri="urn:example")}]
804:[Text: value="text"]
805:    [EmptyElementTag: name="x" uri=""
806:    {Attribute: (name="a", uri="", value="ccc")
807:                (name="b", uri="urn:example", value="ddd"
                    )]
808:    [EndTag: name="e" uri="urn:example"]
```

Figure 28:
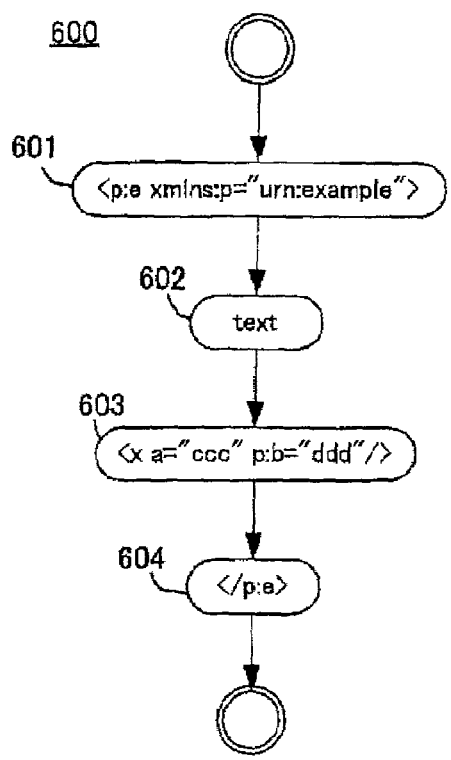
FIG. 28 is a state transition diagram concerning an XML document c21.

The line numbers 801 to 803, the line number 804, the line numbers 805 to 807 and the line number 808 correspond respectively to nodes in the state transition diagram. When a state machine is intended to be created, these event strings may be regarded as state (node) strings, and accordingly the event strings may be arranged in order of the documents. FIG. 28 is a state transition diagram 600 concerning the XML document c21. The XML document c21 has states 601 to 604.

Figure 29:
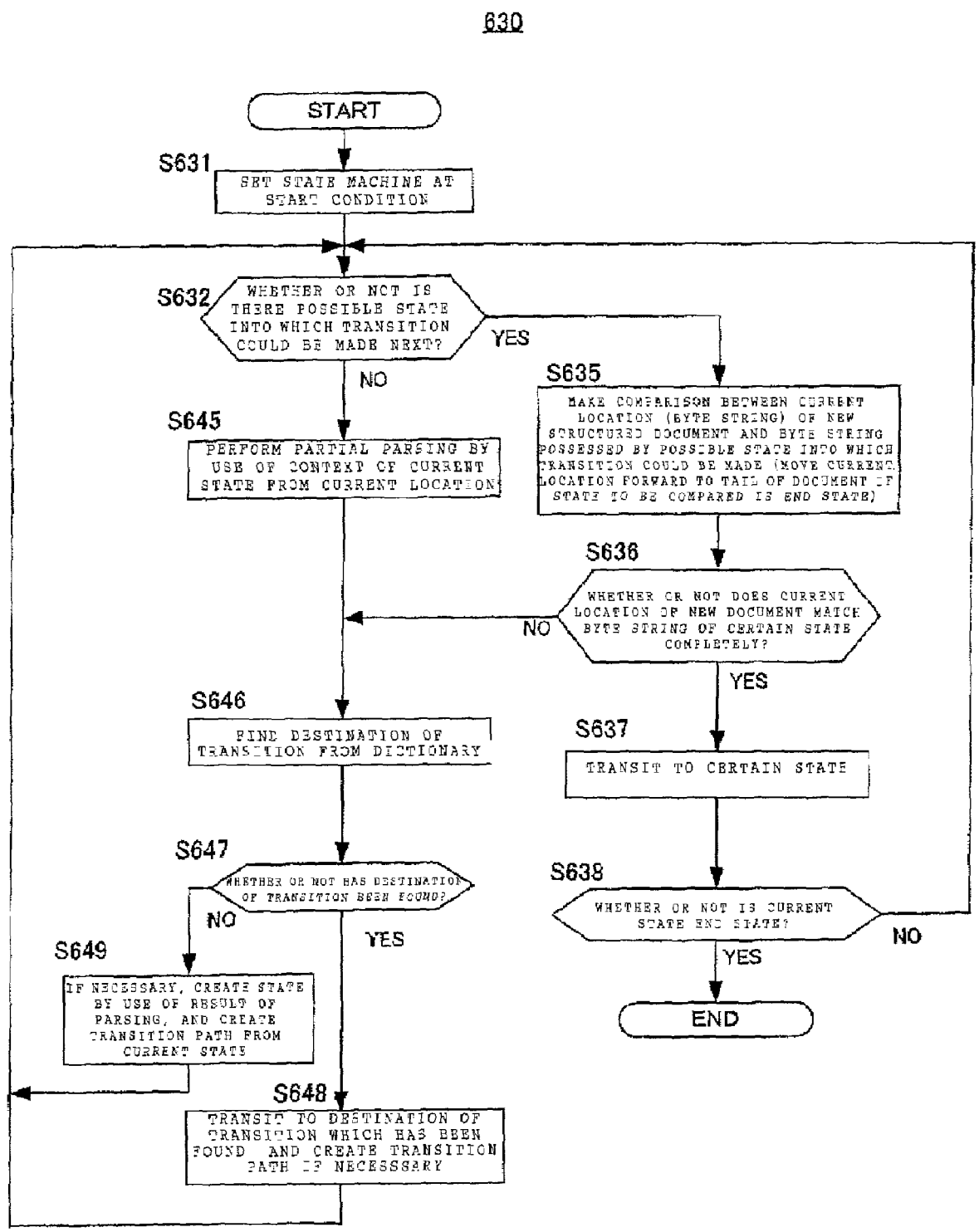
FIG. 29 is a flowchart of a method of controlling the state machine.

FIG. 29 is a flowchart of a method 630 of controlling the state machine. First of all, the state machine is set at a start state (in step S631). In step S632, it is determined whether or not there is a state (hereinafter referred to as "Cs") into which the transition can be sequentially made in the state machine. If a result of the determination in step S632 is YES, the process proceeds to step S635. If the result of the determination in step S632 is NO, the process proceeds to step S645. In step S635, a comparison is made between a byte string Bo constituting the state Cn in the state machine and a byte string Bn in a new structured document corresponding to the byte string Bo, the byte string Bn beginning with a byte as the current location in the new structured document, for each byte unit. Specifically, a comparison between each sequential byte as the current location in the byte string Bn and each corresponding sequential byte in the byte string Bo is made from one byte to another starting from the heads respectively of the byte strings Bn and Bo. In step S636, it is determined whether or not the byte strings Bo and Bn match each other completely. If a result of the determination is YES, the process proceeds to step S637. In the result of the determination is NO, the process proceeds to step S646. In step S637, a state in the state machine is caused to transit to Cn. In other words, the current state in the state machine is set to be Cn. In step S638, it is determined whether or not the current state in the state machine is an end state. If a result of the determination is YES, the control method 630 is terminated. If the result of the determination is NO, the process returns to step S632.

In step S645, parsing is performed on the byte string Bn which begins with a byte as the current location in the new structured document, and which is concerned with a node where the current location of the new structured document exists (the parsing of a byte string concerning a single node is termed as "partial parsing" depending on necessity). In the partial parsing, a context concerning the current location of a new structured document is used (an example of a context: a context is constituted of a currently effective entity declaration, namespace declaration, and element hierarchy). In step S646, on the basis of the partial parsing to be performed in step S645, it is checked whether or not a node into which the state, is to be transited as a node whose context and description match the result of the partial parsing exists in the state transition diagram of the state machine, while using a dictionary. In step s647, it is determined whether or not the node into which a state is to be transited has been found by the check in step S646. If a result of the check is YES, the process proceeds to step S648. If the result of the check is NO, the process proceeds to step S649. In step S648, the current node in the state machine is replaced with the node into which the state is to be transited. In addition, if necessary, a transition path through which to get to the node into which the state is to be transited is created in the state transition diagram (for example, a path drawn from the state 608 to the state 603 in FIG. 30). After step S648, the process returns to step S632. In step S649, a node is added onto the state transition diagram on the basis of a result of the partial parsing (for example, the state 608 in FIG. 30). In addition, a transition path to the added node from a node from which the state transition to the added node has been originated is created (for example, a path drawn from the state 601 to the state 608 in FIG. 30). After step S649, the process returns to step S645.

As an example of this, let's think about a case where a state machine which has been equipped with a state transition diagram of FIG. 28 is applied to the following new XML document c22. FIGS. 30 and 31 respectively show how a state transition diagram is updated in conjunction with an operation by the state machine.

--- c22:<p:e xmlns:p="urn:example"><y/><x a="ccc" p:b="ddd"/></p:e>

---

First of all, a state transition is designed to be able to be made only in a case where the document matches a byte string in the possession of a state into which the transition can be sequentially made from a location where a parsing is currently being performed. A state 601 following an initial state (designated by a double circle at the top in FIG. 30) has a byte string of "<p:e xmlns:p="urn:example">. For this reason, only in a case where the document matches the same byte string when viewed from the head of the document, the state transition can be made. On the other hand, the byte string in the XML document c22 also matches the aforementioned byte string. For this reason, the location in which the XML document c22 is being parsed is moved to a below-mentioned location designated by ∇, and the state machine causes the state to be transited to the state 601.

<p:e    xmlns:p="urn:example">∇<y/><x    a="ccc" p:b="ddd"/> </p:e>

Since the ensuing state has a byte string of "text," a comparison is made between "t" and "<." However, they do not match each other. For this reason, a state can not be transited. In a case where a state transition can not be made, a partial parsing is performed on a context which the current state has (the context is constituted of a currently effective entity declaration, namespace declaration, and element hierarchy) (In each of the states, an event and a context corresponding to the state are held). As a result of the parsing, the below-mentioned event is obtained.

[EmptyElementTag: name="y" uri=" " {Attribute:}]

Sequentially, it is checked whether or not there is a state which can be recombined with the event. The context of the current state and the context of the state which can be recombined with the event have to match each other. That is because, if this condition is violated, it can not be guaranteed that the entire XML document is well-formed, on the basis of a transition history of the state machine. In such a case, consequently, a well-formed check has to be performed on the transition history each time the current state is recombined with an event. To do this, a dictionary utilizing hashing is used. Suppose that an adequate hash function has been defined with regard to an event and a context, and that a hash value has been calculated. Then, suppose that, as a dictionary for the state machine, a correspondence as expressed by "(context×event)→state" has been prepared. Now, search for a corresponding state by using this dictionary by using "<y/>" as the event, and by using "under an element "e", as a namespace, "urn:example" is defined for a prefix "p", and an entity declaration is empty" as a context. It is natural that partial parsing be continued while no recombination can be made, since there is no state which has the "<y/>" as the event. In this occasion, in a case where parsing is intended to be performed while updating the state machine (it goes without saying that, in this occasion, it can be chosen not to update the state machine for the purpose of increasing a speed at which the parsing is performed), the state machine is updated as shown in FIG. 30.

Then, the partial parsing continues being performed. Subsequently, an event as described below is obtained.

---

[EmptyElementTag: name="x" uri=""
 {Attribute: (name="a", uri="", value="ccc")
  (name="b", uri="urn:example", value="ddd")]

---

A corresponding state is found from the dictionary in the same manner as previously the state was tried to be found. This time, the corresponding state can be found, and accordingly the ensuing state comes to be a state 603 as shown in FIG. 30.

If the state machine is intended to be updated, a transition path from the state 608, as the state from which the transition is originated, to the state 603, as the state into which the transition goes forward, is newly created as shown in FIG. 32. Incidentally, in a case where a plurality of states with which the recombination could be made are found, one state may be selected out of the plurality of states arbitrarily. However, if a recombination were to be made with a state which is the nearest to a state at which the actual state transition has been branched off from the due course of the state transition, it would be effective. For this reason, the most nearest location may be selected out of the plurality of states with which the recombination could be made, through calculating the distance from the current location to each of the plurality of states.

As results of this search, it is found that the state Cn into which the state could be transited is the "</p:e>." Accordingly, it is checked whether or not a node concerning the current location in the new XML document and a byte string in the possession of this state Cn match each other. Since the new XML document c22 also matches the byte string in the possession of this state Cn, the state transition is made. Finally, the state transition gets to the end state (designated by a double circle at the bottom in FIG. 31). At this point, the new XML document c22 has no more part to be parsed. Accordingly, the parsing is terminated. It can be learned from the transition history how the new XML document corresponds to the already-parsed document as the source XML document c21. Parts in the new XML document corresponding to states other than states which have been newly created are what correspond to the parts of the already-parsed document. Parts in the new XML document which have been newly created and parts in the new XML document which do not have corresponding states in the already-parsed document are information concerning the respective differences.

Descriptions will be provided for a method of adding no useless items to the dictionary corresponding to the state machine.

According to the present invention, when the state machine is updated, an item corresponding to the new state is added to the dictionary. However, an event which has no significant characteristic, an event which has no influence on the structure of a document in spite of its frequent occurrence, and an event which occurs in various contexts may not be newly registered into the dictionary. This enables operations for the respective useless recombinations to be inhibited, and also this can inhibit useless states into which the state could be transited being increased in number. Accordingly, deterioration in the efficiency can be inhibited.

When the state machine is updated, an item corresponding to the new state is added to the dictionary. This enables a state with which a recombination can be made to be found at a higher speed. However, this scheme uses a characteristic that, if the source XML document and the new XML document share the same event, it is highly likely that the document structures following the event respectively in the new XML document and the source XML document are approximate to each other. For this reason, if, for example, a text event representing a line feed only and the like are registered into this dictionary, this leads to operations of useless recombinations, or to an increase in the number of states into which the state could be transited, thus deteriorating the efficiency. To avoid this, an event which has no significant characteristic, and an event which has no influence on the structure of a document in spite of its frequent occurrence may not be registered into the dictionary. Otherwise, they may be deleted from the dictionary. Specifically, a scheme which does not register events as described below into the dictionary, or a scheme which deletes the events from the dictionary, can be conceived.

(a) Short Text events (for example, events constituted of less than 4 characters)

(b) Events which have already occurred in a state of multiple overlaps in the state machine.

(c) PI events and Comment events, both of which are poor in regularity.

Descriptions will be provided for a scheme for searching, at a higher speed, for a possible state into which the current state could be transited, at a point where the state transition could be branched.

In the present invention, with regard to the possible branching of the state transition in the state machine, a binary search could be performed, if byte strings of the respective possible states into which the current state could be transited would be sorted in advance, and concurrently if a byte string of a document on which a parsing is intended to be performed would be used. Accordingly, in a case where there are many possible states into which the current state could be transited, a transition could be made efficiently for logarithmic time.

Figure 31:
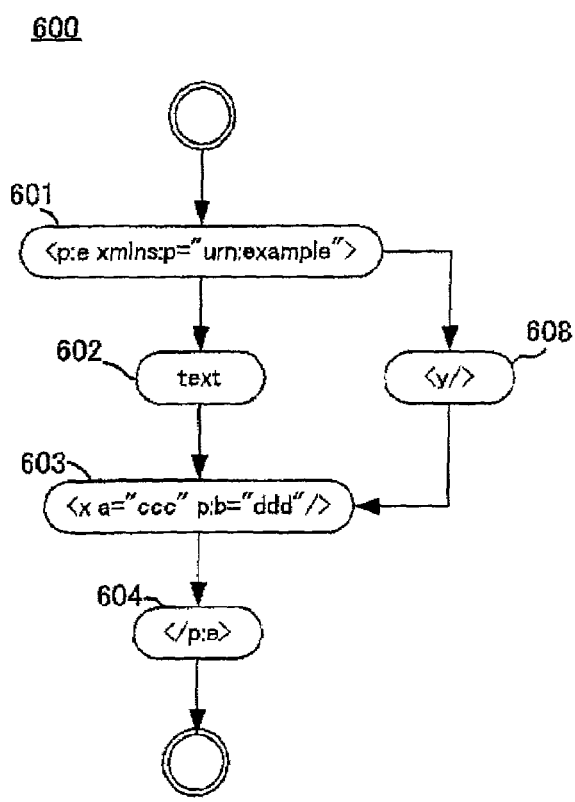
FIG. 31 is a diagram showing how the state transition diagram is updated in conjunction with an operation of the state machine.

Suppose that the state machine which includes a state as shown in FIG. 31 has already been prepared. In addition, suppose that, by use of this state machine, a document c23 whose description is as follows will be parsed.

c23:<p:e xmlns:p="urn:example"><y/>xyz</p:e>

A transition into a first state can be made quickly by use of the method which has already been described. Accordingly, the state machine gets to the state 601. At this point, the possible states into which the current state is transited are the "text" and "<y/>." In a case where it is checked whether or not the two events match each other by a byte string unit, if the number of possible states into which a current state would be transited is two, it would cause no trouble. If there are many possible states into which the current state would be transited, it takes time amounting to 0(N) to perform the check, so that the check becomes inefficient. In this case, byte strings of the respective possible states into which the current state would be transited are sorted in advance, and a binary search is performed by use of a byte string of a document which is going to be parsed. In other words, first of all, since the "<" is smaller than the "t" at a time the "<" comes, the binary search can narrow candidates down to the "<y/>" quickly.

Next, descriptions will be provided for a scheme of finding an already-parsed document which is the most approximate to the new document.

In Embodiment 2, a state which was created while a document was being parsed, and a transition which was made while the document was being parsed are recorded in the state machine. Thereby, an already-parsed document which is the most approximate to the new document is designed to be obtained. By comparing states through which the new document has transited and transitions which have been made with the states and the transitions which have been recorded, it is learned that a document, which has a record of the largest number of states and transitions corresponding to those of the new document, is an already-parsed document which is the most approximate to the new document.

Suppose, for example, that there are three XML documents A, B and C as shown below. FIG. 32 is a state transition diagram which has been generated by parsing these XML documents A, B and C.

Document A: <a>x<b>y</b></a>
Document B: <a>x<c>z</c></a>
Document C: <d>z</d>

Subsequently, the following document D is newly parsed.

Document D: <a><b>y</b><c>x</c></a>

Figure 33:
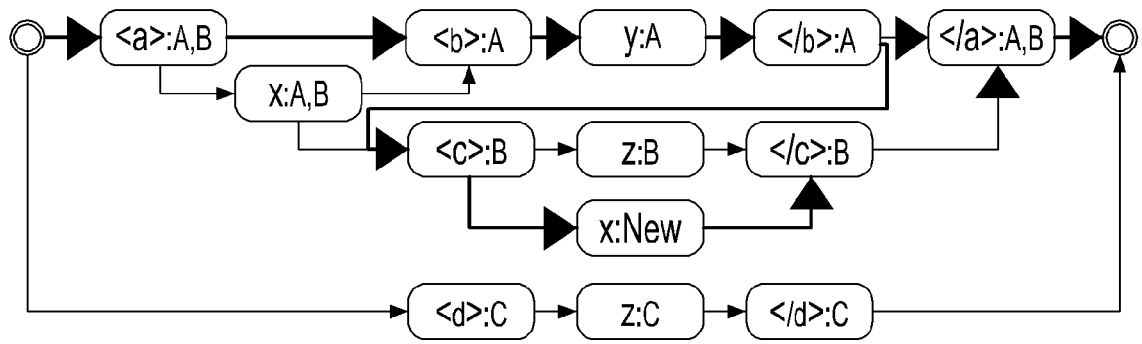
FIG. 33 is a diagram showing a state transition of the XML document D by use of a scheme for adding a state onto the state transition diagram, and for recombining the state to the state transition diagram.

FIG. 33 is a diagram showing a state transition in the XML document D by use of the previously-described scheme (an addition of a state onto a state transition diagram, and recombination). In FIG. 33, bold lines indicate a transition history of results of performing parsing. In FIG. 33, there are five states corresponding to Document A, four states corresponding to Document B, and no state corresponding to Document C. Accordingly, it is concluded that a document which is the most approximate to Document D is Document A.

Example of Use of Embodiment 2

Example 1

This system can extract a structure, which is approximate to the existing document, and the difference, at a high speed. For this reason, this system is suitable for a process of performing a difference operation. If the system is applied to the Web service to process the large number of approximate queries, the number of parts to be parsed can be minimized, thus increasing a speed at which the parsing is performed. In addition, even if the number of already-parsed documents to be stored into the cache is increased, it takes time amounting only to 0 (log N) to search possible states into a current state is transited. In a worst case, it takes no more than 0 (log N). Since the same state is not newly created actually, it is expected that the parsing is performed more efficiently.

In a case where this technique is applied as a difference parser, configurations as described below are to be adopted.
(a) A state machine is created in compliance with an XML document to be stored into the cache, and on the basis of the system which has been described by use of FIG. 33.
(b) With regard to an XML document to be newly parsed, a difference is extracted by using the method which has been described by use of FIG. 33, and only parts corresponding to the difference are partially parsed.
(c) All of the results of parsing are returned to a user of the parser on the basis of a transition diagram representing each of the states in the state machine.

It can not be said that, in general, this scheme is effective. Qualitatively, there is clear evidence showing that this scheme is extremely effective in a certain situation. Here, descriptions will be provided for such evidence with regard to the Web service.

When there are many variations in representation of a byte string in an XML document to be parsed, the case corresponding to the existing path in the automaton is small in number. Accordingly, the number of times when a new XML document and a source XML document match each other is small. In addition, the number of states in the automaton becomes explosively large. Accordingly, a large amount of storage area is consumed. It can be thought that a matter which may be brought about with regard to the Web service is variations in the representation of a byte string which may be caused between different schemes or between different serializer packages. That is because, in the Web service, data binding is usually performed on the basis of a scheme instructed with the WSDL, and accordingly an XML document is generated from parameters, on the XML document (an SOAP message) generating side.

However, in the practical Web service, this variation explosion does not bring about trouble. Usually, schemes to be treated by Web service middleware using this processing system are small in number. The reason for this is that services to be provided by a single Web service provider are fixed and small in number except for equivalents to a router. In addition, serializer packages are not small in number, but are not explosively large in number. That is because with regard to package systems to be used at a particular time, versions close to the most recent versions of some vendors are used concentratedly.

In practice, an object to be processed falls within the scope of several grammar classes (variations of the type 3 grammar). For this reason, there are a large number of XML documents (which are similar to one another in representation of their respective byte strings) in each of the classes. Since the processing of similar documents can be performed at a high speed by use of Embodiment 1 and the like, a process as a whole can be performed at a high speed.

Example of Use of Embodiment 2

Example 2

If, for example, a large number of XML documents are registered into a state machine of this form, the XML documents can be used to search for documents which are approximate. For this reason, the XML documents which have been registered into a state machine of this form can be used for the below-mentioned processes (a) and (b). This is a method effective, particularly, in having to process a large number of approximate documents whose respective schemas are fixed, and all of which fall within the scope of the type 3 grammar.
(a) When a document is edited, points where the document and approximate documents are different from each other are presented. Thereby, the approximate documents can be utilized as if they were templates. In addition, a history viewed from the existing document can be extracted, and can be presented.
(b) A document class is conjectured, and the document is subjected to an adequate process which is suitable for the document class. For example, aid can be provided such as the processing of a document with reference to a markup definition of reporting if the document is decided to be a document for the reporting.

Example of Use of Embodiment 2

Example 3

An actual document instance having high approximateness cannot be restored by use of the state machine using this scheme only. In order to restore the actual document instance with high approximateness, a document instance ID may be stored into a state, and accordingly the document instance may be designed to be fetched from the document instance ID by use of an adequate database, as described for the "scheme with which to find an already-parsed document which is the most approximate."

Otherwise, in some cases, if the state machine is equipped with such a database as it is, this may deteriorate the efficiency. In those cases, a method of creating a dictionary corresponding to a transition path in the state machine from the document instance ID may be adopted. Incidentally, a transition path can be defined with an array of references to the states. For this reason, the transition path may be at most n references per document. Accordingly, storage can be performed efficiently.

Advantage of Embodiment 2

Improvement of Efficiency in a Well-formed Check

With regard to the processing system according to the present invention, it is significant that the below-mentioned processes are performed simultaneously at a high speed.
(a) A process of identifying a document which is approximate to a new document.
(b) A process of extracting a difference between the new document and the approximate document.
(c) A process of performing a well-formed check.

If the well-formed check (c) is not performed simultaneously with the processes (a) and (b), the well-formed check needs to be performed independently. This independently performed process of the well-formed check is heavy.

With regard to an SOAP message (doGoogleSearch) having 974 bytes, for example, let's make a comparison between time needed for performing a well-formed check on the message simultaneously with the performing of the other two processes and time needed for independently performing the same well-formed check on the same message. The time needed for the independent performing of the well-formed check is 1.7 times longer than the time needed for performing a well-formed check on the message simultaneously with the performing of the other two processes. According to the present invention, a state transition is controlled in a way that the context of the new document and the context of the already-processed document match each other, thereby guaranteeing that the new document which has matched the already-processed document is always well-formed. For this reason, at a time it becomes known that the already-processed document and the new document match each other, the independent well-formed check need not be performed on the new document, thereby getting away with no cost.

Advantage of Embodiment 2

Significance for the Parsing of a Plurality of Documents

Figure 34:
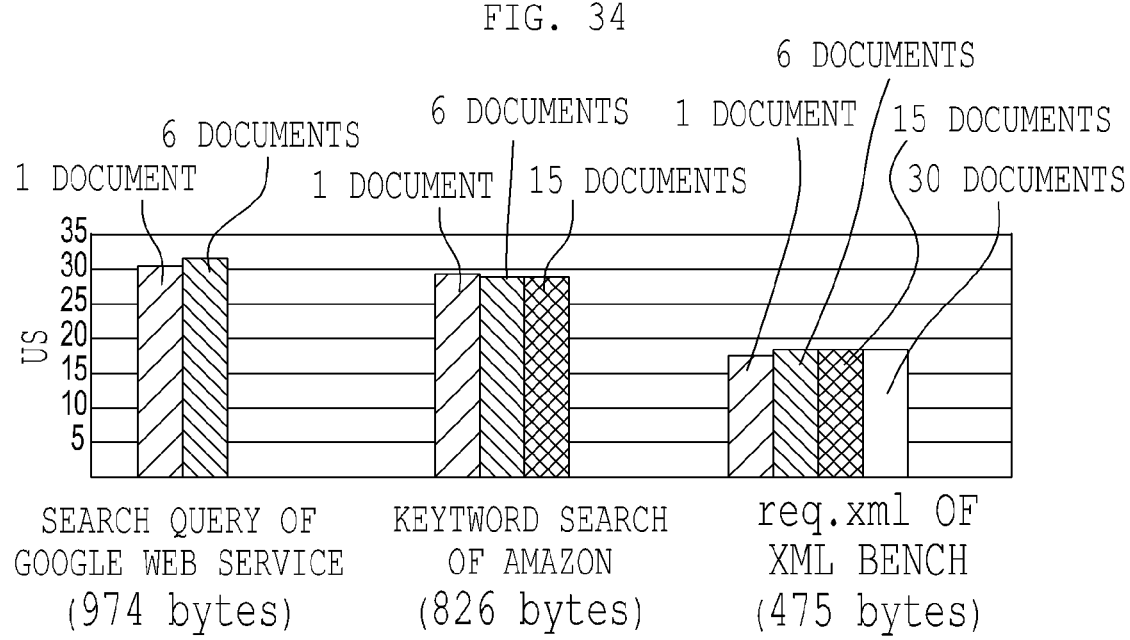
FIG. 34 shows a result of an experiment with the parsing of a difference by actually applying Embodiment 2 to queries of the Web service.

FIG. 34 shows a result of an experiment with the parsing of a difference by actually applying Embodiment 2 to queries of the Web service. It is learned that, although the number of documents which have been stored into the cache is increased, there is no significant change in time needed for performing the process. In FIG. 34, a "us" as a unit in the ordinate means a micro second. With regard to the conventional technique with which the new document is compared with the already-processed documents one-by-one, if the already-processed documents increase in number, time needed for the process increases linearly. By contrast, if the state machine according to Embodiment 2 is applied, time needed for the process virtually does not increase although the number of the already-processed documents increases.

Figure 35:
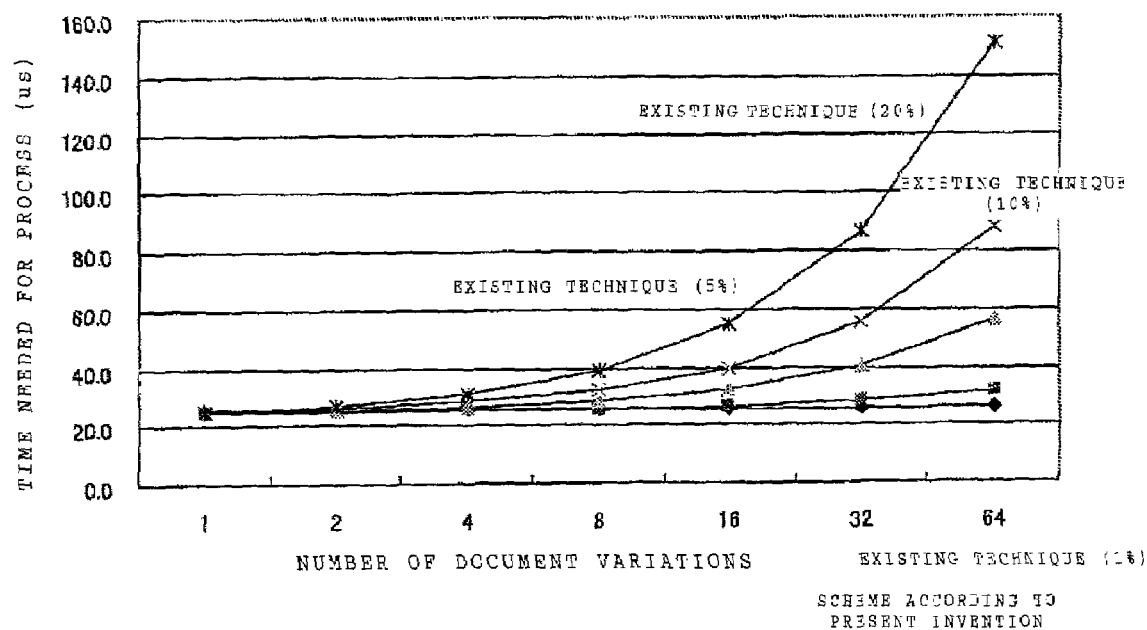
FIG. 35 shows how a speed at which the process is performed by a parser to which the existing technique has been applied decreases, in comparison with a speed at which the process is performed by a parser to which the state machine according to Embodiment 2 has been applied.

FIG. 35 shows how a speed at which the process is performed by a parser to which the existing conventional technique has been applied decreases in a case where kinds (differences between services and differences between packaging systems) of documents to be processed (which are not approximate to one another) increase in number, in comparison with a speed at which the process is performed by a parser to which the state machine according to Embodiment 2 has been applied. With regard to the existing technique, theoretical values are shown. In a case where the kinds of documents are extremely different from each other in their respective byte strings, it can be early detected that the two documents are not approximate to each other through comparison between the two documents. With regard to the existing techniques, the graph shows four different processing speeds (1%, 5%, 10% and 20%) depending on how many percents of the entire matching the respective average costs take up.

Advantage of Embodiment 2

Storage Area

Figure 36:
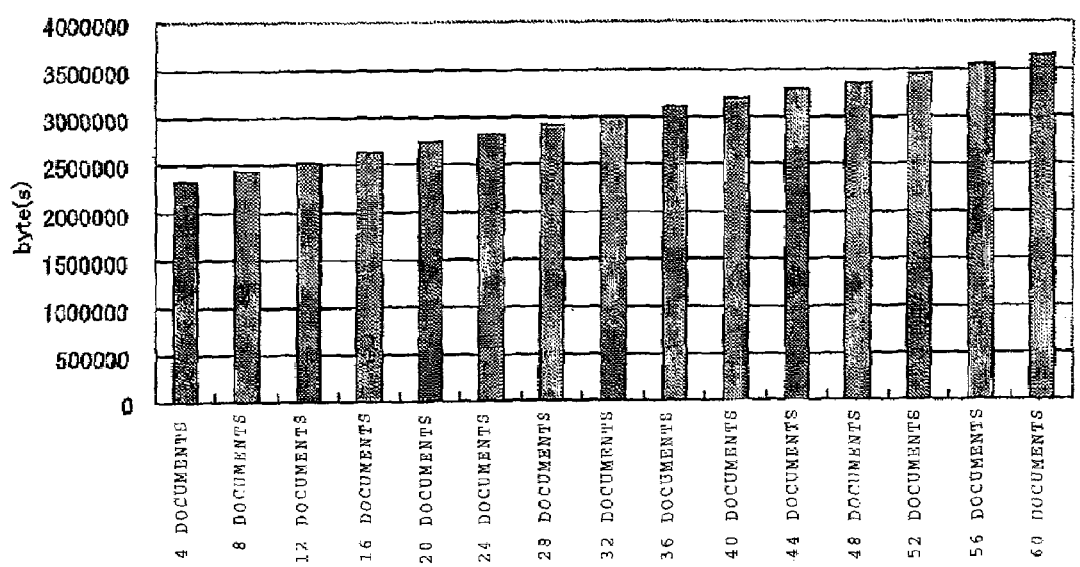
FIG. 36 shows amounts of memory which was used when 60 kinds of XML documents were stored.

Four kinds of SOAP processing systems to generate messages were set to each of 15 request messages of Amazon Web service, and 60 (=15×4) kinds of XML documents were generated. FIG. 36 shows amounts of memory which was used when these 60 kinds of XML documents were stored.

In Embodiment 2 using the state machine, as the number of stored documents increases, an amount of storage area needed increases. However, an increased amount of the storage area is almost in proportion to the increased number of the documents, and the storage amount does not increase explosively. If the maximum number of documents to be stored would be set with the memory amount of a system taken into consideration, the performance could be prevented from deteriorating due to a shortcoming of the memory amount. In addition, if a limit would be imposed on the memory amount, the memory amount could be inhibited from increasing by leaving only transitions which are used most frequently, and by deleting states to which references have not been made.

Advantage of Embodiment 2

Time Needed for Processing Documents Which have not been Stored

Figure 37:
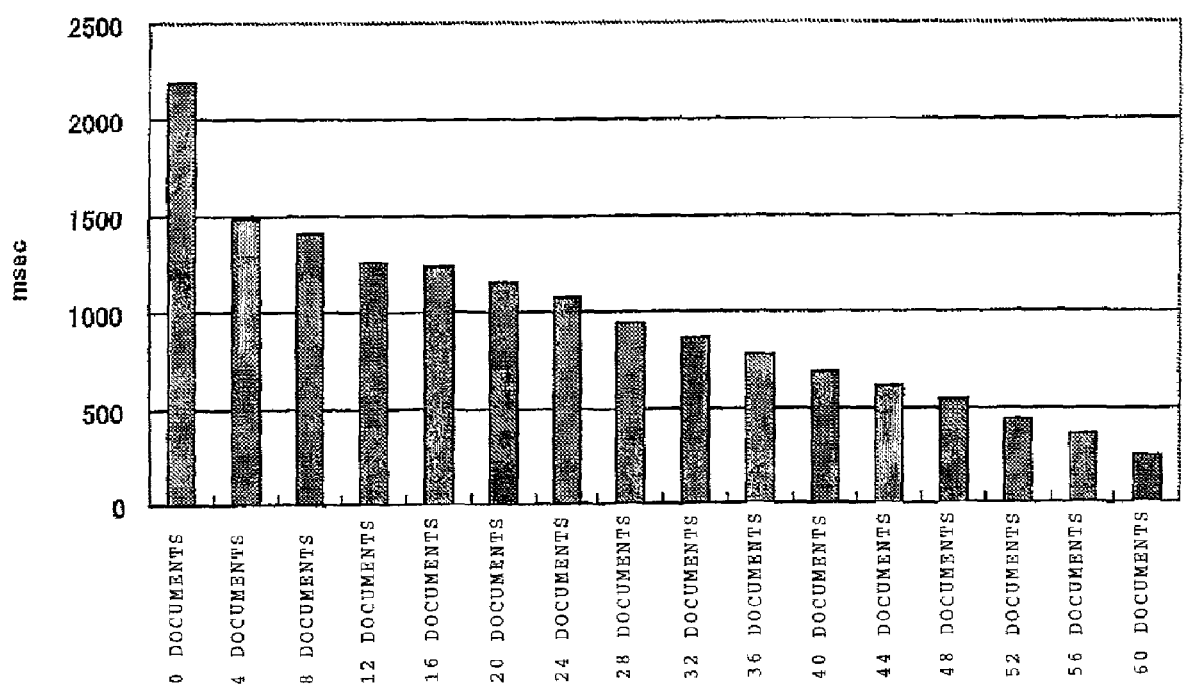
FIG. 37 is a graph showing a result of measuring time needed for processing the 60 documents by changing the number of the documents which have been stored in advance from 0 to 60.

FIG. 37 is a graph showing a result of measuring time needed for processing the aforementioned 60 documents by changing the number of documents which had been stored in advance from 0 to 60. All of the 60 documents were used for the measurement. In all, 10,000 documents were processed. The state machine was not updated during the measurement. Instead, the state machine which had been generated in advance was always used. Incidentally, although not shown in the graph, it was learned that time needed for the parsing was approximately 1,300 ms in a case where a difference parser was not used, and it was also learned that the difference parser was able to perform the process at a higher speed in a case where 12 documents or more, or approximately one fifth of all the approximate documents or more, were stored. A value representing the processing speed was bad in a case where there was 0 document, or in a case where no document was stored. The reason for this is that the partial parser was not fully packaged, and that, accordingly, unnecessary processing was performed. However, as learned from the graph, even though there were a few parts which were able to be reused, the difference parser brought about the effect. In addition, in the actual use environment, it is expected that the ratio of approximateness among documents becomes relatively higher since the state machine is dynamically updated for documents with higher degrees of approximateness.

EMBODIMENT 3

Figure 38:
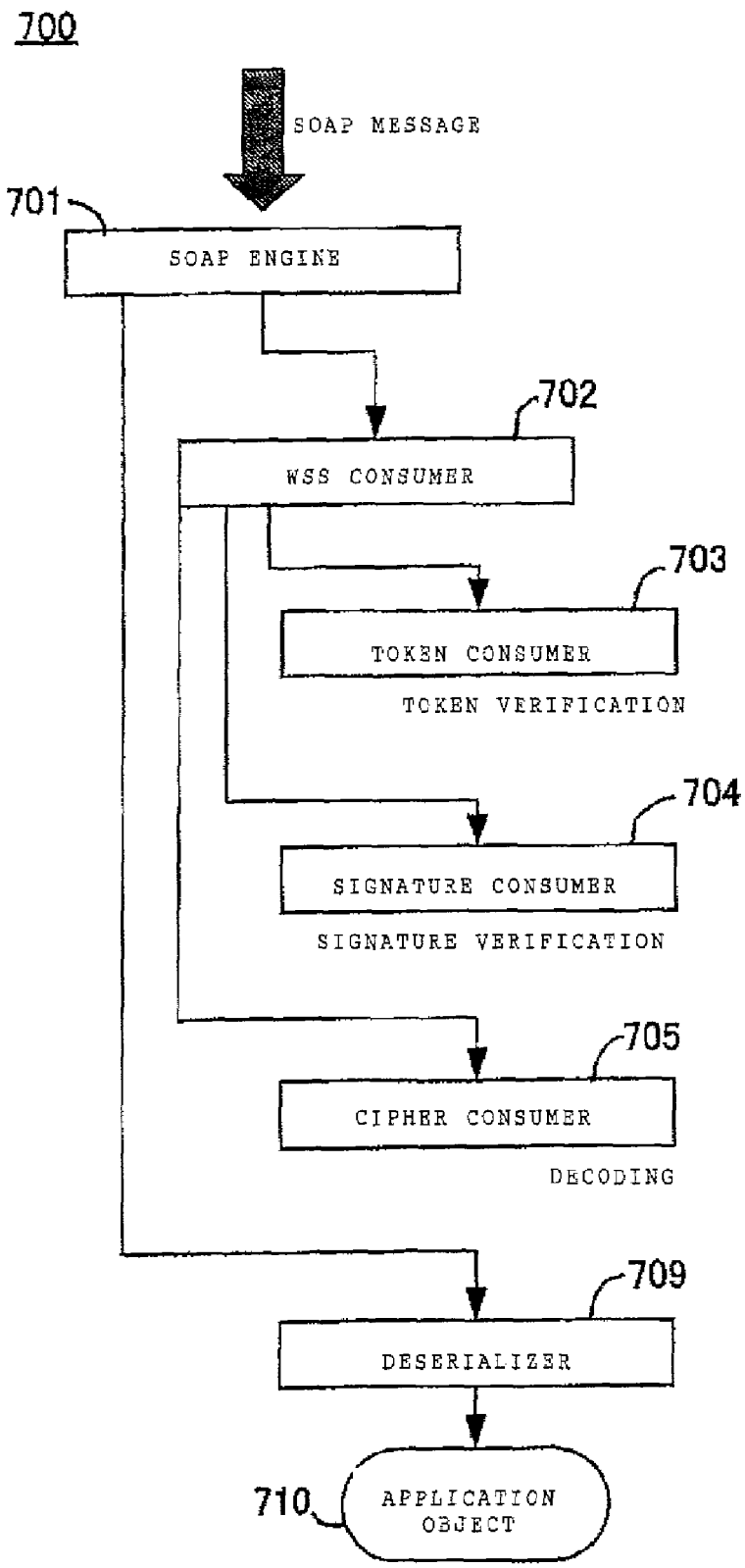
FIG. 38 is a block diagram of an SOAP message processing device.

FIG. 38 is a block diagram of an SOAP message processing device 700. When an SOAP engine 701 receives an SOAP message, the SOAP engine 701 calls a WSS consumer (Web Services Security consumer) 702, and a process of the security is performed therein. Subsequently, in order to process application data in the message, the SOAP engine 701 calls deserializer 709, and thereafter calls application object 710. Embodiment 3 is intended to cause the process to be performed in the WSS consumer 702 efficiently. Descriptions will be provided below for the configuration of the WSS consumer 702.

As shown in FIG. 38, the WSS consumer 702 performs the process while calling a token consumer 703, a signature consumer 704 and a cipher consumer 705 depending on contents of the incoming message. For example, in a case where the message includes only a security token and a signature, the cipher consumer 705 is not called.

Figure 39:
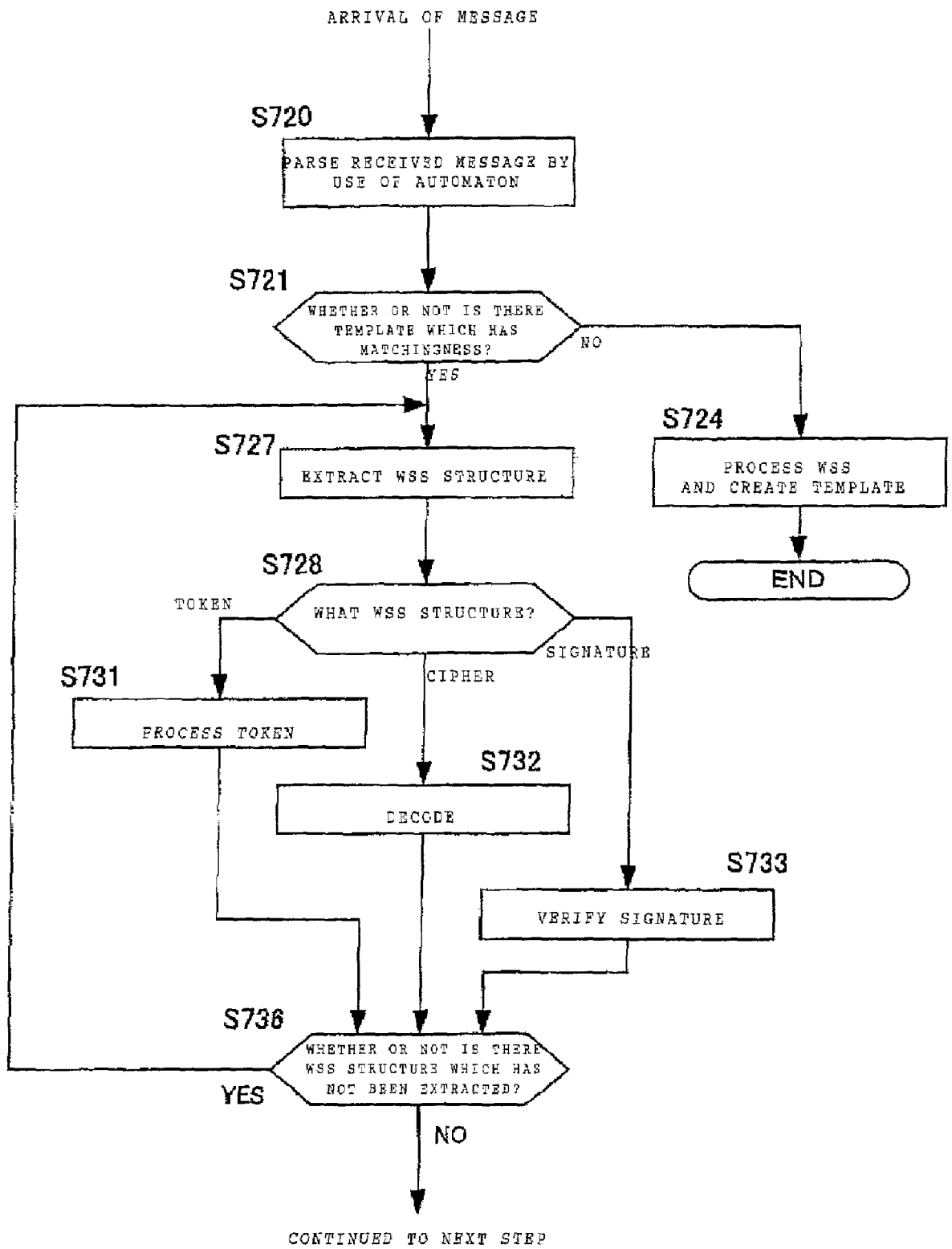
FIG. 39 is a flowchart of parts to be processed by a WSS consumer.

FIG. 39 is a flowchart of parts to be processed by the WSS consumer 702. In Embodiment 3, as described later, templates are extracted from messages which have been once processed, and the templates are reused. The templates thus extracted are put together into a state machine (automaton) in the convenience viewpoint. Thereby, a template which matches an incoming message can be selected effectively. If there is no template which matches the incoming message, the process is performed by use of a normal procedure. In this occasion, a template is extracted, and is added to the state machine. In a case where there is a template which matches the incoming message, the WSS consumer 702 calls the token process, the signature process and the cipher process, depending on the constituent elements such as the token, the signature and the cipher. Accordingly, the WSS consumer 702 performs the processes effectively while using templates.

FIG. 40 is a diagram schematically showing a template. FIG. 40 illustrates a template which has been extracted from a message which includes a signature using X.509 certificate as a security token. An attribute and a text node in an incoming message are grasped as changeable parts (variables), thus generating a template. However, a namespace declaration and a Transform algorithm are treated as fixed values instead of as variables.

In a case where there are a plurality of templates as shown in FIG. 40, if a matching check between an incoming message and each of the templates is performed from one template to another, such a matching check is ineffective. With this taken into consideration, in Embodiment 3, these templates are put together into a state machine as shown in FIG. 41. In this example, two templates whose respective namespace prefixes are different from each other are put together in the state machine (the difference is between "wsse" and "sec").

In Embodiment 3, nodes of the state machine are of the following four kinds.

(a) A start tag node: A start tag node corresponds to a start tag. The start tag node includes a namespace declaration, an attribute and the like. The start tag node is expressed by a normal variable of the attribute. Depending on a matching check between an incoming message and a template, a value is substituted for the start tag node.

(b) An end tag node: An end tag node corresponds to an end tag. Since, unlike the start tag, the end tag node does not have an attribute, no variable is defined for the end tag node.

(c) An empty tag node: An empty tag node corresponds to an empty tag. In common with the start tag node, the empty tag node includes variables concerning an attribute and the like.

(d) A context node: A context node corresponds to a text node. A matching check between an incoming message and a template is performed, thereby extracting the text. In a case where it is found in the course of the matching check that an XML partial tree corresponds to this part, the state machine is updated.

Figure 42:
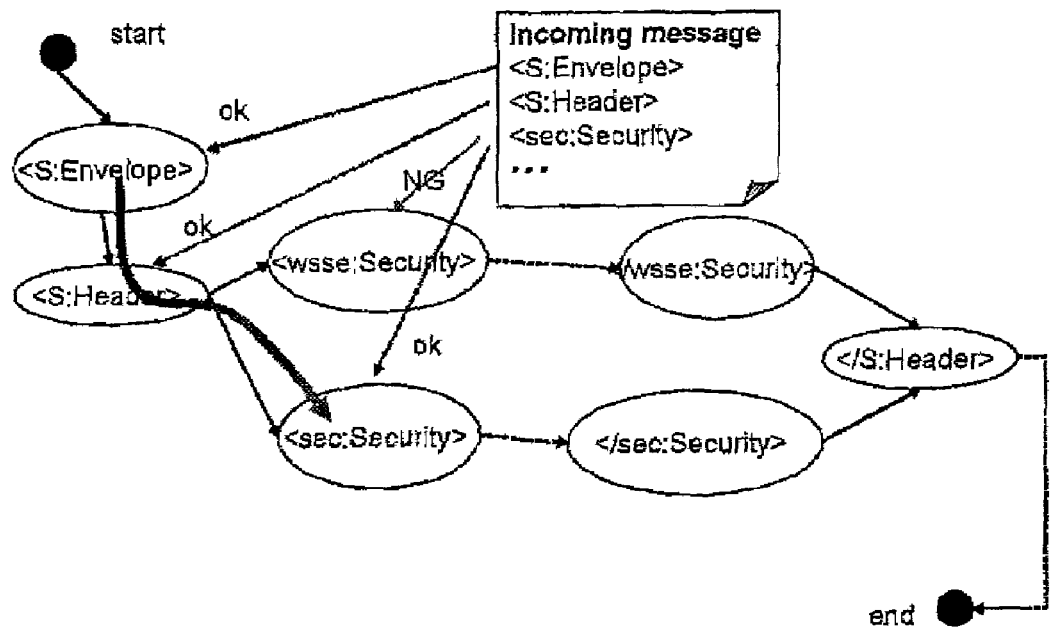
FIG. 42 is a diagram describing a method of processing an incoming message by use of the state machine.

FIG. 42 is a diagram describing a method of processing an incoming message by use of the state machine. FIG. 42 illustrates how states are traced by performing a matching check between each of the state and each of incoming messages from one incoming message to another in order of their incomings from the front. While the matching check is being performed, values are substituted for the respective variables which have been defined respectively by use of the start tag node and the text node. FIGS. 43 and 44 are diagrams respectively illustrating how an attribute value and a text are extracted from the respective incoming messages.

In a case where an incoming message is successfully matched with the state machine, the result of the matching is expressed as a state node array. Such a node array is termed as a template instance, and expresses a value which has been substituted for the variable in addition to the node array. FIG. 45 shows an example of a template instance.

Figure 46:
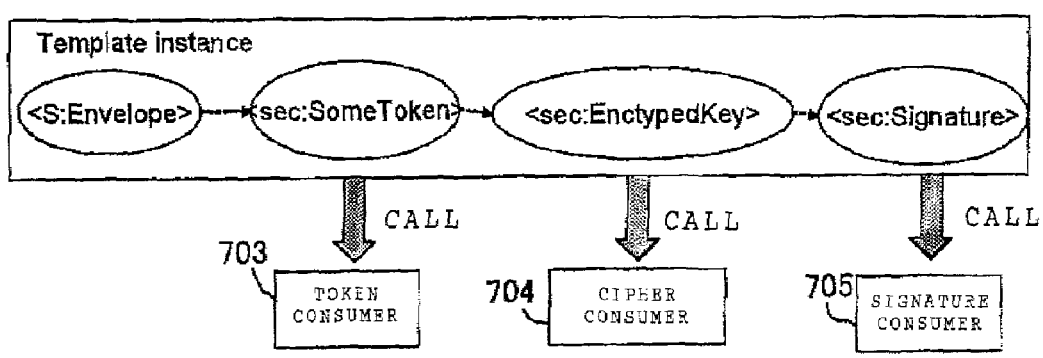
FIG. 46 is a diagram illustrating how a template instance is processed.

FIG. 46 is a diagram illustrating how a template instance is processed. As shown in FIGS. 38 and 39, the WSS consumer 702 is designed to call modules respectively for processing a token, a cipher and a signature depending on necessity in response to contents of an incoming message. As shown in FIG. 46, what is to be called is determined on the basis of a template instance. FIG. 46 illustrates a situation in which corresponding modules are called simply in the order of occurrence.

In FIG. 46, process modules are called in response to constituent elements of a security. A signature verification and a decoding module can not be sufficiently dealt with by use of merely the method which has been described. The signature verification requires a process of canonicalizing an object to be signed. Let's think, for example, about a message as follows. Incidentally, reference numerals 850 to 855 at the left ends are line numbers assigned for the convenience purpose of providing descriptions.

```
850:<S:Envelope xmlns:S="http://www.w3.org/2001/12/soap-envelope"
xmlns:wsu="http://schemas.xmlsoap.org/ws/2002/07/utility
"....>
851:    <S:Header>.... </S:Header>
852:    <S:Body wsu:Id="myBody">
853:        <tru:StockSybol xmlns:tru="http://www.fabrikam1
23.com/payload">QQQ</tru:StockSymbol>
854:    </S:Body>
855:</S:Envelope>
```

If the body element is an object to be singed, this part needs to be canonicalized, and processes such as addition of a namespace declaration and rearrangement of attributes are required to be performed. As a result, the aforementioned message is turned into the following.

```
860:<S:Envelope xmlns:S="http://www.w3.org/2001/12/soap-envelope
" xmlns:wsu="http://schemas.xmlsoap.org/ws/2002/07/utility
"....>
861:    <S:Header>.... </S:Header>
862:    <S:Body xmlns:S="http://www.w3.org/2001/12/soap-
envelope"
863:            xmlns:wsu="http://schemas.xmlsoap.org/
ws/2002/07/utility"
864:            wsu:Id="myBody">
865:        <tru:StockSybol xmlns:tru="http://www.fabrikam1
23.com/payload">QQQ</tru:StockSymbol>
```

```
866:    </SBody>
867:</S:Envelope>
```

Figure 47:
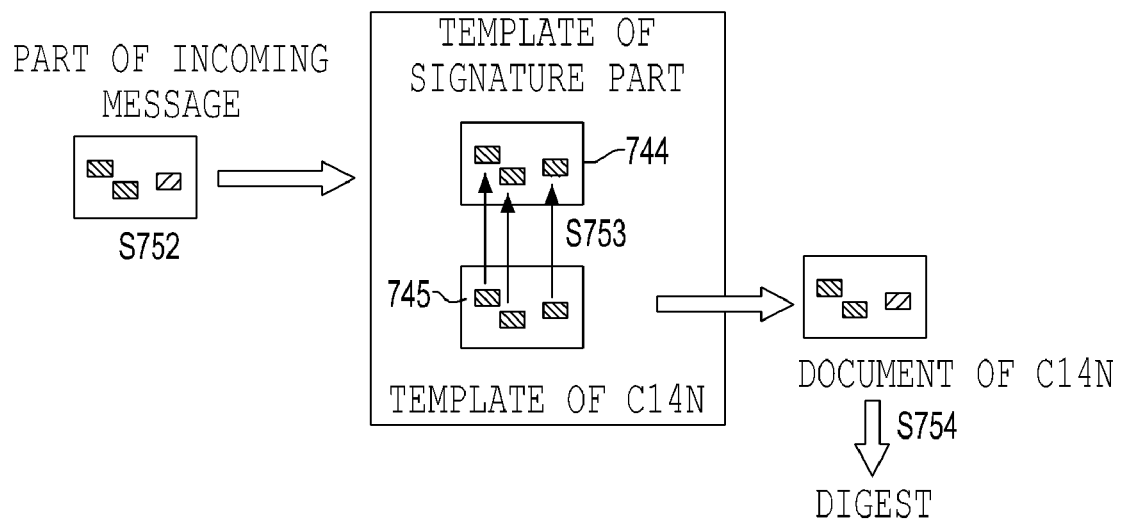
FIG. 47 is a diagram illustrating how a digest value is calculated by use of a canonicalized template.

It should be noted that the pre-converted description in Line 825 is turned into the post-converted descriptions in Lines 862 to 864, and that a definition of a namespace is added to Lines 862 and 863. Such a process cannot be sufficiently performed by use of merely the state machine as shown in FIG. 41, and it becomes necessary to parse the object to be singed. With this taken into consideration, in Embodiment 3, an object to be signed is dealt with by preparing a template 745 which has been canonicalized, as shown in FIG. 47. In this case, for the object to be signed, a template 744 which has been extracted from the original message is prepared, and additionally the template 745 which has been created by canonicalizing the template 744 is prepared (in step S751). When a message is received, a matching check between the message and a source template is performed, and thereby a part expressed by a variable is extracted (in step S752). Subsequently, the part expressed by a variable which has been extracted is embedded into the canonicalized template 745 (in step S753). Finally, a digest value is calculated (in step S754). Through the aforementioned procedure, the digest value necessary for a signature verification could be calculated without performing the parsing of an XML document at all.

Figure 48:
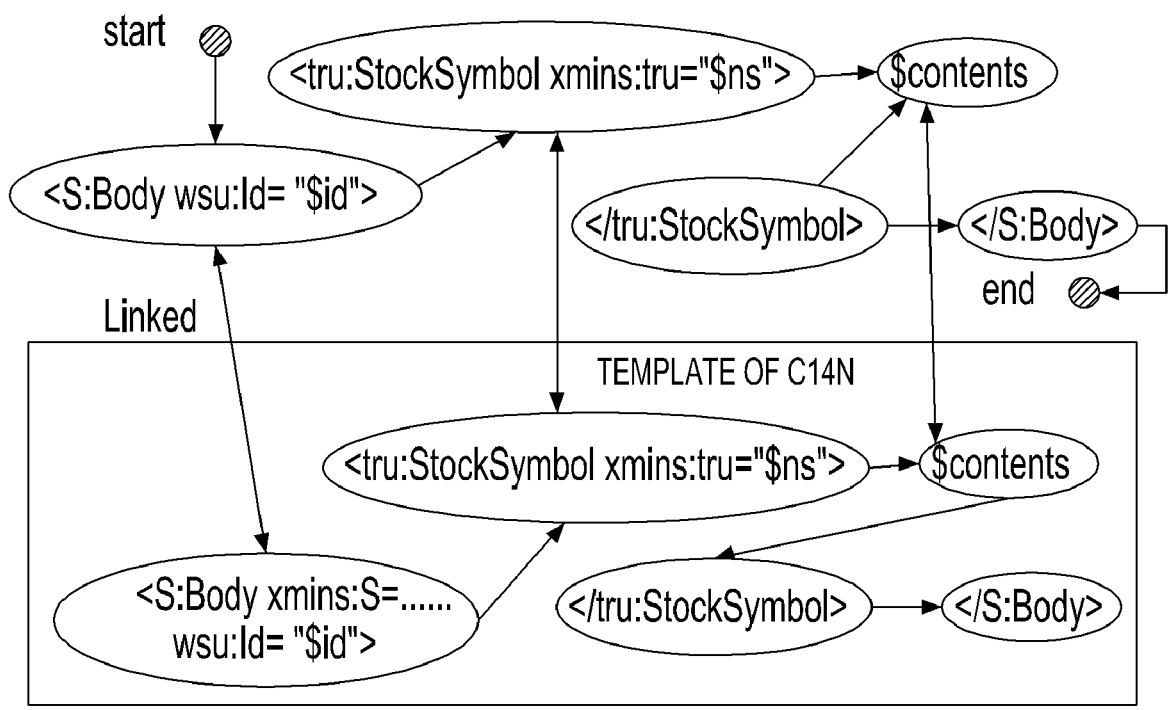
FIG. 48 is a diagram illustrating how the canonicalized template and the state machine are associated with each other.

FIG. 48 is a diagram illustrating how a canonicalized template and a state machine are associated with each other. At a part (<S:Body wsu:Id="$id") with which an object to be signed starts, the canonicalized template (a C14N template) is linked with a corresponding node in the state machine. In each of the states (nodes), a corresponding relationship of each of the respective variables is designed to be expressed.

With regard to the decoding, it is preferable that an XML parsing be avoided. Regarding the encryption of an XML document, a decoded document is in the form of a UTF-8 byte string. For this reason, the XML parsing needs to be performed newly. According to Embodiment 3, in order to avoid such a parsing, a template concerning a part which has been decoded is also prepared, and accordingly a normal XML parsing is avoided by performing a matching check on the respective byte strings. FIG. 49 is a diagram illustrating how a template is used while a decoding process is being performed. A template for encryption data is prepared corresponding to a byte string which corresponds to an encrypted data. Accordingly, a check on matching between a part which has been decoded with regard to an incoming message and this template is performed.

An XML parsing is a heavy-loaded process. In addition to this XML parsing, the WS-security requires a canonicalizing process, and an XML parsing to be performed after a decoding. According to the present invention, these XML parsing processes can be omitted. Accordingly, the present invention can contribute to improving the performance.

According to the present invention, it is possible to effectively detect approximateness to a source structured document by use of the state machine. The present invention would compare a source structured document and a new structured document by the unit of contents portion. If matchingness as a whole between the source structured document and the new structured document were recognized from a result of this comparison, a result of parsing units of contents portion corresponding to a source structured document on which parsing has already been performed would be used as a result of parsing each of the units of contents portion in the new structured document. Accordingly, the new structured document would not have to be parsed entirely, thus enabling the new structured document to be parsed at a higher speed.

The present invention would put information concerning state transitions of a plurality of source structured documents together into a single state transition diagram. Accordingly, a state machine would trace nodes on the state transition diagram on the basis of nodes in a new structured document, thereby locating an optimal source structured document which can be used for parsing of the new structured document. Consequently, it is made possible to reduce the amount of information concerning a state transition diagram to be stored, and to extract a desired source structured document out of a plurality of source structured document at a higher speed, for the number of the source structured documents.

Although the advantageous embodiments of the present invention have been described in detail, it should be understood that various changes, substitutions and alternations can be made therein without departing from spirit and scope of the inventions as defined by the appended claims. Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention. The invention also includes apparatus for implementing steps of method of this invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A structured-document processing device implemented on a computer, wherein the computer is configured as the structured-document processing device, comprising: storage means configured to store both (i) a source structured document which has been parsed and (ii) a result of parsing the source structured document;
    comparing means configured to compare contents of a new structured document and contents of the source structured document by use of their respective contents parts which have a predetermined corresponding relationship therebetween;
    distinguishing means configured to distinguish each of the contents parts of the new structured document between a first contents part and a second contents part, wherein the first contents part is a contents part of the new structured document for which the result of parsing the source structured document can be used and the second contents part is a contents part of the new structured document for which the result of parsing the source structured document cannot be used;
    parsing means configured to parse the second contents part of the new structured document and outputting a new parsed part as a result of the parsing; and
    posting means configured to post to an application program a part representing the result of parsing the source structured document corresponding to the first contents part as a result of parsing the first contents part of the new structured document, and for posting to the application program the new parsed part as a result of parsing the second contents part of the new structured document.

2. A structured-document processing device implemented on a computer, wherein the computer is configured as the structured-document processing device, comprising:
    storage means configured to store contents of both (i) a source structured document which has been parsed and (ii) a result of parsing structured partitions of the source structured document;
    matching check means configured to perform a matching check on whether or not source contents of the source structured document and contents of a new structured document match each other by comparing one of the structured partitions of the source structured document and a corresponding structured partition of the new structured document one by one in order starting from a head of both the source and new structured documents;
    classification means configured to classify each of the structured partitions of the new structured document into two categories, that is a first-class structured partition and a second-class structured partition, based on a result of performing the matching check concerning each of the structured partitions;
    parsing means configured to parse a structured partition which the classification means has classified as a second-class structured partition and generating a new parsed partition as a result of parsing the structured partition; and
    posting means configured to post to an application program (i) an event concerning each of the structured partitions in order from a structured partition in the head of the new structured document to a structured partition in a tail of the new structured document, (ii) an event concerning a source parsed partition of the source structured document corresponding to each of the structured partitions of the new structured document as a result of parsing the structured partition if the structured partition is a first-class structured partition, and (iii) an event concerning a new parsed partition concerning a structured partition as a result of parsing the structured partition if the structured partition is a second-class structured partition.

3. The structured document processing device according to claim 2, wherein:
    the parsing means includes a check made on the basis of whether or not a new structured document is a non well-formed structured document;
    the matching check means holds a matching check on a first structured partition following a second structured partition until a non well-formed check by the parsing means concerning the first structured partition is completed if a result of performing the matching check on the first structured partition of the new structured document is NO, and aborts a matching check on the new structured document if it is decided by the matching check that the new structured document is non well-formed; and
    the posting means posts to the application program a notice that the new structured document is a non well-formed structured document instead of posting an event if it is decided by the matching check that the new structured document is non well-formed.

4. The structured document processing device according to claim 2, further comprising:
    selecting means configured to select out of a plurality of source structured documents, as a most approximate structured document, a source structured document whose source contents are the most approximate to contents of the new structured document;
    wherein the storage means stores source content and source parsed partitions concerning a plurality of source structured documents which are different from one another; and
    wherein the matching check means turns a source structured document concerning the matching check into the most approximate structured document.

5. The structured document processing device according to claim 2, further comprising: detecting means configured to detect a server and an operation on the basis of a request from a client in a Web service; and
    selecting means configured to select a most approximate structured document on the basis of the server and operation detected.

6. The structured document processing device according to claim 4, further comprising:

deterring means configured to detect a URL to which a request for a Web Service is going to be sent, wherein the structured document is concerned with the request for the Web service; and selecting means configured to select a most approximate structured document based on the URL detected.

7. The structured document processing device according to claim 2, further comprising:

difference amount calculating means configured to increase a difference amount between a content of the new structured document and a content of the source structured document by one unit each time it is decided that a result of performing the matching check is No; and classification means configured to classify all of the structured partitions, ranging from (i) a structured partition on which the matching check has been performed for the last time to (ii) a structured partition in the tail of the new structured document, as second-class structured partitions after the difference amount exceeds a threshold value.

8. The structured document processing device according to claim 2, further comprising:

difference amount calculating means configured to increase a difference amount between a content of the new structured document and a content of the source structured document by one unit, each time it is decided that a result of performing the matching check is NO; and replacing means configured to replace a pre-replaced source structured document with a post- replaced source structured document and continuing the same process, which has been performed on the new structured document and the pre-replaced source structured document, on the new structured document and the post-replaced source structured document from its beginning after the difference exceeds a threshold.

9. The structured document processing device according to claim 2, further comprising:

selecting means configured to select out of a plurality of source structured documents, as a most approximate structured document, a source structured document whose source contents are most approximate to contents of the new structured document;

detecting means configured to detect a server and an operation on the basis of a request from a client in a Web service;

most approximate structured document selecting means for configured to select the most approximate structured document on the basis of the server and operation detected;

URL detecting means for configured to detect a URL to which a request is going to be sent, wherein the structured document is concerned with the request for a Web service; means for selecting the most approximate structured document on a basis of the URL detected;

difference amount calculating means for configured to increase a difference amount between a content of the new structured document and a content of the source structured document by one unit each time it is decided that a result of performing the matching check is No; and classification means configured to classify all of the structured partitions, ranging from (i) a structured partition on which the matching check has been performed for the last time to (ii) a structured partition in the tail of the new structured document, as second-class structured partitions after the difference amount exceeds a threshold value; and replacing means configured to replace a pre-placed source structured document with a post- replaced source structured document and continuing a same process, which has been performed on the new structured document and the pre-replaced source structured document, on the new structured document and the post-replaced source structured document from its beginning after the difference exceeds a threshold;

wherein the structured document is an XML document; wherein the structured partition is a partition which can be associated with a SAX event; wherein the parsing means includes a check which is made on the basis of whether or not a new structured document is a non well-formed structured document;

wherein the matching check means holds a matching check on a first structured partition following a second structured partition until a non well-formed check by the parsing means concerning the first structured partition is completed if a result of performing the matching check on the first structured partition of the new structured document is NO, and aborts a matching check on the new structured document if it is decided by the matching check that the new structured document is non well-formed;

wherein the matching check means turns the source structured document concerning the matching check into the most approximate structured document;

wherein the posting means posts to the application program a notice that the new structured document is a non well-formed structured document instead of posting an event if it is decided by the matching check that the new structured document is non well-formed; and wherein the storage means stores source content and source parsed partitions concerning a plurality of source structured documents which are different from one another.

10. A structured document processing method implemented on a computer, wherein the computer is configured to perform the structured document processing method, comprising the steps of:

storing contents of both (i) a source structured document as a structured document which has been parsed and (ii) a result of parsing the same source structured document;

comparing contents of a new structured document and the contents of the source structured document by use of their respective contents parts which have a predetermined corresponding relationship therebetween;

distinguishing each of the contents parts of the new structured document between a first contents part and a second contents parts, wherein the first contents part is a contents part of the new structured document for which the result of parsing the source structured document can be used and the second contents part is a contents part of the new structured document for which the result of parsing the source structured document cannot be used;

parsing the second contents part of the new structured document and outputting a new parsed part as the result of the parsing; and posting to an application program a part representing the result of parsing the source structured document corresponding to the first contents part as a result of parsing the first content part of the new structured document, and for posting to the application program the new parsed part as a result of parsing the second content part of the new structured document.

11. A structured-document processing method implemented on a computer, wherein the computer is configured to perform the structured document processing method, comprising the steps of: storing contents of both (i) a source structured document which has been parsed and (ii) a result of parsing structured partitions of the source structured document;

performing a matching check on whether or not source contents of the source structured document and contents of a new structured document match each other by comparing one of the structured partitions of the source structured document and a corresponding structured partition of the new structured document one by one in order from a head of both the source and new structured documents;

classifying each of the structured partitions of the new structured document into two categories, that is a first-class structured partition and a second-class structured partition, based on a result of performing the matching check concerning each of the structured partitions;

parsing a structured partition which the classification step has classified as a second-class structured partition; generating a new parsed partition as a result of parsing the structured partition; and posting to the application program (i) an event concerning each of the structured partitions in order from a structured partition in a head of the new structured document to a structured partition in a tail of the new structured document, (ii) an event concerning a source parsed partition of the source structured document corresponding to each of the structured partitions of the new structured document as a result of parsing the structured partition if the structured partition is a first-class structured partition, and (iii) an event concerning a new parsed partition concerning a structured partition as a result of parsing the structured partition if the structured partition is a second-class structured partition.

12. The structured document processing method according to claim 11, wherein: the step of parsing performs a check made on the basis of whether or not a new structured document is a non well-formed structured document;

the step of performing a matching check holds a matching check on a first structured partition following a second structured partition until a non well-formed check by the parsing step concerning the first structured partition is completed if a result of performing the matching check on the first structured partition of the new structured document is NO;

the step of performing a matching check aborts a matching check on the new structured document if it is decided by the matching check that the new structured document is non well-formed; and the step of posting posts to the application program a notice that the new structured document is a non well-formed structured document instead of posting an event if it is decided by the check that the new structured document is non well-formed.

13. The structured document processing method according to claim 11, further comprising the step of:

selecting out of the plurality of source structured documents, as the most approximate structured document, a source structured document whose source contents are the most approximate to contents of the new structured document;

wherein the step of storing stores source content and source parsed partitions concerning a plurality of source structured documents which are different from one another; and wherein the step of performing the match check turns the source structured document concerning the matching check into the most approximate structured document.

14. The structured document processing method according to claim 13, further comprising the steps of: detecting a server and an operation on the basis of a request from a client in a Web service; and selecting a most approximate structured document on the basis of the server and operation detected.

15. The structured document processing method according to claim 13, further comprising the steps of: detecting a UIRL to which a request for a Web service is going to be sent, wherein the structured document is concerned with the request for the Web service; and selecting a most approximate structured document on the basis of the URL detected.

16. The structured document processing method according to claim 11, further comprising the steps of:

increasing a difference amount between a content of the new structured document and a content of the source structured document by one unit each time it is decided that a result of performing the matching check is No; and classifying all of the structured partitions, ranging from (i) a structured partition on which the matching check has been performed for the last time to (ii) a structured partition in the tail of the new structured document, as second-class structured partitions after the difference amount exceeds a threshold value.

17. The structured document processing method according to claim 11, further comprising the steps of:

increasing a difference amount between a content of the new structured document and a content of the source structured document by one unit, each time it is decided that a result of performing the matching check is NO; and replacing a pre-replaced source structured document with source structured document and continuing the same process, which has been performed on the new structured document and the pre-replaced source structured document, on the new structured document and the post-replaced source structured document from its beginning after the difference exceeds a threshold.

18. A program storage device readable by machine, tangibly embodying a program of instructions executable by the machine to perform method steps for structured document processing, said method comprising the steps of:

storing both (i) a source structured document which has been parsed and (ii) a result of parsing the source structured document;

performing a matching check on whether or not source contents of the source structured document and contents of a new structured document match each other by comparing one of the structured partitions of the source structured document and a corresponding structured partition of the new structured document one by one in order starting from a head of both the source and new structured documents;

classifying each of the structured partitions of the new structured document into two categories, that is a first-class structured partition and a second-class structured partition, based on a result of performing the matching check concerning each of the structured partitions;

parsing a structured partition which the classification step has classified as a second-class structured partition and generating a new parsed partition as a result of parsing the structured partition; and posting to the application program (i) an event concerning each of the structured partitions in order from a structured partition in the head of the new structured document to a structured partition in a tail of the same new structured document, (ii) an event concerning a source parsed partition of the source structured document corresponding to each of the structured partitions of the new structured document as a result of parsing the structured partition if the structured partition is a first-class structured partition, and (ii) an event concerning a new parsed partition concerning a structured partition as a result of parsing the structured partition if the structured partition is a second-class structured partition.

19. A computer readable storage medium tangibly embodying a computer readable program of instructions executable by the computer to perform method steps for structured document processing, said method comprising the steps of:

storing both (i) a source structured document which has been parsed and (ii) a result of parsing the same source structured document;

comparing contents of a new structured document and contents of the source structured document by use of their respective contents parts which have a predetermined corresponding relationship therebetween;

distinguishing each of the contents parts of the new structured document between a first contents part and a second contents part, wherein the first contents part is a contents part of the new structured document for which the result of parsing the source structured document can be used and the second contents part is a contents part of the new structured document for which the result of parsing the source structured document cannot be used;

parsing the second contents part of the new structured document and outputting a new parsed part as a result of the parsing; and posting to an application program a part representing the result of parting the source structured document corresponding to the first contents part as a result of parsing the first contents part of the new structured document, and for posting to the application program the new parsed part as a result of parsing the second contents part of the new structured document.

* * * * *

UNITED STATES PATENT AND TRADEMARK OFFICE
CERTIFICATE OF CORRECTION

PATENT NO. : 7,725,923 B2  Page 1 of 1
APPLICATION NO. : 12/124437
DATED : May 25, 2010
INVENTOR(S) : Miyashita et al.

It is certified that error appears in the above-identified patent and that said Letters Patent is hereby corrected as shown below:

Title Page:
Insert -- [63]  Related U.S. Application Data
Continuation of application No. 11/147,726, filed on June 8, 2005, now Pat. No. 7,536,711. --

Insert -- [30]  Foreign Application Priority Data
June 10, 2004   (JP) .................. 2004-172972 and
October 28, 2004   (JP) .................. 2004-314713 --

Signed and Sealed this

Fourteenth Day of September, 2010

David J. Kappos
*Director of the United States Patent and Trademark Office*